United States Patent [19]

Baker et al.

[11] 4,261,039
[45] Apr. 7, 1981

[54] MICROPROCESSOR CONTROLLED POSITIONING SYSTEM

[75] Inventors: Gregory N. Baker; John E. Bateson; Earl T. Brown; Hortensia E. Delgado, all of Boca Raton; Ludwig R. Siegl, Highland Beach; Delbert C. Thomas, Jr., Boca Raton, all of Fla.

[73] Assignee: International Business Machines Corporation, Armonk, N.Y.

[21] Appl. No.: 86,487

[22] Filed: Oct. 19, 1979

[51] Int. Cl.³ .................. G06F 15/46; G05B 19/19
[52] U.S. Cl. .................. 364/519; 364/110; 318/594; 400/70
[58] Field of Search ............ 364/518, 519, 110, 114, 364/118, 200, 900; 318/592, 594, 603; 235/92 MP; 400/70

[56] References Cited

U.S. PATENT DOCUMENTS

| | | | |
|---|---|---|---|
| 2,603,118 | 7/1952 | Ducout | 84/1.18 |
| 3,096,444 | 7/1963 | Seward | 318/313 |
| 3,731,177 | 5/1973 | Commander et al. | 318/603 |
| 3,976,929 | 8/1976 | Rodier | 318/594 |
| 3,986,091 | 10/1976 | Quiogue et al. | 318/594 |
| 4,021,650 | 5/1977 | Ruble | 364/900 |
| 4,072,415 | 2/1978 | Inoue et al. | 355/14 |
| 4,078,485 | 3/1978 | Guthrie | 101/110 |
| 4,091,911 | 5/1978 | Chang et al. | 364/519 |
| 4,146,922 | 3/1979 | Brown et al. | 364/519 |
| 4,147,967 | 4/1979 | Aiena | 364/519 |

Primary Examiner—Charles E. Atkinson
Assistant Examiner—Gary Chin
Attorney, Agent, or Firm—D. Kendall Cooper

[57] ABSTRACT

A microprocessor controlled printer includes a forms feed assembly, a dot matrix print assembly, a ribbon drive assembly and a number of emitter assemblies associated with the foregoing to provide positional information during operation of the printer which prints on a line-by-line basis. During the printing of characters, such as Kanji characters, extremely accurate control of dot placement is required. In order to achieve a balance between the operating cycle times of the microprocessor and the forms feed assembly, the microprocessor analyzes emitter pulses in two stages. One stage involves use of relatively low frequency emitter pulses for start-up, normal speed, and high speed operations. Another stage involves use of an additional emitter track that produces high frequency pulses utilized by the microprocessor during stopping conditions to achieve greater precision in final positioning of the forms.

30 Claims, 43 Drawing Figures

0000

43AA

45E6

48F2

CONTROL MICROPROCESSOR (CTM)

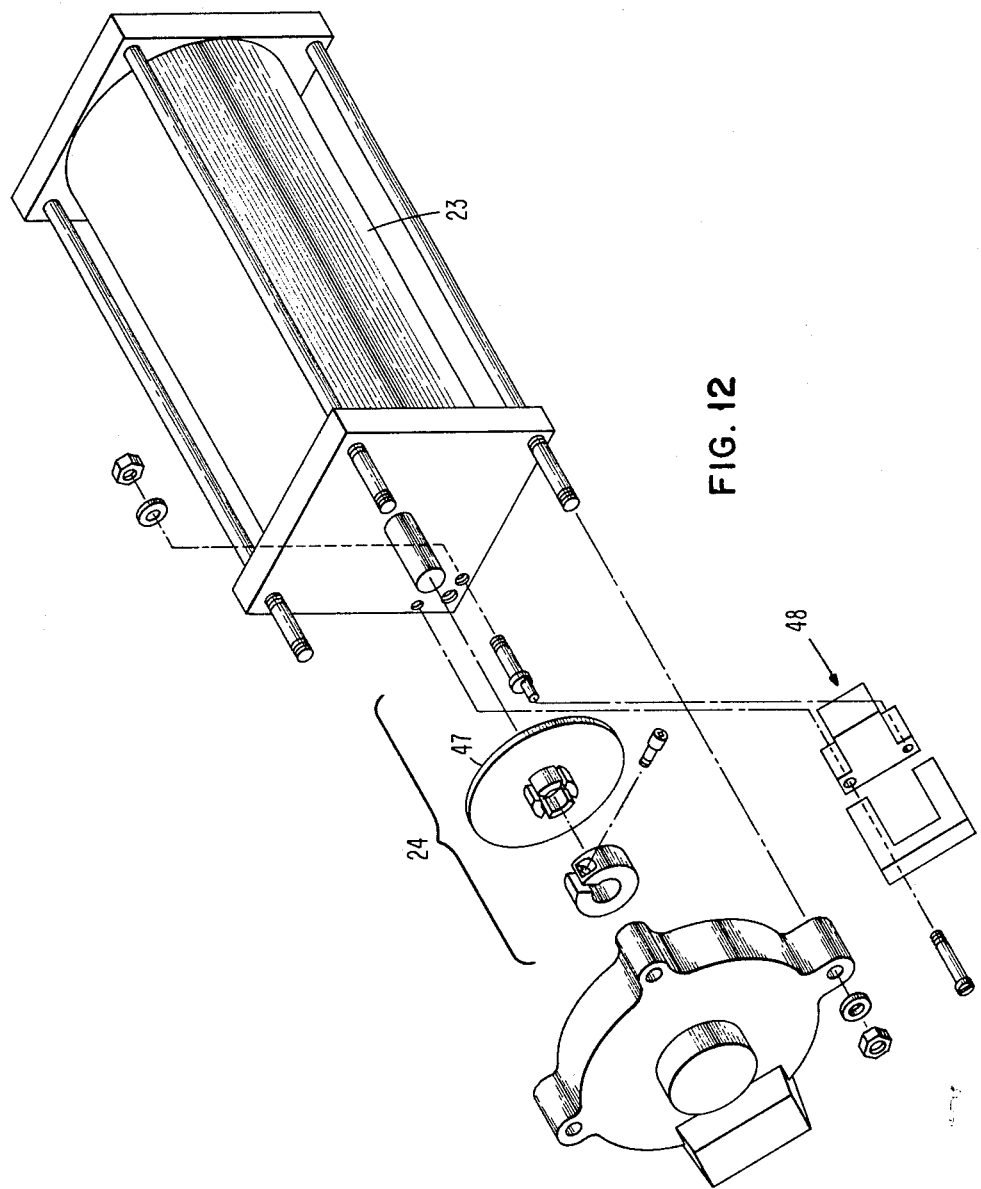

| | | HEAD EMTT "B2" IN / OUT | | FORMS FRMIO "B3" IN / OUT | | WIRE FEEDBACK WFBCK "B4" IN / OUT | | HIG LOAD "44" IN / OUT | |
|---|---|---|---|---|---|---|---|---|---|
| R0 | 8<br>4<br>2<br>1 | PRBSY<br>PREM<br>TRNAR<br>MARGN | | FBUSY<br>EOFEM<br>FEA<br>FEB | | ✳ | | | |
| R1 | 8<br>4<br>2<br>1 | PRRUN<br>HALFS<br>LEFT<br>RMSPD | PRRUN<br>HALFS<br>LEFT<br>RMSPD | RUN<br>HISPD<br>FWD<br>DTNT | RUN<br>HISPD<br>FWD<br>DTNT | | | | |

| | | ERRORS OCERR "B1" IN / OUT | | NO. ACT NOHDS "B0" IN / OUT | | US TIMER USTIM "50" IN / OUT | | MS TIMER MSTIM IN / OUT | |
|---|---|---|---|---|---|---|---|---|---|
| R0 | 8<br>4<br>2<br>1 | PWRGD<br><br>HDOC<br>FMOC | | −NO.−<br>−ACT−<br>−GRP− | | 384<br>192<br>96<br>48 | 384<br>192<br>96<br>48 | 196.608<br>98.304<br>49.152<br>24.576 | |
| R1 | 8<br>4<br>2<br>1 | TRAUL<br>CVINT<br>HVGD<br>RBER | | | | 24<br>12<br>6<br>3 | 24<br>12<br>6<br>3 | 12.288<br>6.144<br>3.072 | |

| | | RIBBON RBCNT "B5" IN / OUT | | STATUS REG STREG "40" IN / OUT | | COMMAND REG CMREG "42" IN / OUT | | CMD DATA CMDTA "43" IN / OUT | |
|---|---|---|---|---|---|---|---|---|---|
| R0 | 8<br>4<br>2<br>1 | <br><br><br>RBBSY | | <br><br><br>CKCND | | PARTY<br>CMVAL<br>ATVAL<br>TEST | | | |
| R1 | 8<br>4<br>2<br>1 | <br><br>RBRST<br>RBRUN | LCKOT<br>✳<br>RBRST<br>RBRUN | <br>ECCH<br>HDCT<br>TSTRE | | PRTCM<br>FRMCM<br>TXTBF<br>CHDEN | | | |

FIG. 18

MICROPROCESSOR CONTROLLED POSITIONING SYSTEM

BACKGROUND OF THE INVENTION

This invention relates to positioning systems and more particularly to such systems that operate in conjunction with a controller, a microprocessor, or the like. The invention is described in connection with a microprocessor-controlled printer unit, particularly involving the positioning of forms in the printer unit with high precision.

Considerable progress has been made in recent years in microprocessor-controlled systems, but some difficulty has been encountered in achieving compatibility in the operating times, that is, cycle times of the various elements making up such a system. A representative system of this nature may include a microprocessor for controlling operations, for sensing conditions in the system, analyzing such conditions, and providing control signals based on such analysis to the system elements. A printer unit incorporates various assemblies of a more or less electromechanical nature. Examples of this are forms feed assemblies, print assemblies, ribbon drive assemblies and the like. Microprocessors available at this time may have cycle times in the range of 0.2 microseconds to 10 microseconds, for example. Cycle times of the mechanical elements making up a system of this nature are measured usually in milliseconds, rather than microseconds. However, since the microprocessor has so many functions assigned to it during operation of the system, it may be able to devote only a very small amount of its operating cycle time to checking the status of the electromechanical elements or other portions of the system, and it is desirable that a balance be reached between the operating capacity of the microprocessor and the requirements for maintaining close control over all system elements. Thus, it may be desirable to have an arrangement for a system of this type wherein the microprocessor checks the condition of various system elements only on a periodic basis. That is, it is desirable from the standpoint of efficiency that as little time as possible be set aside for checking the system elements. On the other hand, when high quality printing is required, it is essential that positional information, such as that provided from an emitter, be analyzed and acted upon often enough to insure the desired degree of accuracy and quality.

SUMMARY OF THE INVENTION

In accordance with the present invention, a microprocessor-controlled positioning system is provided which includes, besides the microprocessor, a number of electronic and electromechanical components typically having wide variances and operating cycle times. In a preferred embodiment, the invention is described in connection with a microprocessor-controlled printer which includes a forms feed assembly, a print assembly, a ribbon drive assembly, and a number of emitter assemblies associated with the foregoing to provide positional information during operation of the printer. The elements in the system are arranged for printing on a continuous form on an essentially line-by-line basis. The print assembly incorporates print heads, each having a plurality of print wires and arranged for reciprocation along a print line to print characters by means of dot matrix printing. In certain printer applications involving the preparation of documents with extremely high tolerance requirements, such as during the printing of Kanji characters, extremely close control is necessary to insure that dot placement is accurate at all times. In many cases, the vertical dimensions of the characters are enhanced by feeding the forms on a step by step basis with closely spaced steps together with movement of the print head assembly. This is done a multiplicity of times along the print line to achieve placement of all dots required to make up the individual characters in each print line.

During the operation of the forms feed assembly as printing takes place, a typical forms step might comprise four to eight thousands of an inch. In order to keep track of the forms position with precision, an emitter assembly is provided associated with the forms feed motor that provides feedback signals indicative of the direction and extent of movement of the forms. In order to achieve a balance between the operating cycle times of the microprocessor and the forms feed assembly including the emitter assembly, the emitter provides low frequency and high frequency signals to the microprocessor which are used in a two-stage analysis for determining position. In one stage or condition of operation, the microprocessor receives and analyzes low frequency pulses from the emitter assembly which indicate the actual position and direction of movement of the forms during start-up, normal speed, and high speed operations. In another stage, the microprocessor analyzes high frequency pulses from the emitter assembly from an additional emitter track which indicates the extent and direction of movement of the forms during stopping conditions. The latter stage of analysis and consequent control by the microprocessor provides a much greater precision in final positioning of the forms.

CROSS-REFERENCE TO OTHER PATENT APPLICATIONS

The present patent application describes an overall printer subsystem configuration which utilizes certain structures and principles of operation as described in the patent application listed below, and the listed applications are specifically incorporated by reference herein. However, such applications claim different inventive concepts embodied in the overall printer subsystem configuration described.

(1) Application Ser. No. 086,484 filed on Oct. 19, 1979 entitled "Printer Subsystem with Microprocessor Control", the inventors being Messrs. William W. Boynton et al.

(2) Application Ser. No. 086,491 filed on Oct. 19, 1979 entitled "Detection of Multiple Emitter Changes in A Printer Subsystem", the inventors being Messrs. Barry R. Cavill et al.

(3) Application Ser. No. 086,493 filed on Oct. 19, 1979 entitled "Head Image Generator for a Matrix Printer", the inventor being L. K. Leontiades.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 12 is an enlarged view of the forms motor and forms emitter assembly shown in FIG. 4.

FIG. 18 represents the utilization of the R0 and R1 registers during input/output operations. These represent the input and output signals encountered during operations.

FIG. 19A shows the timing conditions encountered during a low speed forms feed operation, while FIG. 19B shows the timing conditions during a high speed forms feed operation.

DESCRIPTION OF PRINTER SUBSYSTEM AND PRINTER MECHANISMS

In order to best illustrate the utility of the present invention, it is described in conjunction with a high speed matrix printer, typically capable of printing in a high range of lines per minute on continuous forms. The particular printer subsystem described herein is associated with a host system or processor, responds to command and data signals from the host to print on the forms and in turn provides status signals to the host during operations.

The printer itself is an output line printer designed to satisfy a variety of printing requirements in data processing, data collection, data entry, and communications systems. It can be used as a system printer or a remote work station printer.

The following printer highlights are of interest:

Sixteen self-contained alphanumeric character sets selectable by the using system program with a base language selected by hardware jumpers, as well as a large Kanji character set;

Matrix printing technology;

Built-in diagnostics for problem determination by the operator;

Microprocessor control unit.

Figure 1:
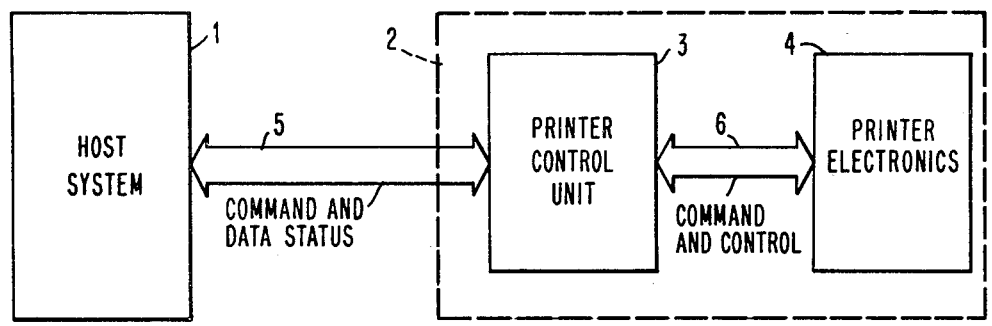
FIG. 1 is a simplified system diagram for the printer subsystem.

FIG. 1 illustrates a representative system configuration including a host system 1 and the printer subsystem 2 which includes a printer control unit 3 and printer electronics 4. Command and data signals are provided by the host system by way of interface 5, and command and control signals are provided from printer control unit 3 to the printer electronics 4 by way of bus 6. Status signals are supplied by printer control unit 3 to host system 1 by way of interface 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, activates print wires, drives motors, senses printer emitters, and controls operator panel lights and switching circuitry. It controls the tractor/platen mechanism, the ribbon drive, the print head (i.e., actuator group) carrier, the operator panel, and the printer sensors.

The elements of the system, such as the printer control unit and printer electronics, incorporate one or more microprocessors and microcomputers to analyze commands and data and to control operations.

Figure 2:
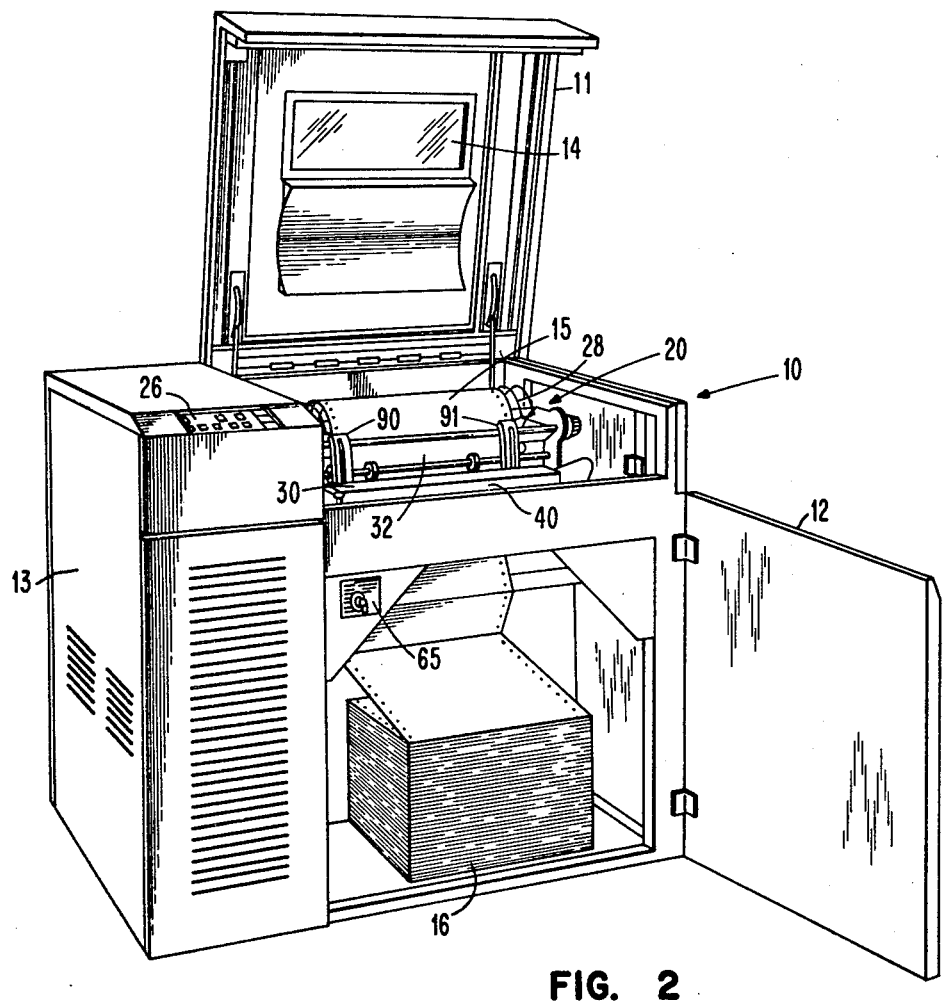
FIG. 2 illustrates the printer console and a number of printer components as well as forms feeding.
Figure 3:
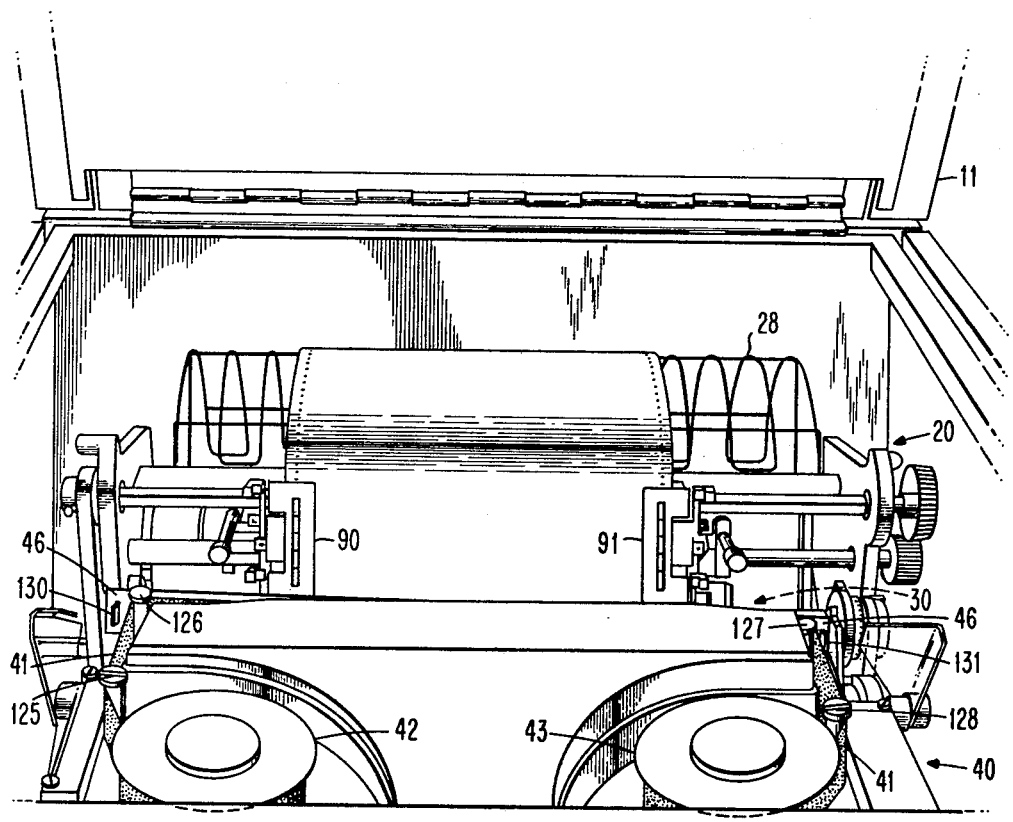
FIG. 3 is a frontal view of the printer unit in the printer console of FIG. 2.

FIGS. 2 and 3 illustrate various components of the printer all of which are housed in the console 10. Various access panels or covers such as those designated 11, 12, and 13 are provided. Top cover 11 has a window 14 that enables an operator to observe forms movement during operation of the printer and when the cover is closed. Forms (documents) 15 are fed from a stack 16 and can be fed in one embodiment upwardly or downwardly as viewed in FIGS. 2 and 3 by means of a forms feed assembly 20 which includes one or more sets of forms tractors such as the upper set comprising tractors 90 and 91. A forms guide 28 guides the forms after printing to a takeup stack, not shown but positioned below the printing mechanism and to the rear of the printer console. The printer incorporates a print assembly 30 that is positioned generally in a horizontal relationship with respect to forms 15 at a print station 32. Print assembly 30 is more clearly visible in other views. This is also true of the printer ribbon drive assembly 40 which is located in closer proximity to the front of the printer. Printer control unit 3 and its associated microprocessors are generally located behind the side cover 13.

A ribbon 41 is provided on one of the spools 42 or 43, which are disposable. Each box of ribbons would preferably contain a disposable ribbon shield 46 that fits between print assembly 30 and forms 15 to keep ribbon 41 in proper alignment and to minimize hold ink smudging on forms 15. Two motors shown more clearly in FIG. 8 drive ribbon 41 back and forth between spools 42 and 43. The printer control unit detects ribbon jams and end of ribbon (EOR) conditions. A ribbon jam turns on an error indicator and stops printing. An EOR condition reverses the ribbon drive direction.

The printer includes an operator panel 26 that consists of several operator control keys (pushbuttons), two indicator lights, a power on/off switch, and an operator panel display. By using various combinations of the keys in conjunction with the shift key, the operator can: start or stop printing and view the last line printed, set print density, position the forms up or down one page or one line at a time, move the forms incrementally up or down for fine adjustment, and start or stop the diagnostic tests when selected by a mode switch, to be described.

The indicator lights on the operator panel display notify the operator that: the printer is ready to print data from the using system, the printer requires attention, the current print density setting, errors, if any, have been detected, and the results of the diagnostic tests.

A 16-position mode switch 65 is located behind the front door 12. The on-line position permits printing to be controlled by the using system. All other positions are off-line and do not allow printing to be initiated from the using system

OVERVIEW OF PRINTER MECHANISMS

FIGS. 2, 3, 4 and 5, among others, show the details of construction of the forms feed assembly 20, the print assembly 30, the ribbon drive assembly 40, and various associated emitters. A general overview of these assemblies is first presented.

Figure 4:
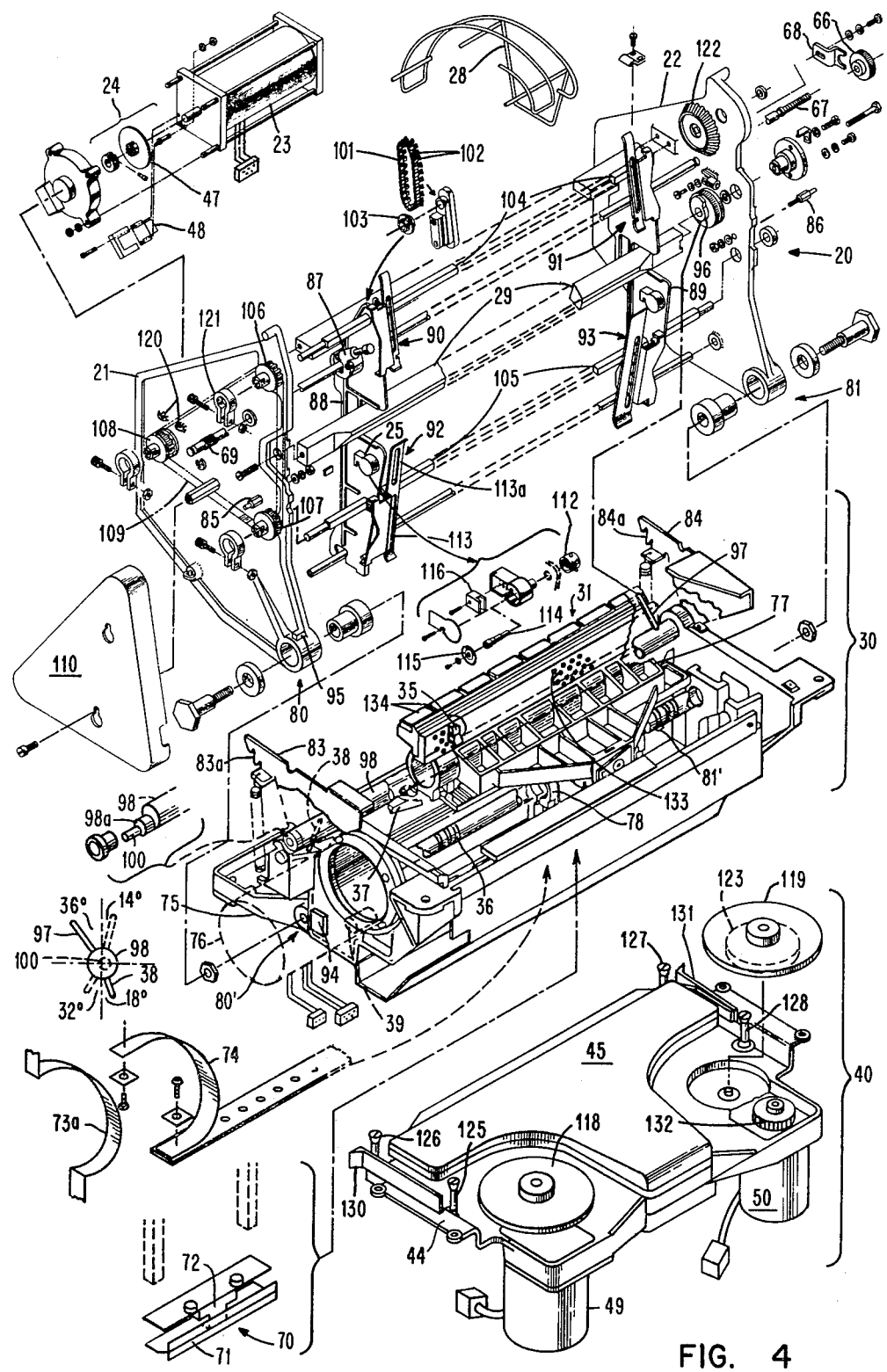
FIG. 4 is an exploded view of various printer assemblies including the forms feed assembly, the print assembly, and the ribbon drive assembly.

As best seen in FIG. 4, forms feed assembly 20 has end plates (side castings) 21 and 22 which support the various forms feed mechanisms including a drive motor 23 to drive tractors 90–93, the motor having a forms feed emitter assembly 24. The forms feed assembly has a separate end of forms and jam detector emitter 25. Assembly 20 also includes a platen 29 located behind the forms and against which the print wires 33 are actuated during printing.

The print assembly 30 includes a base casting 75 supporting various mechanisms including print motor 76, shown in phantom in FIG. 4 in order that other elements may be seen more easily, and connected to drive a print head carrier 31 with actuator block assembly 77 in a reciprocal fashion horizontally to effect printing on an inserted form. The print assembly also drives the print emitter assembly 70 having emitter glass 71 and optical sensor assembly 72.

The ribbon drive assembly 40 includes a support casting 44, a cover 45, and drive motors 49 and 50.

FORMS FEED ASSEMBLY

In order to load paper in the printer the forms feed assembly 20 pivots away from the base casting 75 at pivot points 80 (80') and 81 (81'), to allow access to thread the forms into position. Latches 83 and 84 are raised by the operator so that extremities 83a and 84a disengage eccentric pins 85 and 86 on the forms feed assembly. The forms feed tractor then pivots away from the operator as viewed in FIGS. 3 and 4. This allows access to tractors 90–93 so that the operator may load paper. The forms feed assembly is then reclosed and relatched by latches 83 and 84 for normal machine operation. During the time that the forms feed assembly is pivoted back for service, a switch 94 prevents machine operation. This switch is actuated by a tang 95 on forms feed assembly 20 when it is closed.

Referring to FIG. 4, the forms feed assembly includes means for adjusting the forms thickness. As mentioned, the entire forms feed assembly pivots back from the rest of the printer about pivot points 80 and 81. In the closed position the forms feed assembly is in such a position that a spiral cam 96 engages a pin 97 on the main carrier shaft 98 of the print assembly 30. Adjustment of the spiral cam and knob assembly 96 is such that it rotates the main carrier shaft 98. Assembly 96 is retained in position by a spring loaded detent assembly. This has a spring loaded pin which engages notches in the knob so that it is held in the position set by the operator. Associated with shaft 98 are eccentrics such as portion 98a on the left end of shaft 99 with tenon 100 onto which latch 83 is mounted. Rotation of shaft 98 thus moves latches 83 and 84 which changes the distance between the ends of print wires 33 and platen 29. This adjustment enables the printer to accommodate forms of various thicknesses. The printer can handle forms from one part to six parts thickness.

The paper feeding is accomplished by the four sets of tractors 90–93 two above the print line and two below the print line. The individual tractors include drive chains to which pins are attached at the proper distance to engage the holes in the form. As an example, tractor 90 has drive chain 101 with pins 102. Chain 101 is driven by a sprocket 103 attached to a shaft 104 which also drives the sprocket and chains for tractor 91. Tractors 92 and 93 are driven from shaft 105. Because the tractors are above and below the print line, the printer is able to move the paper in either direction. The normal direction of forms drive is upwardly in FIGS. 3 and 4. However, it is possible to move the paper downwardly, as well.

Rotation of shafts 104 and 105 and forms feeding is accomplished by appropriate drive of motor 23 in the proper direction which in turn drives pulleys 106 and 107 (to which shafts 104 and 105 are connected) from motor pulley 108 by means of drive-timing belt 109. Cover 110 covers belt 109 and pulleys 106–108 during rotation. The forms feed emitter assembly 24 includes an emitter wheel 47 with marks to indicate rotation and a light emitting diode assembly 48 that serve to indicate extent of rotation of motor 23 in either direction and as a consequence, the extent of movement of the forms as they are driven by motor 23.

The capability of the printer to feed paper in both directions offers some advantages. For example, in order to improve print visibility at the time the Stop button is pushed by the operator, the paper may be moved up one or two inches above where it normally resides to that it can be easily read and can be easily adjusted for registration. When the Start key is depressed, the paper is returned to its normal printing position back out of view of the operator. The printer may also be used in those applications where plotting is a requirement. In this case a plot may be generated by calculating one point at a time and moving the paper up and down much like a plotter rather than calculating the entire curve and printing it out from top to bottom in a raster mode.

End of forms and jam detection is accomplished in this assembly by a sprocket 112 just above the lower left tractor. The teeth in this sprocket protrude through a slot 113a in the flip cover 113. This sprocket is not driven by any mechanism but simply is supported by a bearing. The sprocket engages the feed holes in the paper as it is pulled past by the tractor assemblies. On the other end of the shaft 114 from the sprocket is a small optical emitter disc 115. The marks in this disc are sensed by an LED phototransistor assembly 116 and supplied to the electronics of the subsystem. The electronics verifies that marks have passed the phototransistor at some preselected frequency when the paper is being fed. If the mark is not sensed during that time, the machine is shut down as either the end of forms has occurred or a paper jam has occurred.

The castings 88 and 89 supporting the tractors 90-93 are adjustable left or right in a coarse adjustment in order to adjust for the paper size used in a particular application. After they are properly positioned they are locked in place on shaft 67 by locking screws such as locking screw 87.

All tractors are driven by the two shafts 104 and 105 from motor 23 as previously described. The motor adjusts in the side casting 21 in slots 120 in order to provide the correct tension for belt 109.

Besides the coarse adjustment, there is also a fine adjustment which is used to finally position in very small increments laterally the location of the printing on the forms. This is done by a threaded knob 66 which engages shaft 67 to which both tractor castings clamp. This shaft floats between side castings 21 and 22 laterally. The threads in knob 15 engage threads on the right end of shaft 67. The knob is held in a solid position by a fork 68. Therefore knob 66 stays stationary and the threads driving through the shaft force shaft 67 laterally left or right, depending upon the direction in which knob 66 is rotated. Shaft 67 is always biased in one direction to take out play by a spring 69 on the left end of shaft. As the paper leaves the top of the tractors, it is guided up and toward the back of the machine and down by the wire guide 28.

In order to insure that the distance between the pins in the upper tractors is in correct relationship to the pins in the lower tractors an adjustment is performed. This adjustment is made by inserting a gauge or piece of paper in the tractor assembly which locates the bottom pins in the correct relationship to the top pins. This is done by loosening a clamp 121 on the end of shaft 104. Once this position is obtained, then clamp 121 is tightened and in effect phases the top set of tractors to the bottom set so that holes in the paper will engage both sets of tractors correctly. Forms may be moved through the tractor forms feed mechanism manually by rotating knob 122. This knob simply engages the top drive shaft 104 of the upper tractor set and through the timing belt 109 provides rotational action to the lower tractor set, as well.

PRINT ASSEMBLY

In FIG. 4, a carrier 31 comprising actuator block 77 and support 78 accommodate all the print heads with their wire actuators 35 and print wires 33. Actuator block 77 is designed to hold from two up to eight or nine print head groups of eight actuators each. Thus, a printer with eight print head groups, as shown in FIG. 4 has sixty-four print wire actuators and sixty-four associated print wires. Only two actuators 35 are shown positioned in place in FIG. 4. The other sixty-two actuators would be located in apertures 133 only a few of which are depicted. To insure long life of the print wires, lubricating assemblies 134 containing oil wicks are positioned in proximity to the print wires. The print wire actuators fire the wires to print dots to form characters. Carrier 31 is shuttled back and forth by a lead screw 36 driven by motor 76. Lead screw 36 drives the carrier back and forth through nuts which are attached to the carrier. When carrier 31 is located at the extreme left, as viewed in FIGS. 3 and 4, this is called the "home position". When the carrier is moved to the home position, a cam 37 attached to the carrier engages a pin 38, the pin being attached to the main carrier shaft 98. If the machine has not been printing for some period of time, in the neighborhood of a few seconds, the printer control unit signals the carrier to move all the way to the left, in which case cam 37 engages pin 38 to rotate the main carrier shaft 98 approximately 15 degrees. On each end of the shaft are the eccentrically located tenons, such as tenon 100, previously described. These tenons engage the latches 83 and 84 so that the distance between the print assembly and the forms feed assembly is controlled by the latches. As shaft 98 rotates, the eccentrics associated with latches 83 and 84 separate the forms feed assembly from the print assembly.

The purpose of motor 76, of course, is to move the carrier 31 back and forth in order to put the print actuators 35 and print wires 33 in the proper positions to print dots and form characters. Since the motion is back and forth, it requires a lot of energy to get the mass of carrier 31 and actuators 35 stopped and turned around at the end of each print line. A brushless DC motor is used. The commutation to the windings in the motor is done external to the motor through signals sent out of the motor via a Hall effect device emitter 39. In other words, the emitter 39 within the motor sends a signal out telling the printer control unit that it is now time to change from one motor winding to the next. Therefore, there are no rubbing parts or sliding parts within the motor, and switching is done externally via electronics based on the signals that the motor sends out from its emitter. The motor draws about 20 amperes during turnaround time and, because of the high current it draws and because of the torque constant required from the motor, it is built with rare earth magnets of Semarium cobalt which provide double the flux density of other types of magnets.

Semarium cobalt is not just used because of the higher flux density but also because its demagnetization occurrence is much higher and, therefore, more current can be sent through the motor without demagnetizing the internal magnets. During printing, carrier 31 that holds the print actuators 35 goes at a velocity of approximately 25 inches per second in the Kanji version, discussed in connection with FIGS. 7C and 7D. The turnaround cycle at the end of the print line requires 28 milliseconds approximately, resulting in a Gravity or "G" load in the neighborhood of 4 G's. The carrier, with all the actuators mounted, weighs about eight and a half pounds.

The current necessary to fire the print actuators is carried to the actuators via cable assemblies, one for each group of eight actuators. The cabling, such as cable 73a, FIG. 4, is set in the machine in a semicircular loop so that as carrier 31 reciprocates it allows the cable to roll about a radius and therefore not put excessive stress on the cable wires. This loop in the cable is formed and held in shape by a steel backing strap 74. In this case there is one cable assembly for each group of eight actuators or a maximum of eight cable backing strap groups.

RIBBON DRIVE ASSEMBLY

The ribbon drive assembly 40 for the printer is shown in FIG. 4, but reference is also made to FIG. 3. Spools 42 and 43 are shown with spool flanges but may be structured without spool flanges and contain the ribbon. The spools can be seen on either side of the machine near the front, FIG. 3. These spools typically contain 150 yards of standard nylon ribbon that is one and a half inches wide. Gear flanges 118 and 119, FIG. 4, support ribbon spools 42 and 43, respectively. Drive for spool 43, as an example, is from motor 50, pinion gear 132 to a matching gear 119a formed on the underneath side of gear flange 119 then to spool 43. In one direction of feed, the ribbon path is from the left-hand spool 42 past posts 125 and 126, FIGS. 3, 8 and 13, across the front of the ribbon drive assembly between the print heads 34 and forms 15, then past posts 127 and 128 back to the right-hand ribbon spool 43. A ribbon shield is generally located between posts 126 and 127 and is mounted on the two attachment spring members 130 and 131.

RIBBON SHIELD

FIG. 3 illustrates a portion of ribbon shield 46 that is useful in the printer described herein. Shield 46 has an elongated aperture extending almost its entire length. The aperture enables the print wires 33 to press against the ribbon in the printer through the shield in order to print on forms 15. Shield 46 has slits at opposite extremities to permit easy mounting in the printer on spring members 130 and 131 of the ribbon drive assembly, FIG. 4.

As previously noted, the print wires are reciprocated back and forth laterally in relation to forms 15 in order to effect the printing of characters. The reciprocation is by means of drive mechanisms activated from motor 76. The activating signals for the actuators in print mechanisms 21 are supplied through cabling such as cable 73a.

ALTERNATIVE FORMS FEED ASSEMBLY

Figure 5:
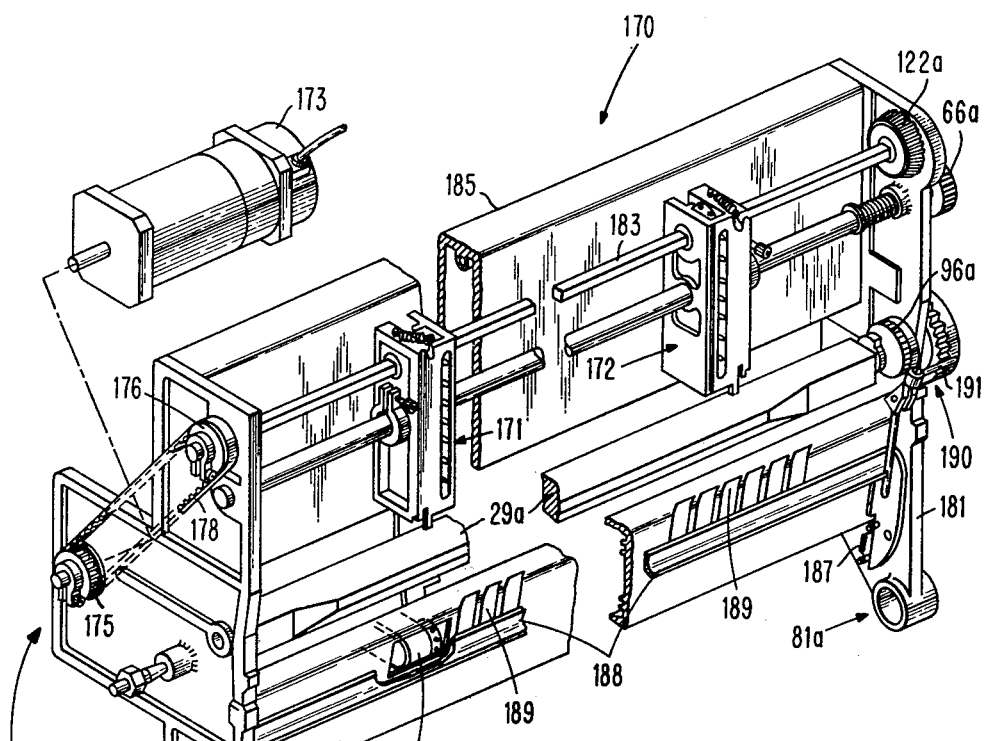
FIGS. 5 and 6 illustrate an alternative forms feed assembly for the printer unit.
Figure 6:
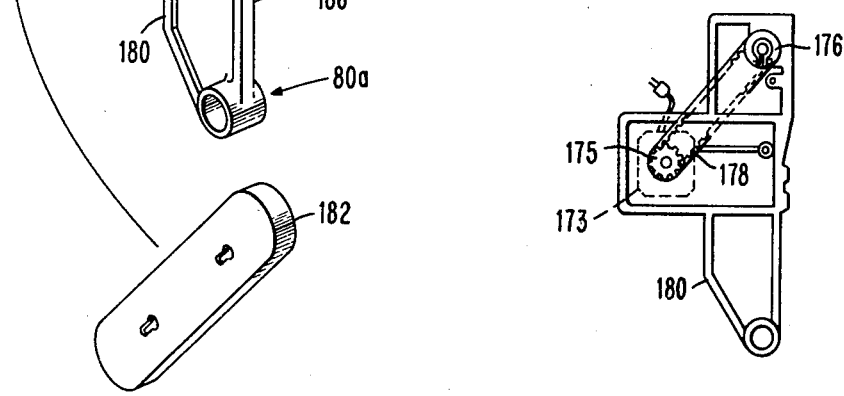

FIGS. 5 and 6 illustrate an alternative single direction forms feed assembly 170 which feeds forms only in the upward direction as viewed in these figures. In contrast with the forms feed assembly previously described in conjunction with FIG. 4, this forms feed assembly has only a single upper set of tractors 171 and 172. A driving motor 173 provides driving force through gears 175 and 176 by way of timing belt 178. The various elements comprising the forms feed assembly are supported in a left end plate 180 and a right end plate 181. FIG. 6 is a left end elevation of the forms feed assembly 170 illustrating the positional relationships of motor 173, timing belt 178 and other elements. A cover plate 182 covers timing belt 178 during operations. Driving of the pin feeds on the two tractors 171 and 172 is analogous to the driving of the pin feeds for forms feed assembly 20 illustrated in FIG. 8 and previously described. In forms feed assembly 170, the tractor drive includes a drive shaft 183.

Lateral support for the forms feed assembly 170 is provided by an upper support 185 and a lower support 186. The assembly also includes a platen member 29a. Other elements such as knobs 1 and 22a, 66a, and 96a are analogous to their counterpart elements 122, 66, and 96 shown in FIG. 4. The tractor mounts to the printer base casting 75 in FIG. 4 at pivot points 80a and 81a.

In place of the two lower tractors 92 and 93 in FIG. 4, this forms feed assembly includes a pressure drag assembly 188 with compliant fingers 189. These fingers exert physical pressure against the paper when in position against platen 29a and in the immediate vicinity of the printing station.

At the same time that forms feed assembly 170 is opened for insertion of new forms, the drag assembly 188 is also opened, but while the forms feed assembly moves toward the rear of the printer, the drag assembly moves toward the front. Spring element 187 enables drag assembly 188 to adjust to allow the forms to slide through when loading the forms. One additional cam element 190 cooperates with a follower 191 to provide adjustment of the pressure exerted by the drag assembly 188 on the paper for the purpose of accommodating various thicknesses of forms.

The assembly includes an End of Forms sprocket assembly 192 that could also serve to detect paper jams and that works in an analogous fashion to assembly 25 with sprocket 112 shown in FIG. 4.

PRINTING OF CHARACTERS, RELATIONSHIPS OF PRINT WIRES, CHARACTER LOCATIONS AND EMITTERS

Characters that are printed are formed by printing dots on the paper. These dots are printed by wires that are mounted in groups of seven on a carrier bar that moves back and forth adjacent to the print line. Printing is bidirectional with complete lines of print formed right-to-left and left-to-right. See FIGS. 7A–7D.

FIGS. 7A–7D are graphical representations of the print head relationships for two different versions of the printer and illustrate how dots are placed on the forms to be printed. Some information is also given concerning various operating parameters including head speeds, head spacing, and the like.

Figure 7A:
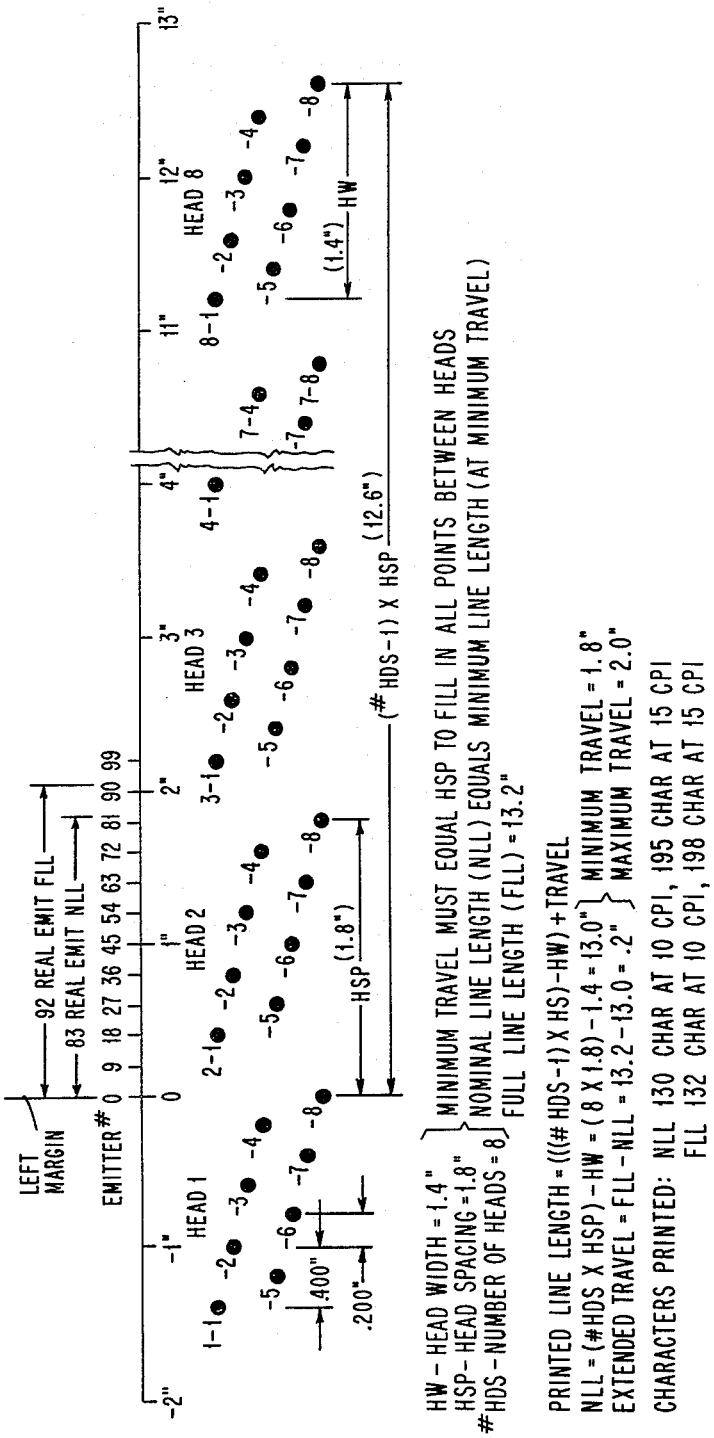
FIGS. 7A-7D show in greater detail the relationship of the print wires to character locations on the forms to be printed for several printer versions.
Figure 7B:
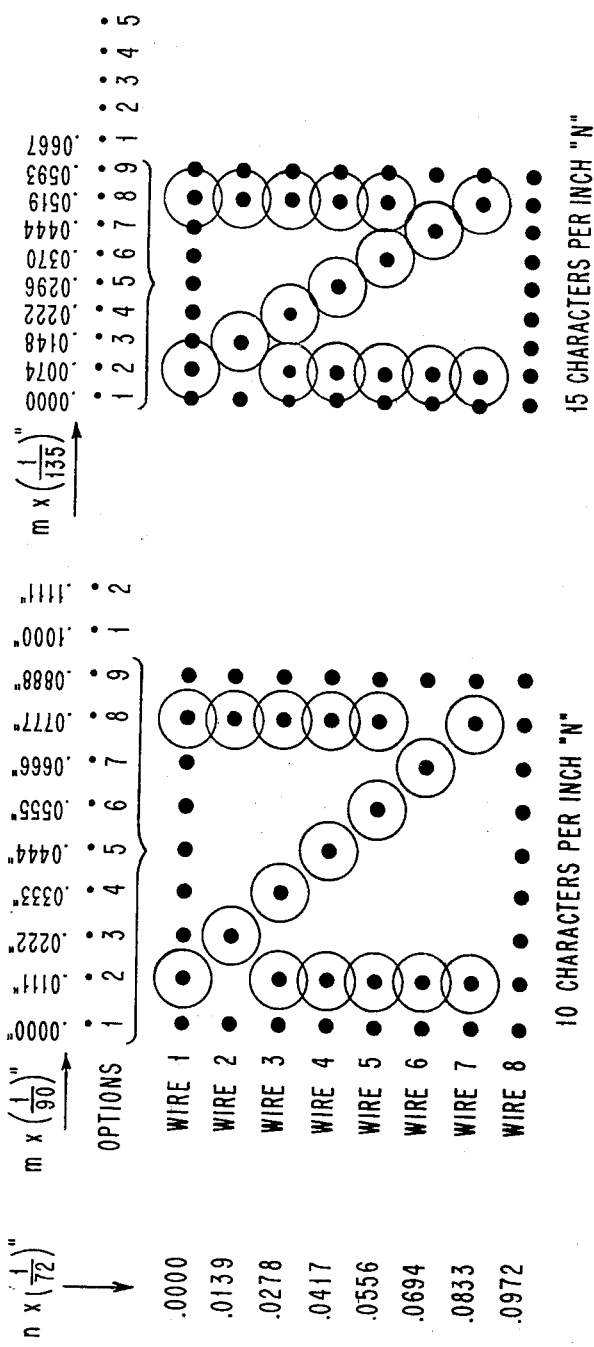

FIGS. 7A and 7B represent printing arrangements utilized in the printer described in the William W. Boynton et al patent application, previously referenced. In that printer, there are eight print heads (actuator groups), each having eight print wires each for a total of sixty-four print wires. FIG. 7A illustrates the arrangement of the print heads and print wires in the print actuator block assembly of the Boynton et al printer. When the heads are in home position, head 1 is located in such a manner that all of its print wires are to the left of the left margin as shown in FIG. 7A. As further illustrated in FIGS. 7A and 7B, the Boynton et al printer is arranged to print either 10 or 15 characters per inch. The relationships of the print heads and print wires and characters formed at both these densities, such as the character "N" is shown.

Figure 7C:
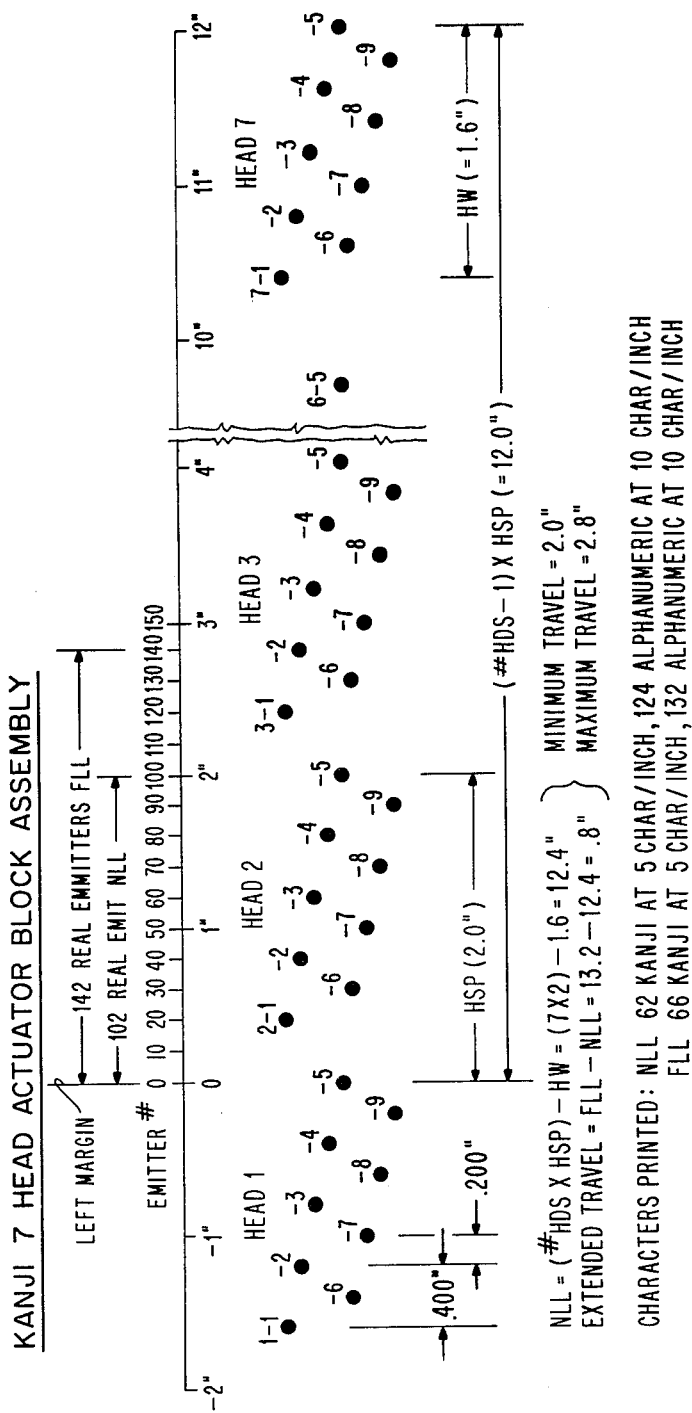
Figure 7D:
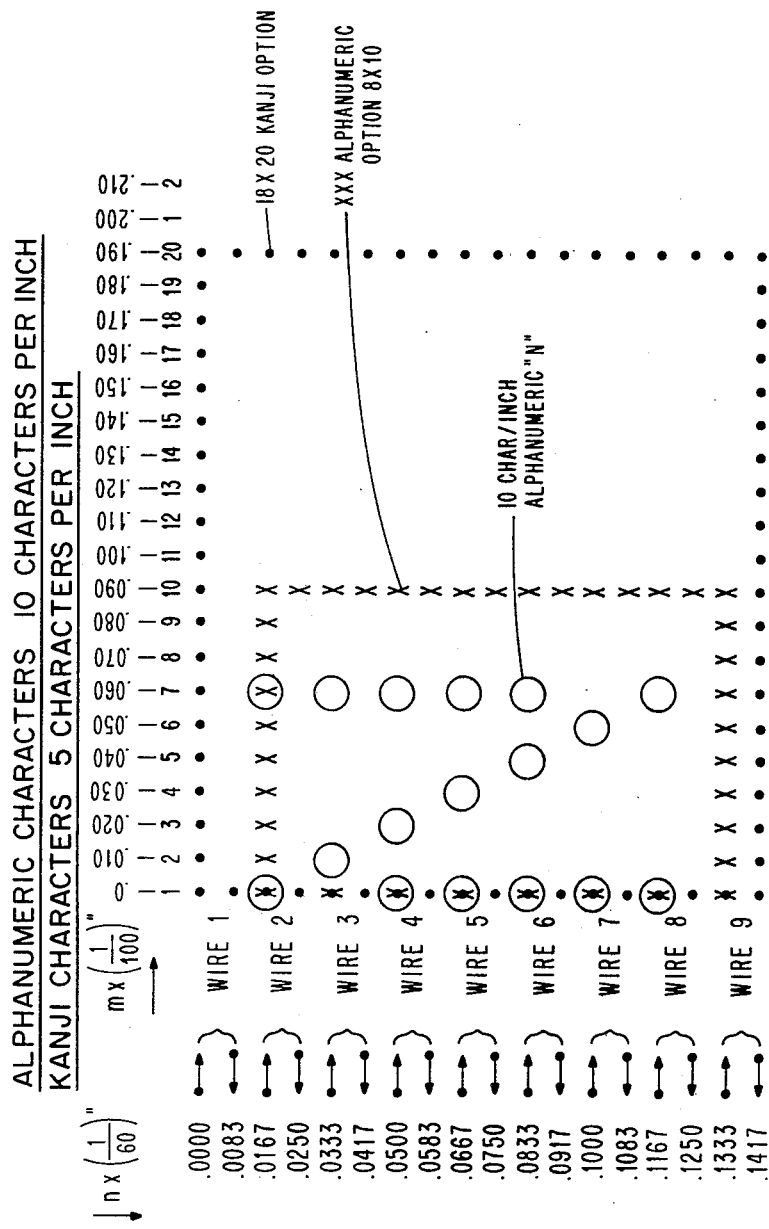

FIGS. 7C and 7D illustrate the print head, print wire, and character relationships for a printer intended to print both alphanumeric characters and Kanji characters. Kanji characters occur at 5 characters per inch while the alphanumeric characters occur at 10 characters per inch. In the embodiment shown and described herein, there are seven (7) print heads (actuator groups), each of which has 9 print wires for a total of 63 print wires. As with the version described in conjunction with FIGS. 7A and 7B, when the print heads are positioned in a home location, print head 1 has all of its print wires to the left of the left margin as shown in FIG. 7C. Alternatively, four (4) print heads (actuator groups) may be utilized instead of seven.

Referring to FIG. 7D, in particular, this illustrates the alphanumeric "N" arranged in an 8×10 character box. With this character box size, printing will occur at ten characters per inch. It is noted that there are nine wire locations in a vertical direction but ordinarily only wire locations 2–8 are used for the alphanumeric characters. For printing of Kanji characters, such as those illustrated in FIGS. 8A–8D, the character box is expanded to an 18×20 sized character box. This means that there are 20 print wire locations horizontally and 18 print wire locations vertically that are utilized for each Kanji character to be printed. This being the case, and as can be observed by reference to FIG. 7D, one set of dots of 9 horizontal rows of the Kanji characters is formed in one pass of the print heads, the paper is then moved ½ wire spacing in a vertical direction and another set of 9 horizontal rows of dots of the Kanji characters is formed by another pass of the print heads, the printing thus occurring in an interlaced fashion to form complete characters.

It is noted that the dot diameters are considerably smaller for Kanji and alphanumeric characters in the version shown in FIGS. 7C and 7D when contrasted with that illustrated in FIGS. 7A and 7B. However, since there are many more dot locations utilized to form each Kanji character, the general visibility or intensity of the Kanji characters is at least equal to the intensity of the alphanumeric characters in the version of FIGS. 7A and 7B.

The necessary control circuitry for converting character information into the Kanji dot locations is described and claimed in the Leontiades patent application cross-referenced above.

As each wire passes by and reaches the appropriate position for printing of its assigned dot locations in a vertical direction, it is fired. Thus, formation of characters takes place in a flowing or undulating fashion insofar as the printing of the dots is concerned. That is, an entire vertical column of dots as in the left-hand portion of the character capital "H", as an example, is not formed all at once but is formed in succession as the wires in the print head sweep past that column. This is true of the printing of all other character columns, as well. As a result of this, each print head is required to pass at least far enough so that all of the wires in that print head will be able to print both the first vertical column of dots in the first character required as well as the last column of dots in the last character to be printed in the group of character locations assigned to that print head.

Accordingly, print head 1, during printing movement of carrier 31, prints all of the character portions that normally would appear underneath print head 2 when the print heads are in their home position. The printing of dots associated with print head 2 takes place under the home position for print head 3 and so on.

Figure 8A:
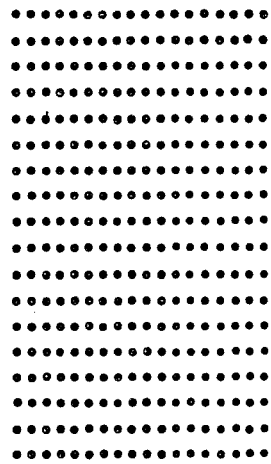
FIGS. 8A-8D illustrate print wire relationships and Kanji characters produced by the printer unit of FIGS. 1-3.

FIGS. 8A–8D illustrate print wire relationships and the Kanji characters produced by the printer unit of FIGS. 1–3. The character address identification is shown at the top of the individual character. As an example, the Kanji character in FIG. 8B has an address .43AA. The address "0000" represents merely a spacing condition as shown in FIG. 8A with no printing of information. However, the illustration in FIG. 8A is useful in demonstrating that although the Kanji character box is 18 high×20 wide, the actual character dot locations number eighteen (18) vertically and eighteen (18) horizontally; that is, the first and twentieth dot columns in each character are not printed to allow for inter-character spacing. It is apparent that the 18×20 character box matrix is realized by printing two 9×20 dot matrix boxes one box interlaced with the other which takes two passes of the print heads.

Figure 8B:
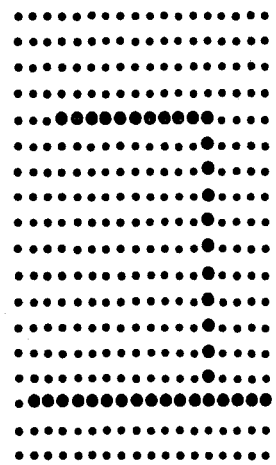
Figure 8C:
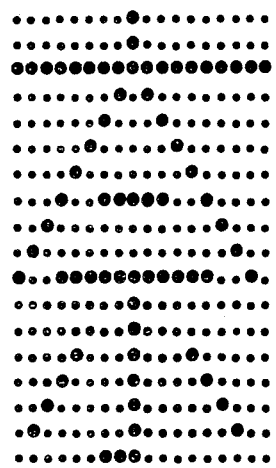
Figure 8D:
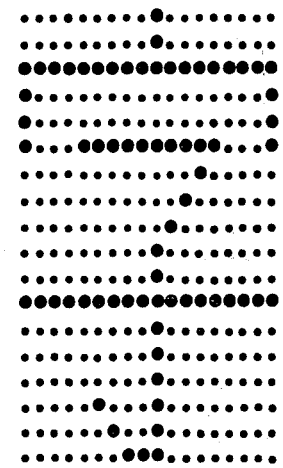

By appropriate control of print wire firing and positioning of the forms in the printer unit, the Kanji characters in FIGS. 8B–8D are produced as well as hundreds of other Kanji characters that may need to be printed.

PRINTER CONTROL UNIT

The printer control unit 3 (See FIGS. 1, 9A and 9B as examples) connects the printer to the interface cable from the controlling device, controls the flow of information to and from the controlling device and controls all internal printer functions.

When data is received for printing, the printer control unit formats the data into print lines, using formatting commands (control codes) embedded in the data stream. Two print-line format buffers are used so one line can be printed while the next line is being formatted. This comprises a "lookahead" function which allows bidirectional printing for maximum throughput.

MICROPROCESSOR CONTROL—PRINTER SUBSYSTEM

Two microprocessors are provided for the printer subsystem, each having its assigned functions and both can operate concurrently to accomplish the required functions.

The microprocessors may be of the type described in U.S. patent application Ser. No. 918,223 (IBM Docket BC9-78-001) filed June 23, 1978, having P. T. Fairchild and J. C. Leininger as inventors and entitled "Programmable Control Latch Mechanism for a Data Processing System".

Figure 9A:
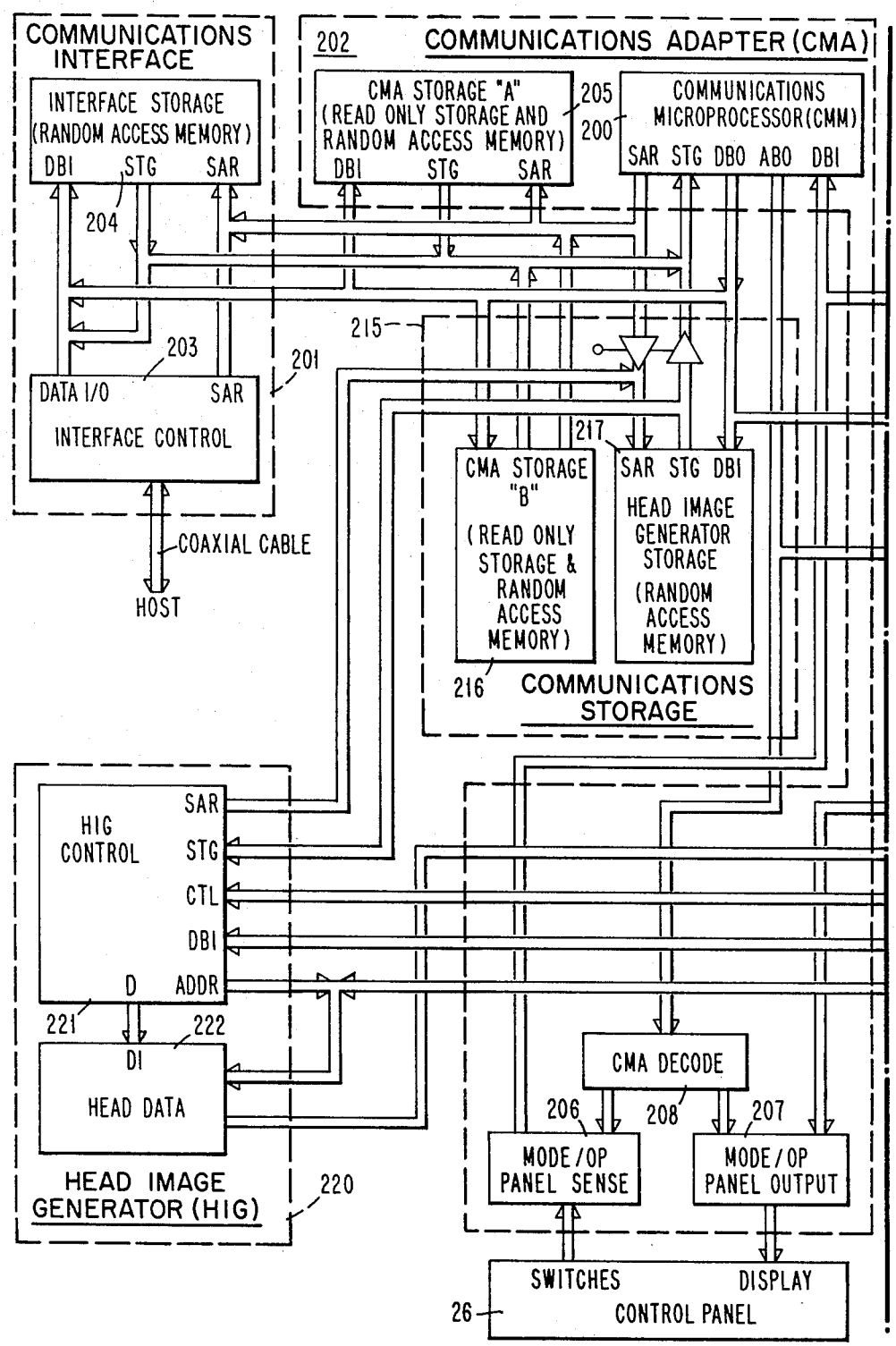
FIGS. 9A and 9B, when arranged as shown in FIG. 10, comprise a block diagram of the printer control unit including a Communications microprocessor (CMM) and a Control microprocessor (CTM) as well as a number of elements in the printer unit.
Figures 9B, 10:
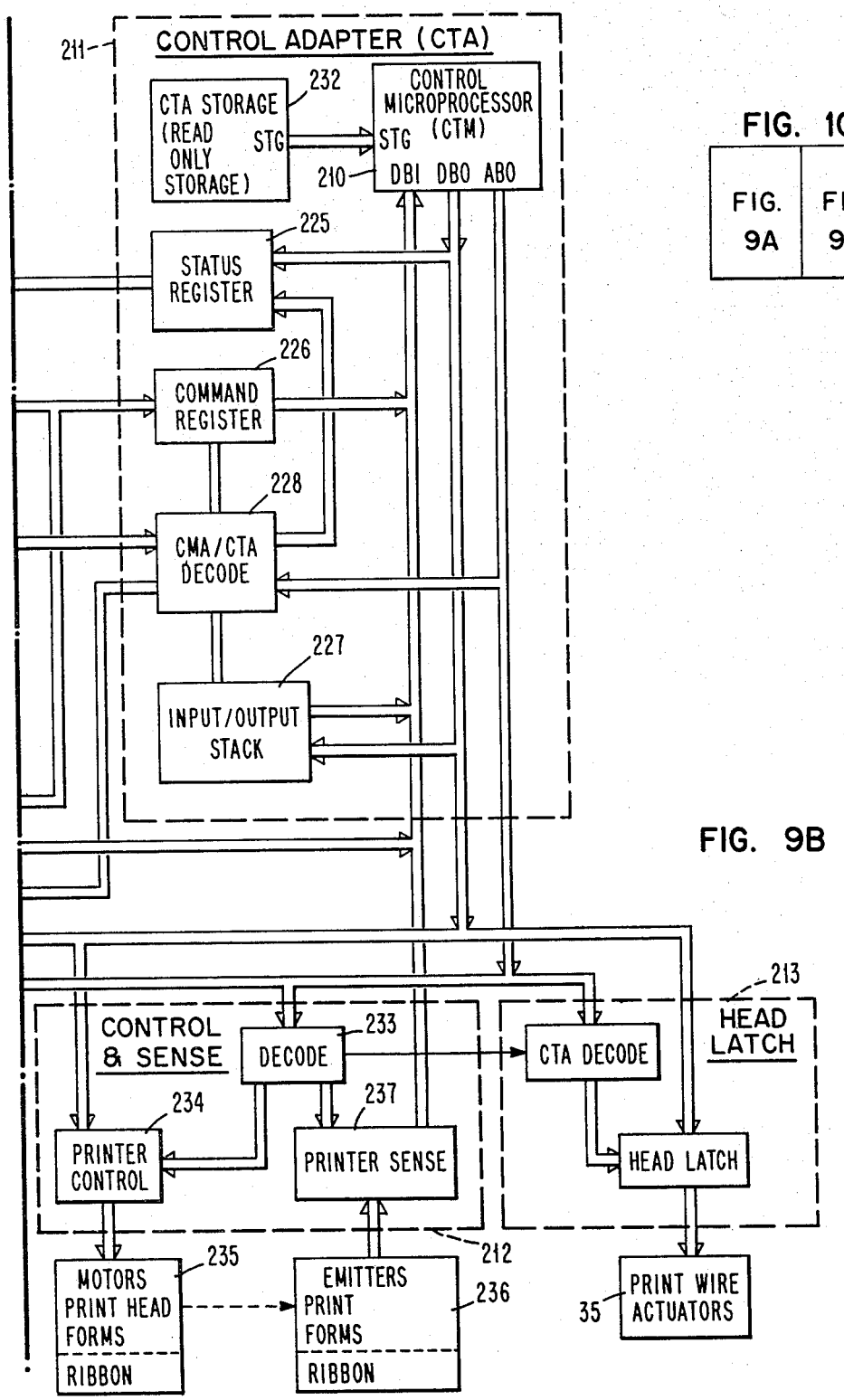

FIGS. 9A and 9B join together as shown in FIG. 10 to illustrate the details of the Printer Control Unit 3 and Electronics 4, FIG. 1. Various abbreviations used herein are listed in Table III below:

TABLE III

| | |
|---|---|
| ABO | Address Bus Out |
| CMA | Communications Adapter Card |
| CTA | Control Adapter Card |
| CTL | Control |
| D | Data |
| DI | Data In |
| DBI | Data Bus In |
| DBO | Data Bus Out |
| HIG | Head Image Generator |
| MODE/OP | Mode/Operation |
| ROS | Read Only Storage |
| SAR | Storage Address Register |
| STG | Storage Bus In |

There are actually seven main blocks comprising the Printer Control Unit representing seven printed circuit cards. The first block is the Communications Interface 201 between the host system and digital printer electronics. That interface communicates with the Communications Adapter (CMA) 202 which is a microprocessor card that takes the host information and compiles it into a form that can be used by the rest of the printer. The CMA includes Communications microprocessor CMM 200. From there, the information is passed on to the Head Image Generator 220 card for building images for the printer. There is another microprocessor card that is the Control Adapter Card (CTA) 211. The CTA includes Control microprocessor CTM 210. The Control Adapter handles the processed information from the Communications Adapter, controls all the mechanical elements of the printer, such as the motors, and receives emitter signals indicating positions of the mechanical elements. This Adapter handles communication with the actual hardware through the Control and Sense card 212 and the Head Latch card 213 that stores the data to be outputted to the wire actuators.

Within the Communications Interface are two blocks. One is the Interface Control block 203; the other is the Interface Storage block 204. The Interface Control block 203 interprets the information coming from the host system in an analog signal form, processes it into digital form, and generates the necessary timing signals to be able to store this information in the Interface Storage 204. The Interface Storage 204 is a Functional Storage Unit (FSU) random access memory which is sized at one K (1K) bytes. All data and commands from the host system go into this Interface Storage; it acts as a buffer for the Communications Adapter 202. Within the Communications Adapter card, there are five blocks. There is the Communications microprocessor 200 (CMM) and its corresponding storage 205 designated "A" which includes both random access memory and read only storage (ROS). There is a Mode/Op Panel and Sense block 206 that can read the panel 26, a Mode Op Panel Output block 207 to output displays to the panel, and Decode Logic 208 for these functions. The Communications Adapter 202 translates the information that the host has sent over through high-level or hand-shaking type procedures and translates it into much more simple terms such as characters to be printed or carriage returns, or line feeds—any other mechanical type control that needs to be performed. Its program is stored in the Read Only Storage (ROS) of the CMA "A" storage. There are 6K bytes in this ROS. The CMA also handles Hardware Operator commands involving printing the printer on-line, taking it off-line and displaying any type of status information through the display on the Mode Operator Panel 26.

The Communications Storage card 215 has two blocks entitled CMA Storage "B" designated 216 and Head Image Generator (HIG) Storage 217. Storage "B" block 216 contains up to 14K bytes of ROS storage in FSU technology for the Communications Adapter microprocessor 200. The random access memory storage 217 has 3K bytes for the Head Image Generator and is where the Communications microprocessor stores character images to be printed. The character images in this storage are used by the Head Image Generator to generate actual images for the slanted heads. Also, in the block of Random Access Memory are two text buffers and some scratch pad storage.

Because of the staggered slant geometry of the print head assembly and the multiple head configuration, a fairly complex Head Image Generator 220 (HIG) is required to convert conventional character dot format to a slanted format. HIG processes the character images as they would normally appear in a "straight-up" format, but slants them for the Head Latch block 213 to supply to the print wire actuators. This is done through hardware routines that are performed in the Head Image Generator 220. There are basically two blocks in the Head Image Generator, one block being the Control block 221 that actually performs the hardware routines to take the unslanted image and slant it. There is also a Data block 222 that is a small storage unit in which the Head Image Generator stores the slanted information currently being worked on. The Control Adapter 211 can then read this storage and output to the wire actuators through Head Latch 213. This is the slanted data.

The Control Adapter (CTA) 211 has six blocks within it. The Control microprocessor (CTM) 210 receives inputs from various sensors, e.g., ribbon reverse/jam, forms jam, head position, linear encoder, forms position encoder, as well as print commands and data from CMM 200 and HIG 220 and generates print wire firing signals and various control signals to control the ribbon drive, print head drive, print wire actuators, and forms drive. The Control microprocessor (CTM) 210 has a ROS storage 232 that is 12K bytes of FSU ROS to contain its programs or routines. Certain communication registers including Status register 225 and Command register 226 allow the Communications Adapter 202 and the Control Adapter 211 to communicate with one another. Through these registers go commands such as Print commands, Forms commands, Carriage Returns, and the actual decoded messages that the host has sent over. An Input/Output stack 227 is used as a local storage, that is, it is a small random access memory for the Control Adapter to store intermediate data and there is some associated decoding. The Decode block 228 handles the timing relationships for the Communications Adapter and Control Adapter to be able to talk to one another asynchronously.

The Control and Sense card 212 handles the information from the Control Adapter card 211 and interfaces with the actual printer electronics to control by way of Decode block 233 and Printer Control block 234 the head motor, the forms motor, and the ribbon motors represented by block 235. Through blocks 236 and 237 it senses the positional state of printer electronics and mechanics such as the print emitters, forms emitters, etc.

The Head Latch card 213 is another interface card from the Control Adapter that latches up the wire image data, the slanted data that is received from the Head Image Generator 220, and outputs it at the correct time to the print wire actuators so that the dots get printed in the correct place on the form.

A typical print operation is now described. It is assumed that a single print line is provided by the host with a Forms Feed and Carriage Return at the end which is a typical situation. This information comes over in a serial stream from the host as analog signals into the Communications Interface 201 which digitizes the analog signal and stores it in its Interface Storage 204 in the form of characters to be printed. A command informs the Communications Adapter 202 that this is a line to be printed and that it has Line Feed and Carriage Return commands. The Communications Adapter 202 seeing this information appear, will take the characters to be printed out of the Interface Storage 204 and put them into a selected text buffer in CMA Storage "B" on Communications Storage card 215. It then tells the Control Adapter 211 that it has information in a text buffer to be printed.

The Control Adapter, after receiving the information initially tells the Head Image Generator 220 (HIG) that there is data in the selected text buffer that needs to be slanted. Head Image Generator 220 then slants this information, while the Control Adapter card 211 starts the printer in motion; that is, it starts moving the print head carrier 31. It moves the carrier through commands given to the Control and Sense card 212, and it looks for print emitters, or emitters which tell the Control Adapter when to fire wires; it checks for these signals coming from the Control and Sense card. When these signals appear, the CTM retrieves the slanted wire information from the HIG, passes it to the Head Latch card 213 and fires the wires to print dots. The Control Adapter 211 for each print emitter that it sees, asks the Head Image Generator for a new set of slanted data. This is outputted to the Head Latch card 213 and is repeated until the entire text buffer has been printed, that is, all the information that the host sent over. Once the Communications Adapter 202 has seen that this has taken place, that is, the printing has been done, it passes the Forms command to the Control Adapter 211. Control Adapter 211 decodes this command and gives a command to the Control and Sense card 212 to move forms a certain number of forms emitters. It senses these forms emitters through the Control and Sense card again.

CONTROL MICROPROCESSOR (CTM) OPERATIONS

Figure 11:
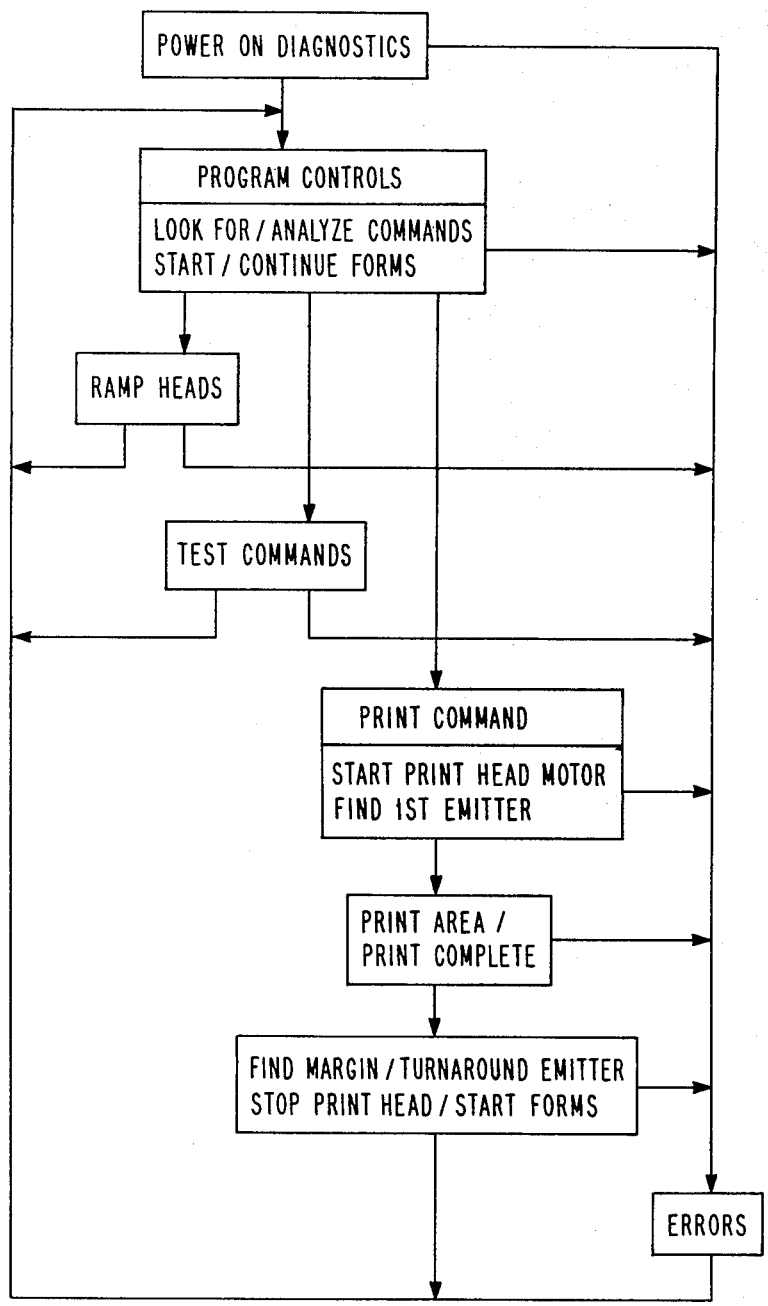
FIG. 11 is a generalized flowchart of the program routines for the Control microprocessor (CTM) shown in FIG. 9B.

FIG. 11 is an overall flowchart of the Control microprocessor 210 (CTM) operations. The CTM goes through Power On Diagnostics upon Power Up and then upon successful completion of that proceeds to Program Controls. The function of this is to look for and analyze commands from the Communications microprocessor (CMM) and start or continue forms operation. When a command is determined, if it is a Print Command, CTM starts the print head motor and looks for the first print emitter. Upon finding the first print emitter, CTM goes into the Print block and stays in that area printing the line of data until it reaches Print Complete representing complete printing of the line. Then CTM goes into the margin routines to find the margins or a turnaround emitter. Once the margins or the turnaround emitter are determined, CTM stops the print head, starts the forms and returns to Program Control to look for and analyze further commands. If CTM receives additional commands from the CMM, upon completion of the forms operation, it starts the next print operation. Out of any of these blocks, if an error is detected, CTM exits and goes into an error routine to determine what and where the error is. It notifies the CMM of the error. The CMM, based on the type of error, will either retry the command or stop the operation of the printer and notify the host.

As indicated, forms motion is controlled by the Control microprocessor and emitter changes occurring during forms motion are monitored to keep track of the extent of motion.

The extent of forms motion is determined by a preset number of emitter changes and the microcontrol program monitors the emitters to start and stop the forms motion at the proper time.

The Control microprocessor has other functions to perform besides controlling and monitoring forms motion. Certain characteristics of operation are the longest period of absence before it again returns to check forms movement will be no greater than a preselected number of forms feed emitter cycles, such as two. An emitter cycle is assumed, as an example, to be 150 microseconds. Therefore, the microprocessor could be absent to check other functions so long as it returns in approximately twice that time or 300 microseconds to recheck the forms feeding. Obviously, other forms of microprocessor timing relationships could be established, if desired.

Figure 13A:
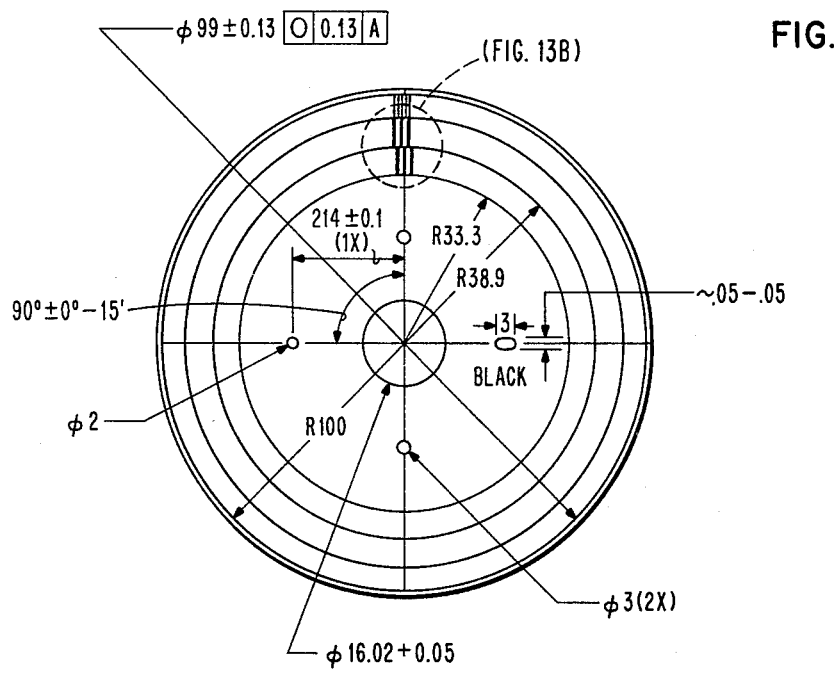
FIGS. 13A and 13B illustrate in a somewhat enlarged form an emitter design shown in FIG. 12.
Figure 13B:
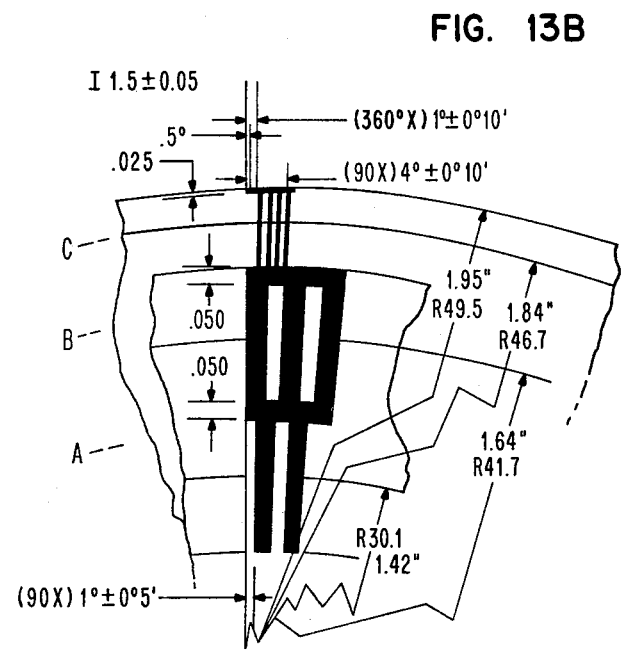

The emitter disk 47, FIG. 12, is attached to the shaft of the forms motor 23 and two emitter channels A and B, FIGS. 13A and 13B, are used during startup, normal driving and high speed driving (slewing) of the forms. The two emitters (A and B) are symmetrical and in quadrature, that is, they are 90° out of phase, FIG. 13B.

Forward motion is accomplished with the phase sequence
AB $\overline{A}$B $\overline{A}\overline{B}$ A$\overline{B}$ AB etc.
while reverse motion is accomplished by the sequence
AB A$\overline{B}$ $\overline{A}\overline{B}$ $\overline{A}$B AB etc.

Emitter signals back to the Control microprocessor 210 may be used to index a table in storage to determine which direction the forms moved and how far.

If no movement has taken place, then a 0 is present in the table. The forms may have moved +1 indicating one emitter forward, −1 indicating one emitter in reverse, and ±2 indicating two emitter transitions. A transition of ±2 emitters does not indicate in which direction the transition occurred. However, this information is known by the Control microprocessor 210 already and a proper determination of the direction may be made. After the Control microprocessor checks for the extent and direction of movement, it updates its tables to accurately reflect the present location of the forms.

As will be described in detail shortly, although they are monitored at all times, the emitters in Track C are utilized by the Control microprocessor only during stopping or slowdown procedures for forms feeding in conjunction with the Track A and Track B emitters to provide high resolution and a high degree of accuracy in positional control.

Track C emitters typically could occur at a millisecond rate about four times as rapidly as the rate for emitters A and B combined. Since the operation cycle time of the Control microprocessor 210 is typically in the order of 10 to 12 microseconds, the cycle frequency of the C track emitters would not allow the microprocessor to perform too many instruction operations between C emitter counting or checking operations.

However, the operating cycle of the A and B emitters is long enough that the Control microprocessor can perform a considerably larger number of instruction operations between A and B emitter checking operations.

The emitter arrangement herein is such that the A and B emitters are used most of the time to prevent the Control microprocessor from becoming emitter-bound. The C track emitters are used infrequently, only during slowdown and stopping of the forms when higher positional accuracy is required.

Figure 14:
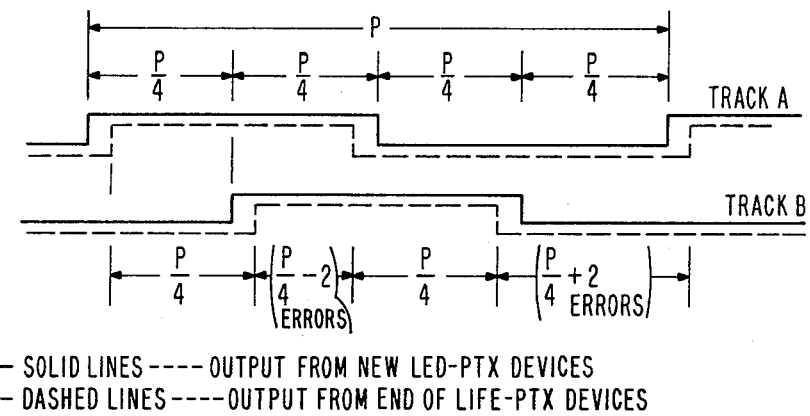
FIGS. 14 and 15 illustrate emitter waveforms developed during forms movement by the forms emitter assembly of FIGS. 12, 13A and 13B.
Figure 15:
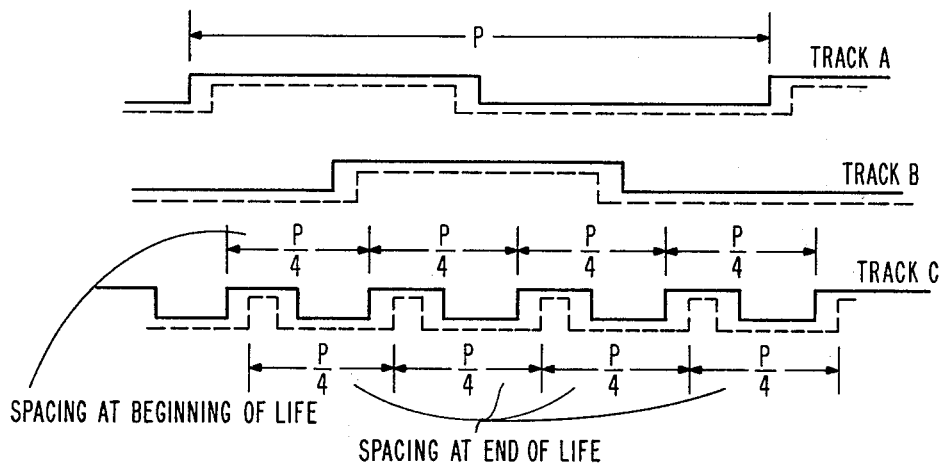
Figure 16:
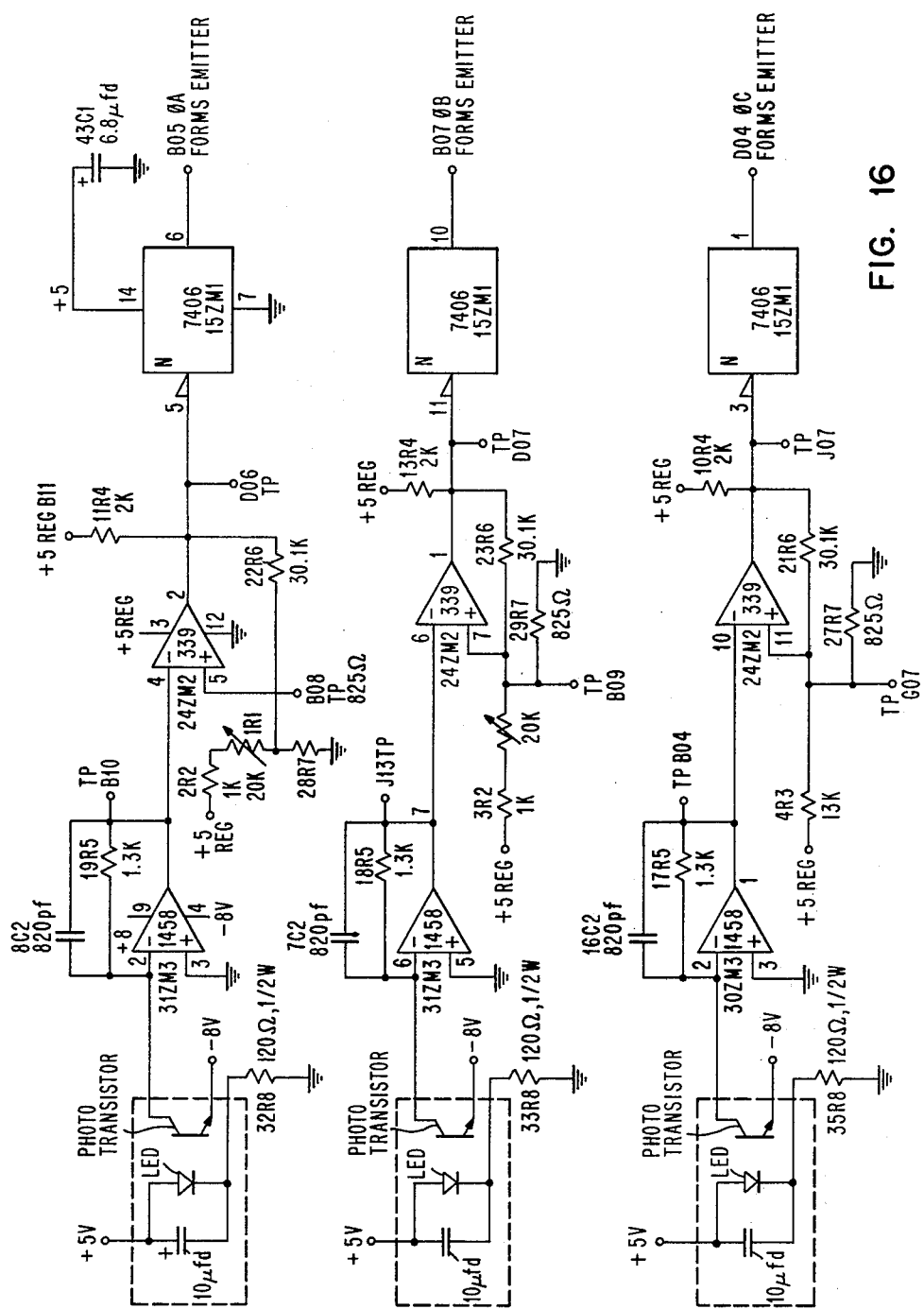
FIG. 16 represents forms amplifier circuits that are used in conjunction with the emitter assembly of FIGS. 12, 13A and 13B.

Another advantage of the use of the C track, three tracks including the C track vs. the two tracks, is that positional error due to aging of two different lighting diodes (LED's) and two different photo transistors (PTX's) is eliminated. Reference is made to FIGS. 14, 15, and 16.

A forms emitter using only two tracks such as the A and B emitter tracks produces waveforms as shown in FIG. 14. Aging only causes a relative shift of the output pulses. But spacing itself remains constant from pulse to pulse.

When the emitter elements are new, the distance between consecutive pulses amounts to P/4.

At the end of life, there appear three distinct spacing P/4, (P/4)−2 errors, (P/4)+2 errors.

The errors are basically caused by the aging of the LED's which results in a reduction in the edges or positions of the pulses. The leading and trailing edges shift in opposite directions, thereby doubling the error.

The simplest solution for eliminating the error caused by the shift in leading and trailing edges is to double the number of pulses (reduce P to P/2) and use only leading or trailing edge. This is ordinarily not feasible because the microprocessor would be overloaded with monitoring required for the emitter data coming at twice the rate as for the A and B track emitters individually.

The problem is solved by adding the third track C which is used only in the lower speeds, where single stepping is required. During regular operation, tracks A and B maintain count of the number of emitter steps, direction of rotation of the emitter and thus direction of movement of the forms.

FORMS AMPLIFIERS

There are three form amplifier circuits, FIG. 16, each circuit comprised of a light emitting diode (LED), a detector, a linear amplifier (1458), and adjustable comparator (LM 339) and a Transistor-Transistor Logic (TTL) line driver (7406). When the light from the LED is incident on the photo transistor, current flows across the photo transistor. This current is impressed upon the negative terminal of the linear amplifier (1458). The voltage appearing at the output of the linear amplifier is determined by the relationship $Vout = I_{in} \times R_2$. In this amplifier the value of $R_2$ is 1.3 Kohms and $I_{in}$ is the photodetector current. Since the minimum output current from the phototransistor is specified to be 1 milliampere (ma), the output of the amplifier should have a 1.3 Volt minimum signal swing. An 820 pf capacitor is placed across the load resistor for stability.

The output of the amplifier 1458 is fed into the negative input of the comparator (339). The positive input reference is determined by a voltage divider network 2R2, 1R1, and 28R7 and by a feedback resistor 22R6 from the output of the comparator. The reference voltage is adjusted via the 20 KΩ potentiometer 1R1, and can vary from 0.3 Volts to more than 2.0 Volts. Hysteresis of approximately 0.1 Volts is generated by 22R6, the 30.1 KΩ resistor. This hysteresis is used to prevent the output of the comparator from oscillating on slow rise and fall transistions of the input wave.

The output of the comparator directly drives the TTL module (7406). Pullup current for the input of the TTL module is provided by 11R4, a 2 KΩ resistor to +5 Volts. The output of the TTL module is capable, at its collector, of a maximum sink current of 40 ma and a maximum voltage of 30 Volts.

REGISTER UTILIZATION

Figure 17:
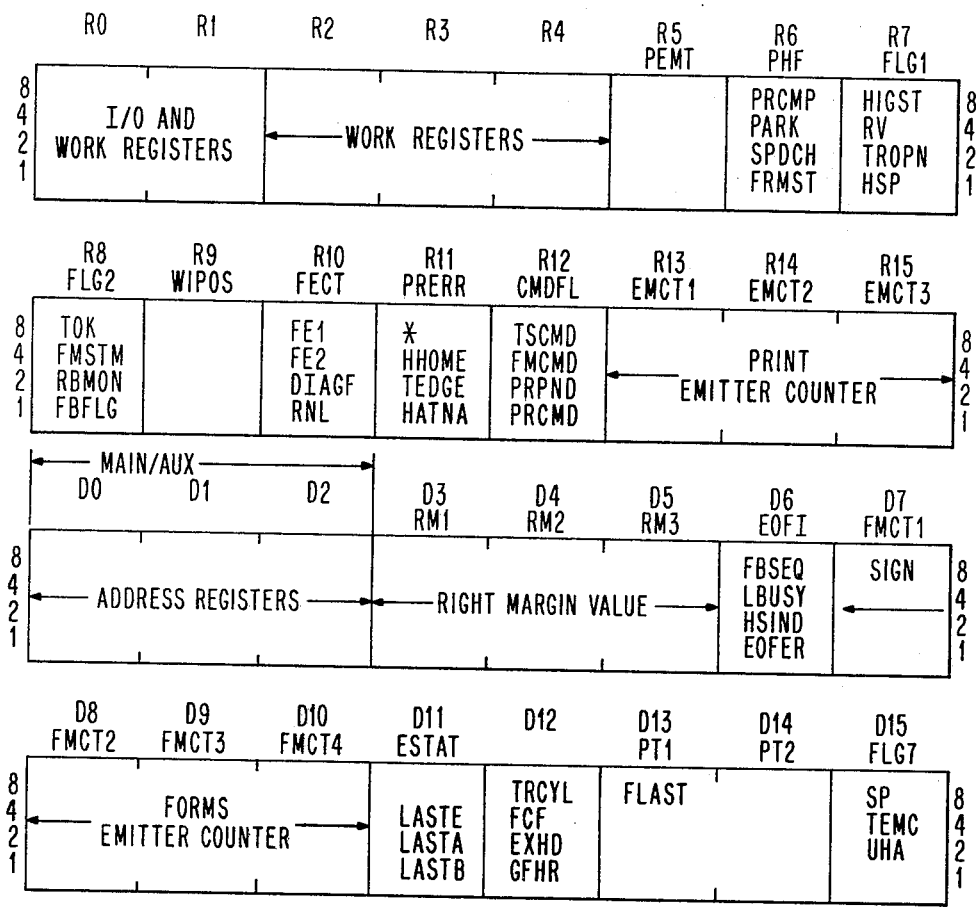
FIG. 17 shows the utilization of registers in the Control microprocessor.

FIG. 17 shows the assignment of the thirty-five registers in the Control microprocessor. These include input-/output and work registers and a number of registers that accommodate various flags for indicating conditions during operation of the printer subsystem. Register R6 includes a flag indicative of a forms start (FRMST). In addition, register R8 has a flag indicative of a forms timing test (FMSTM). Register R12 includes a flag indicative of a forms command (FMCMD). Register D6 includes various flags concerned with Forms Sequence and Busy Last Time as well as a High Speed indication and an End of Forms indication. Register D7 is combined with Registers D8, D9, and D10 to serve as the forms emitter counter. The sign bit in register D7 indicates the direction of forms movement. Register D11, which is a status register, includes the transition state of the end-of-forms (E) and the A and B emitters. Register D12 includes a forms complete flag (FCF). Register D15 has a bit location which indicates transition of emitter C on the forms emitter. This is designated TEMC.

INPUT/OUTPUT SIGNALS

FIG. 18 illustrates various input and output signals that are encountered during operations of the printer subsystem, and of particular interest are some of the forms signals shown. The expression FORMS/FRMIO/'B3' indicates signals that are received by the Control microprocessor from the forms servo amplifier card indicative of various conditions on the card. In some cases, these signals come from the Control and Sense card as well. The signal indications in order are Forms Busy, End of Forms Emitter, Forms Emitter A, Forms Emitter B, Run, High Speed, Forward, and Detent. Signals going out from the microprocessor to the Control and Sense or the Servo Amplifier card include Run, High Speed, Forward, and Detent.

FORMS FEED TIMING DIAGRAMS AND ROUTINES

Figure 19A:
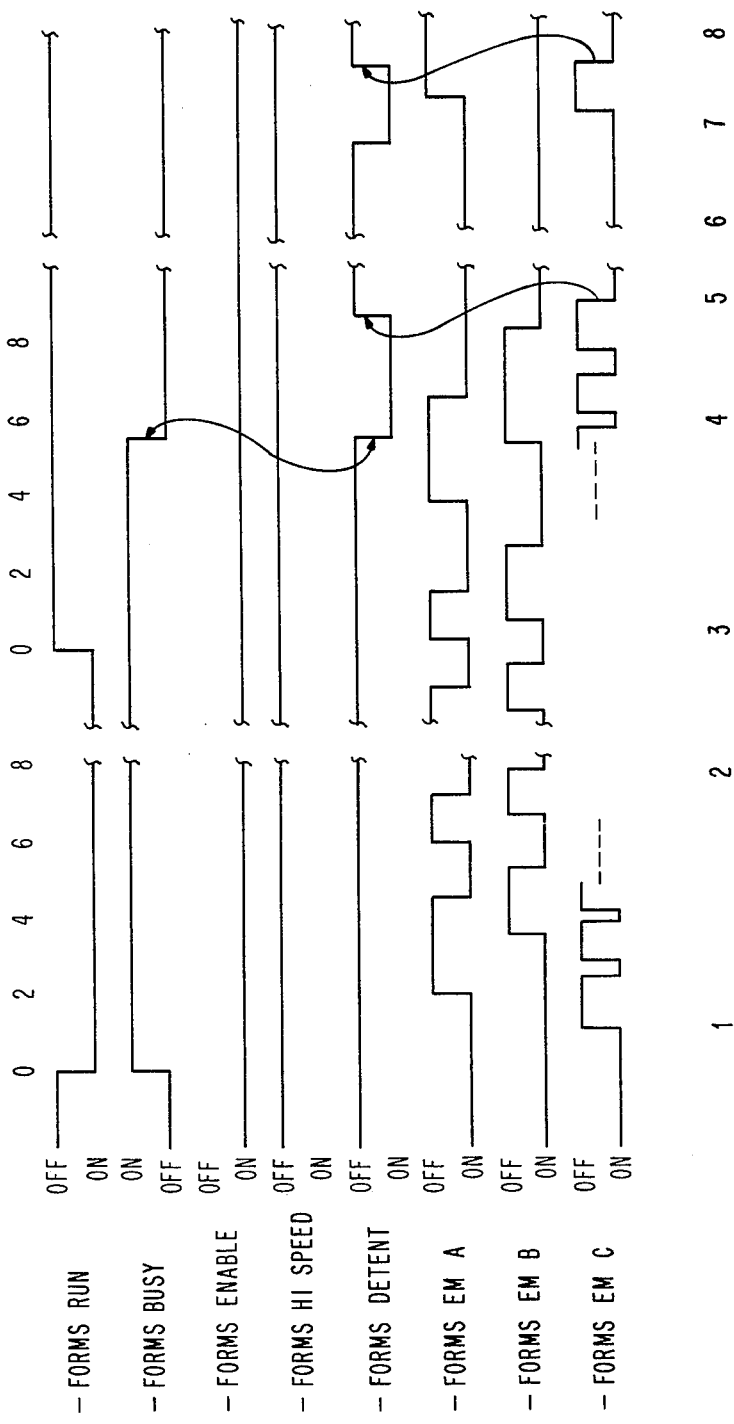
FIGS. 19A and 19B are timing diagrams.
Figure 19B:
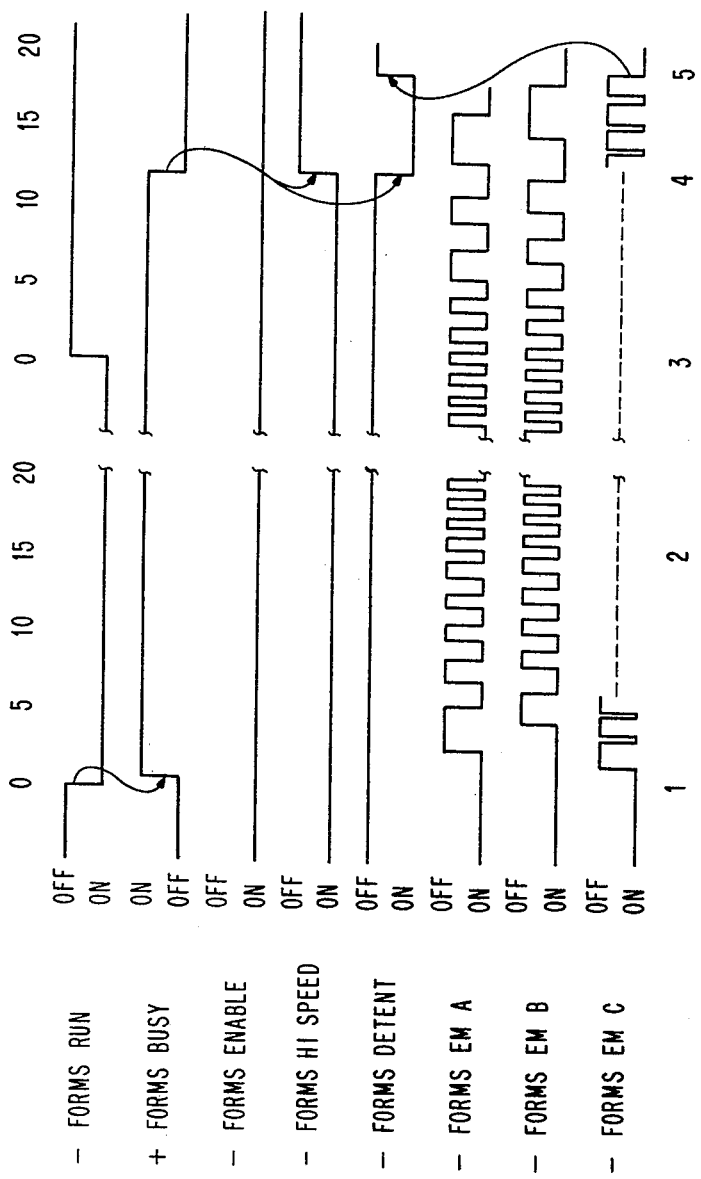

FIG. 19A is a timing chart for low speed operation of the forms feed, while FIG. 19B is a timing chart for high speed operation of the forms feed. The Detent mode is used when less than 10 emitters worth of movement are required and no timing chart is shown for that since the timing requirements are not as complex as for the low speed and high speed operations.

Figure 20A:
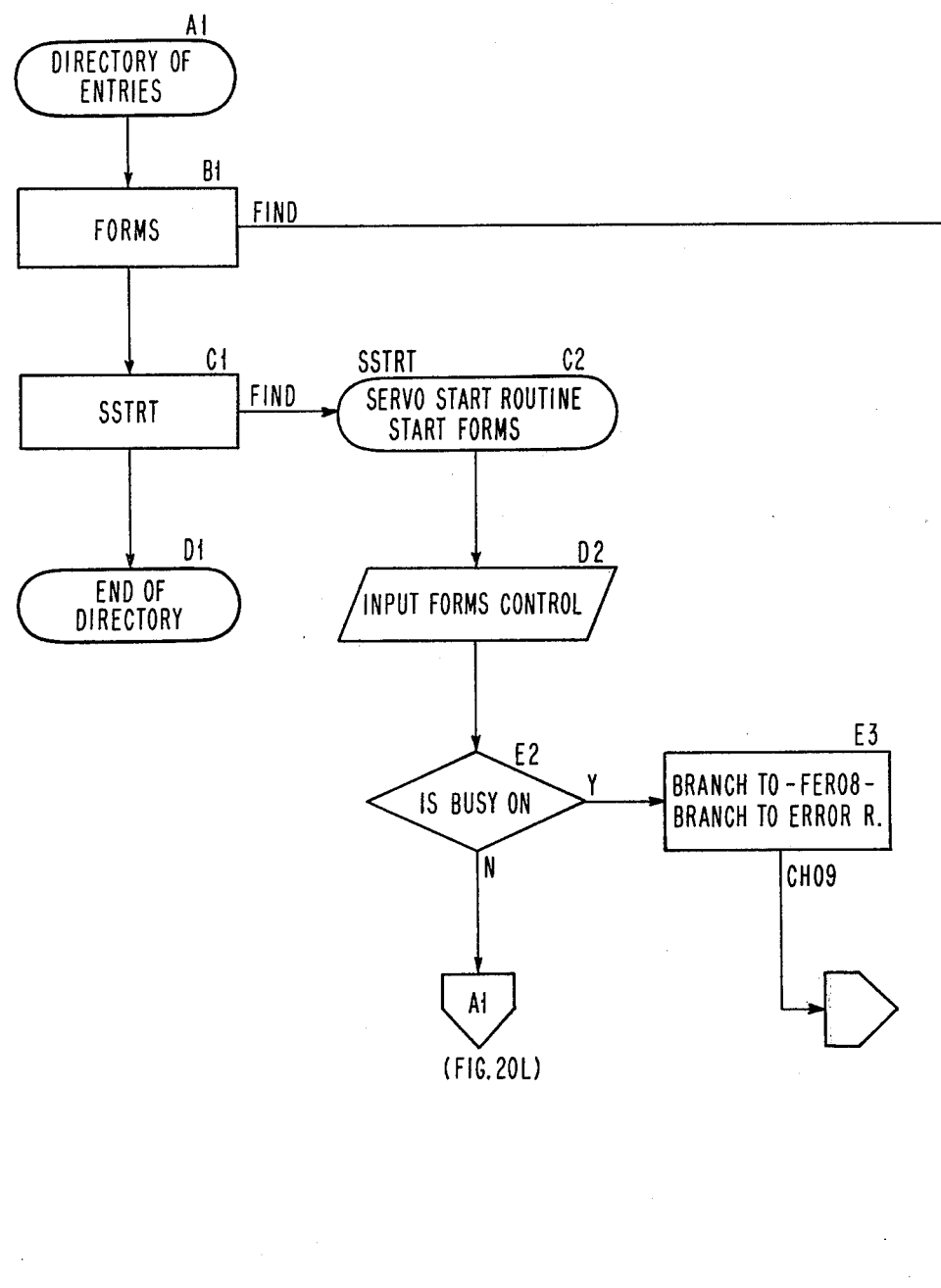
FIGS. 20A-20N, when arranged as shown in FIG. 21, represent a flowchart showing the initiation of a Forms Command, starting of the forms servo motor in proper direction and speed and adjustment procedures based on comparison of present and previous emitter states.
Figure 20B:
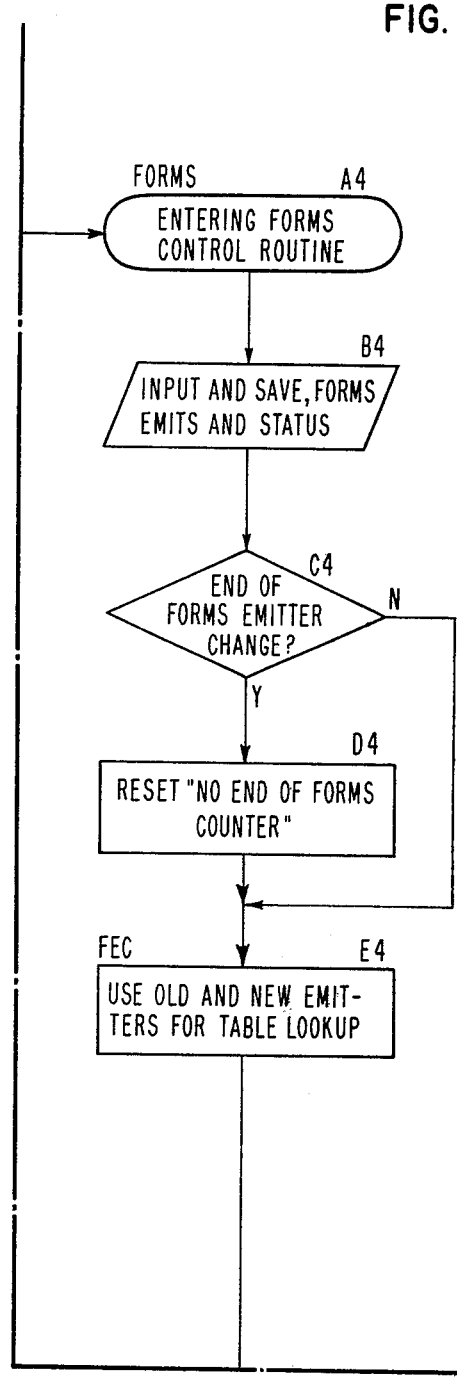
Figure 20C:
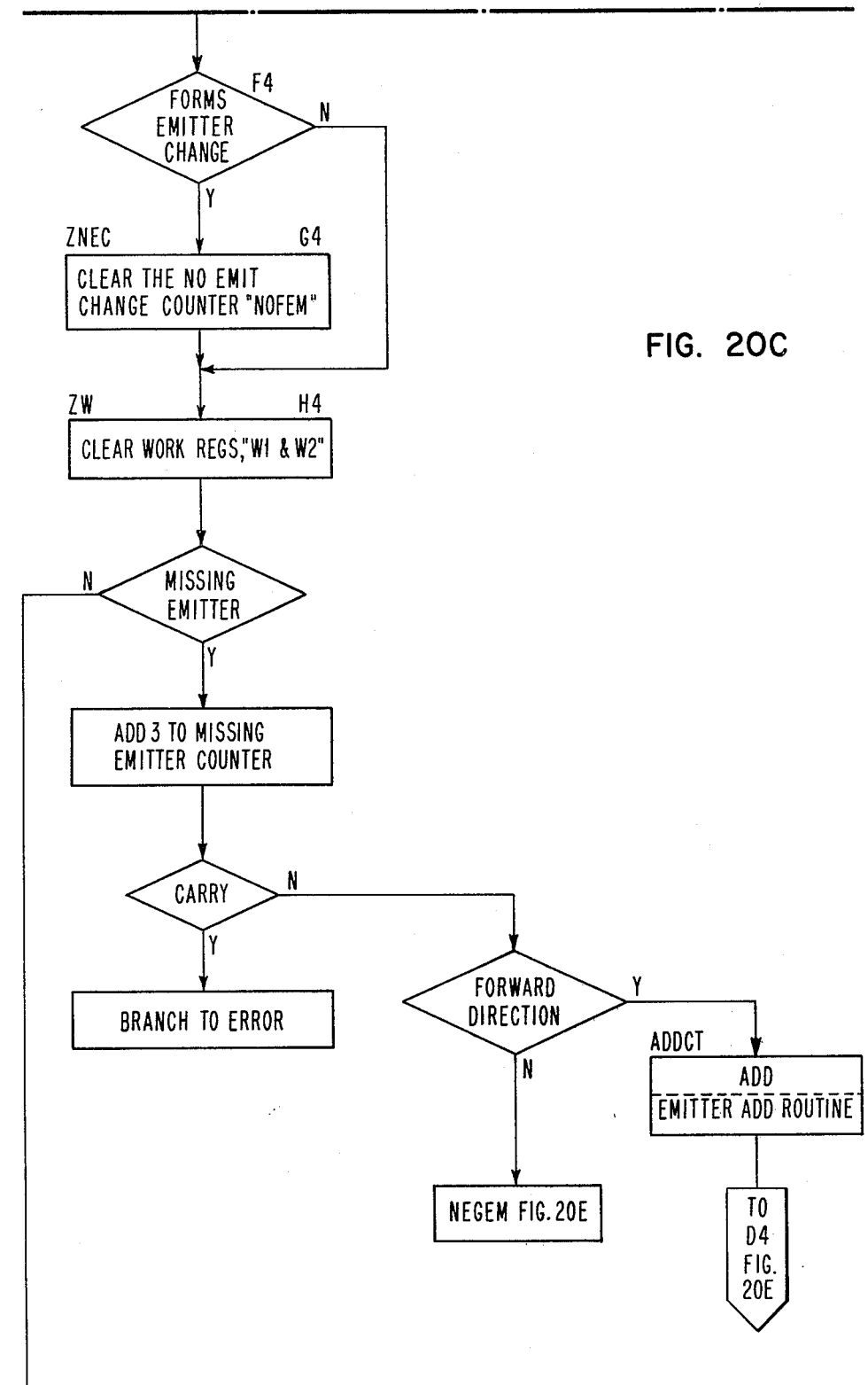
Figure 20D:
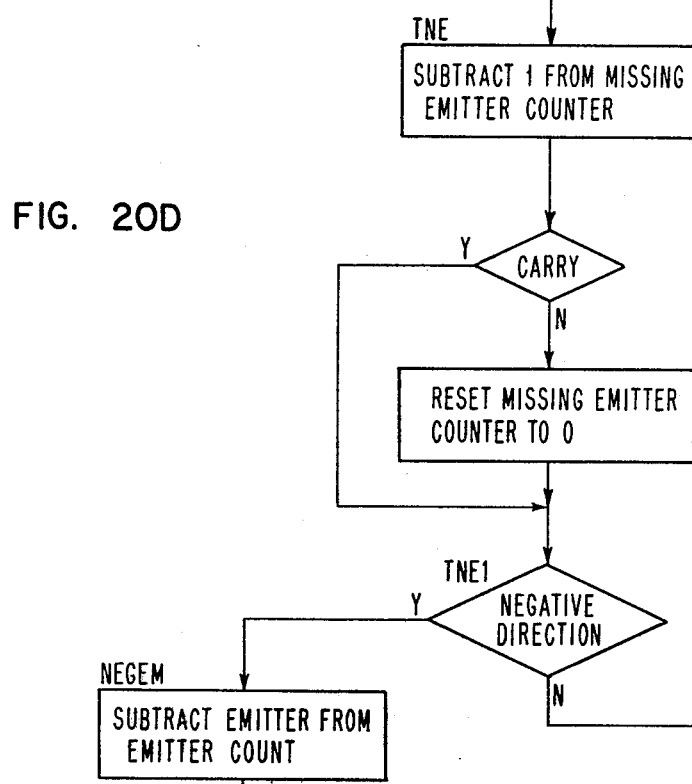
Figure 20E:
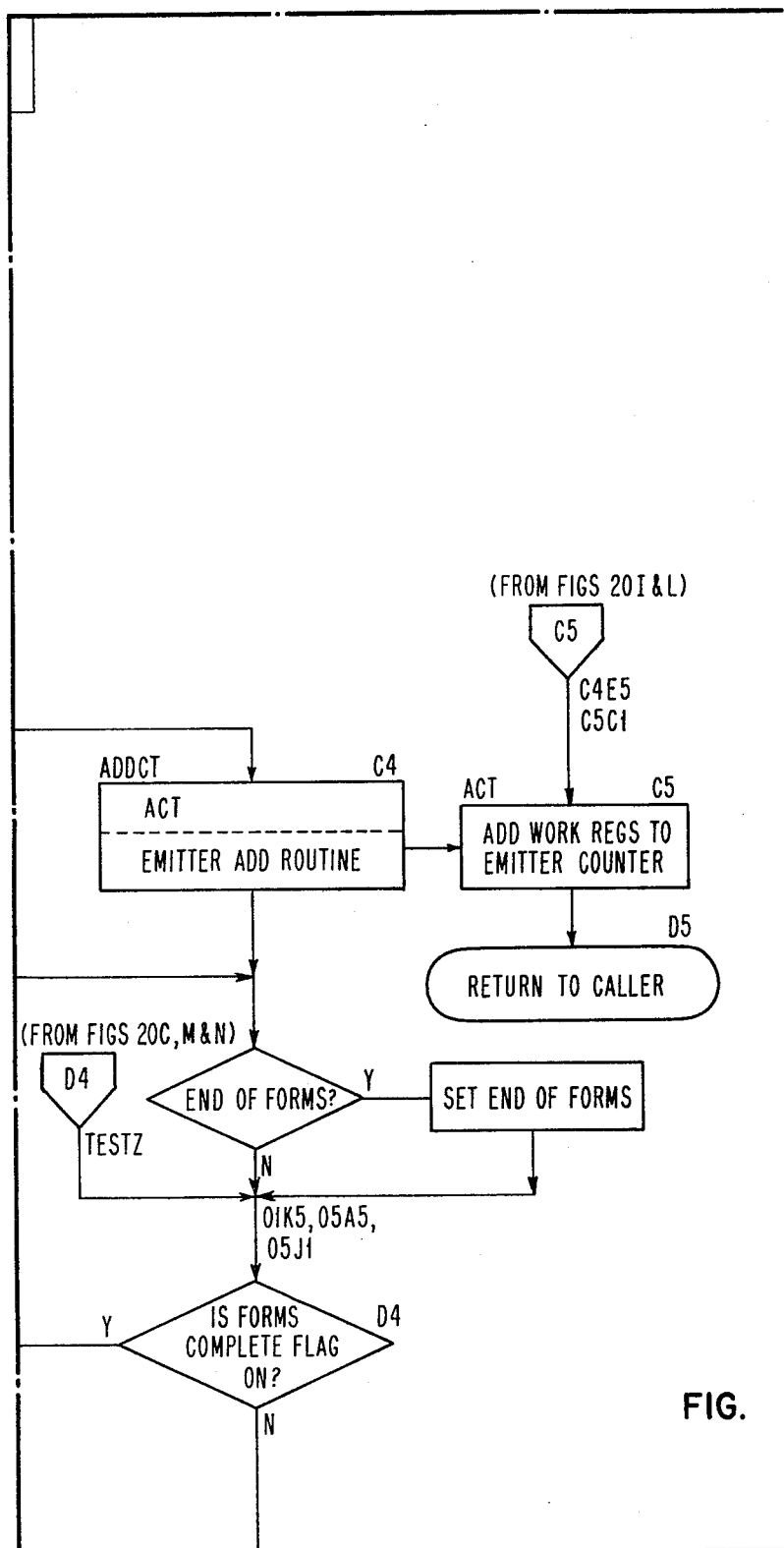
Figure 20F:
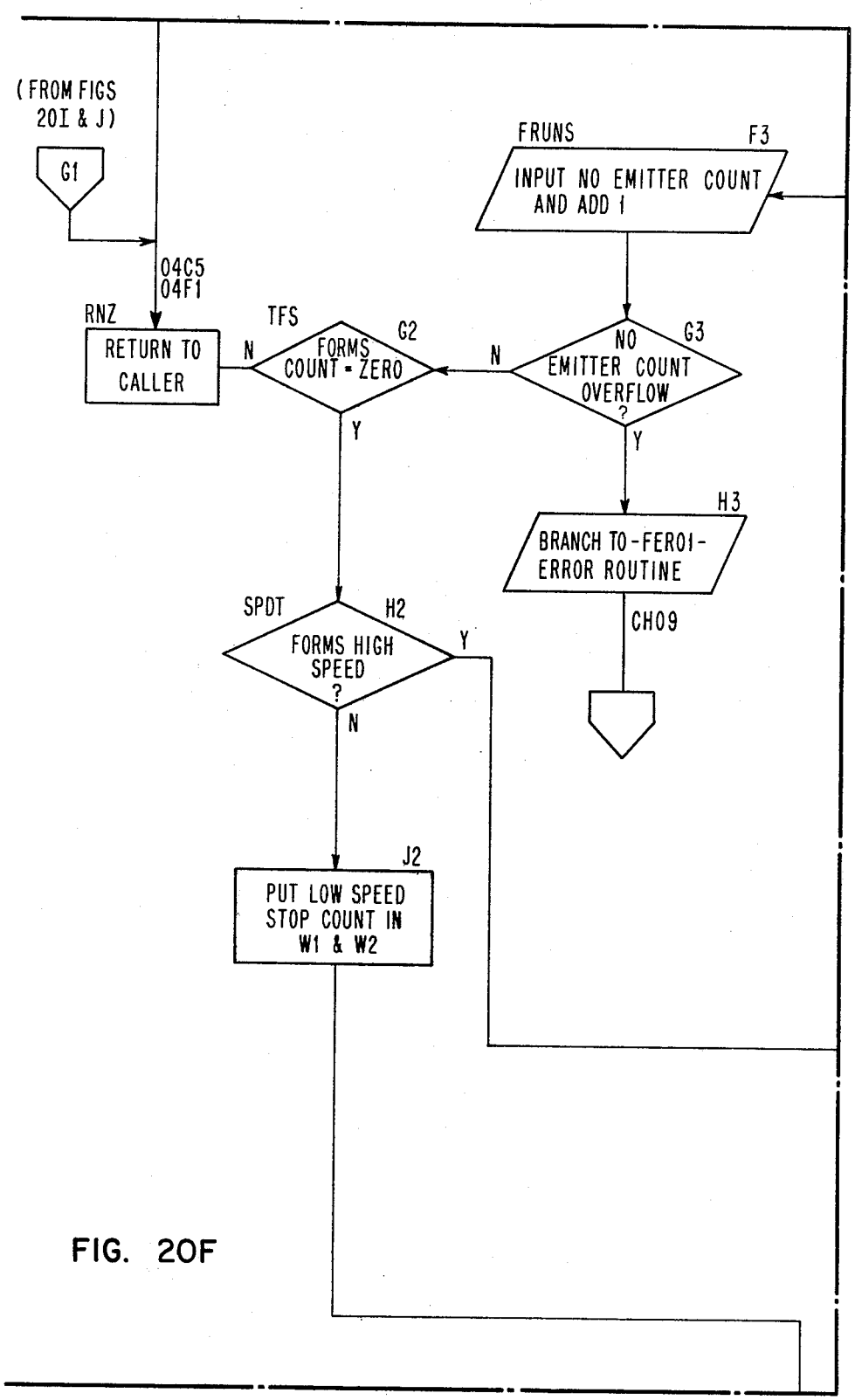
Figure 20G:
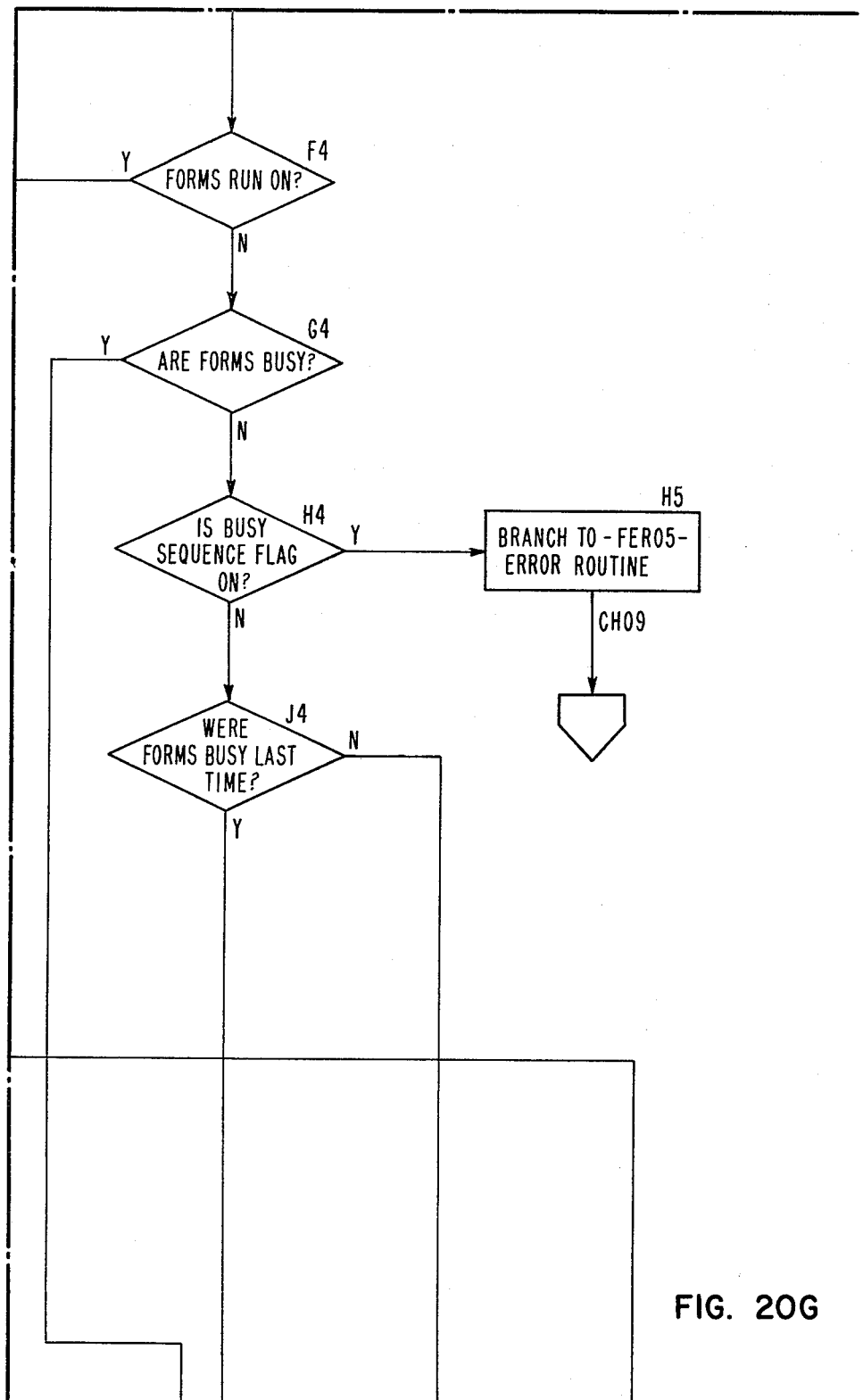
Figure 20H:
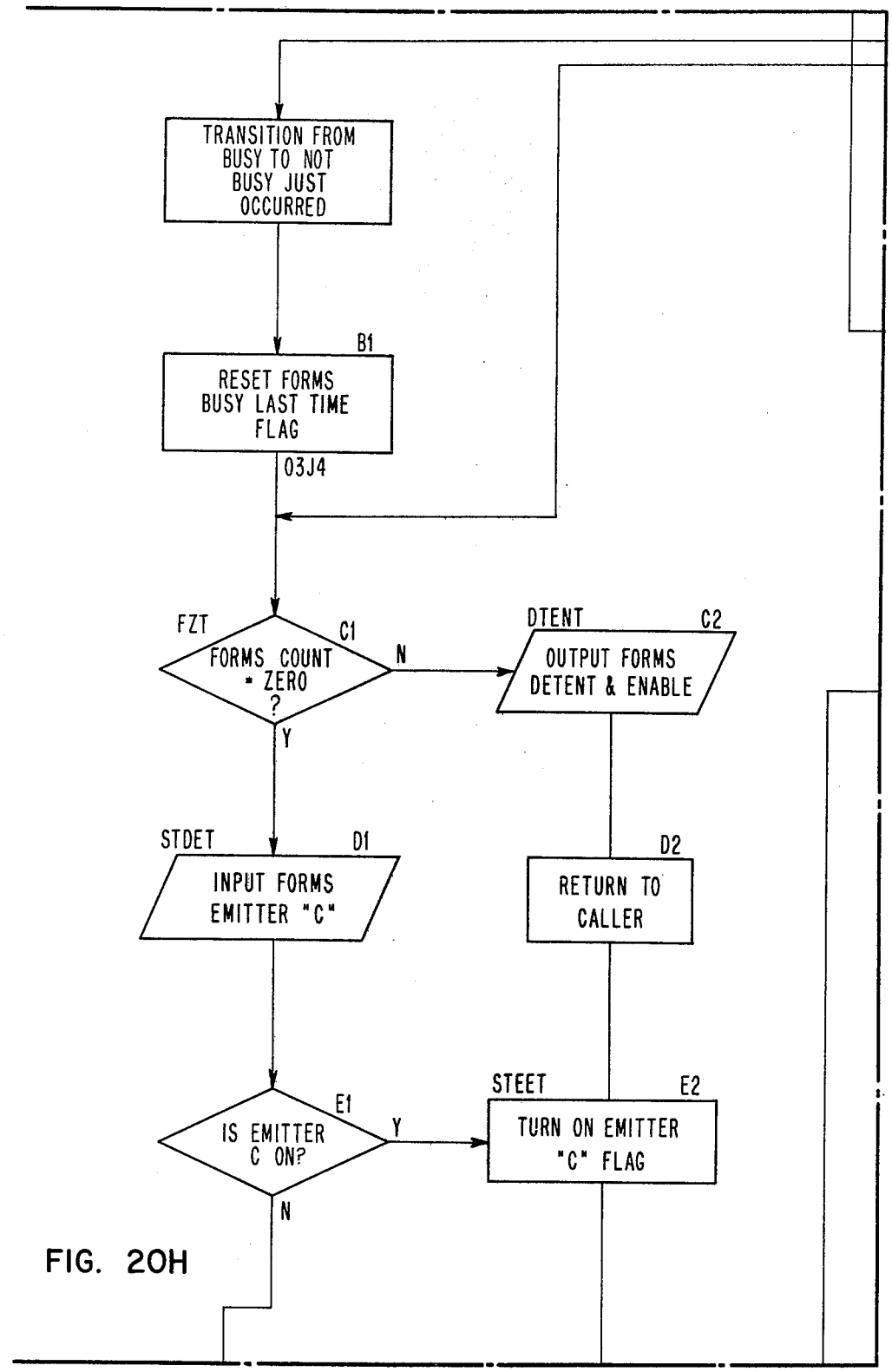
Figure 20I:
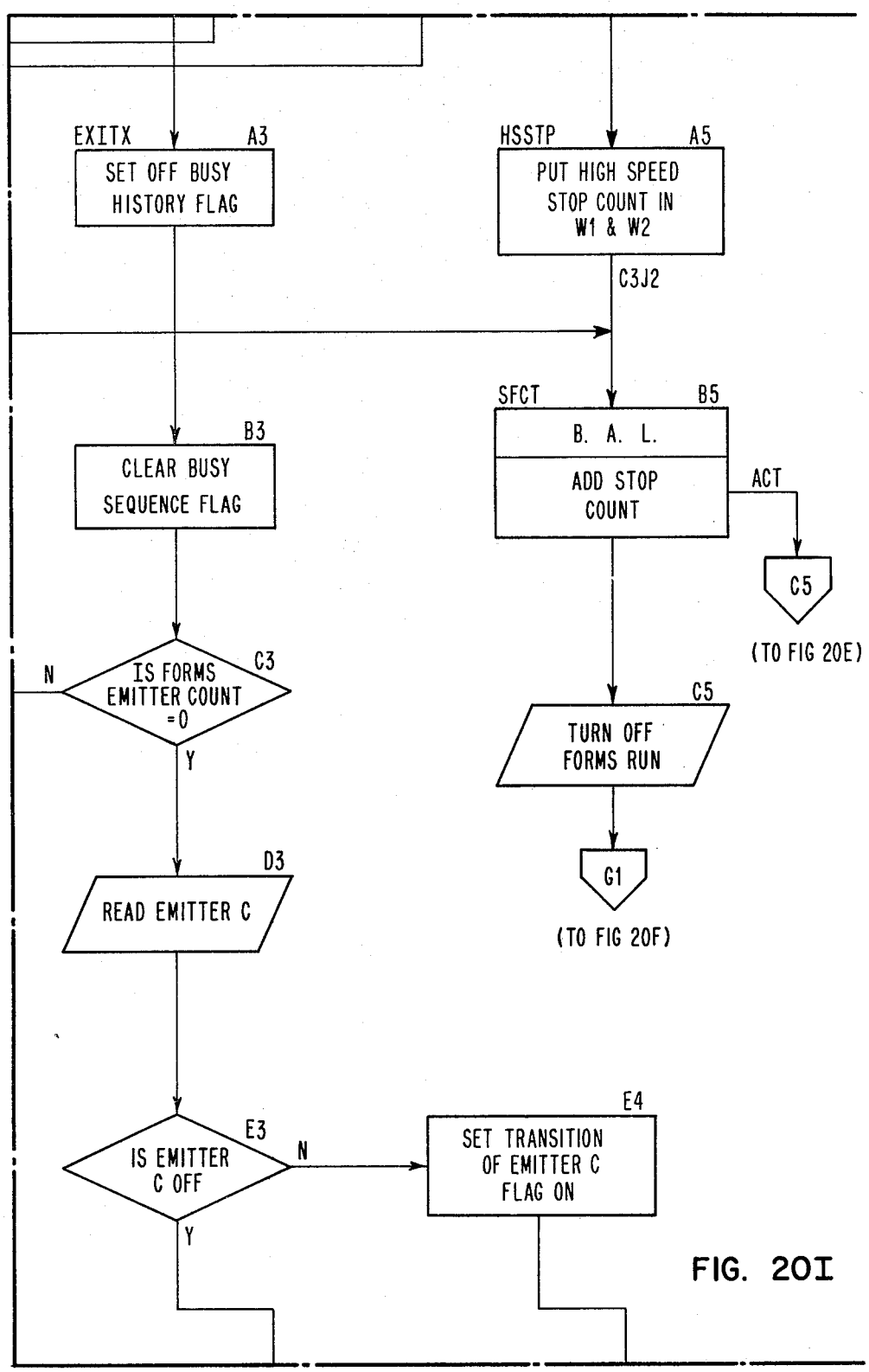
Figure 20J:
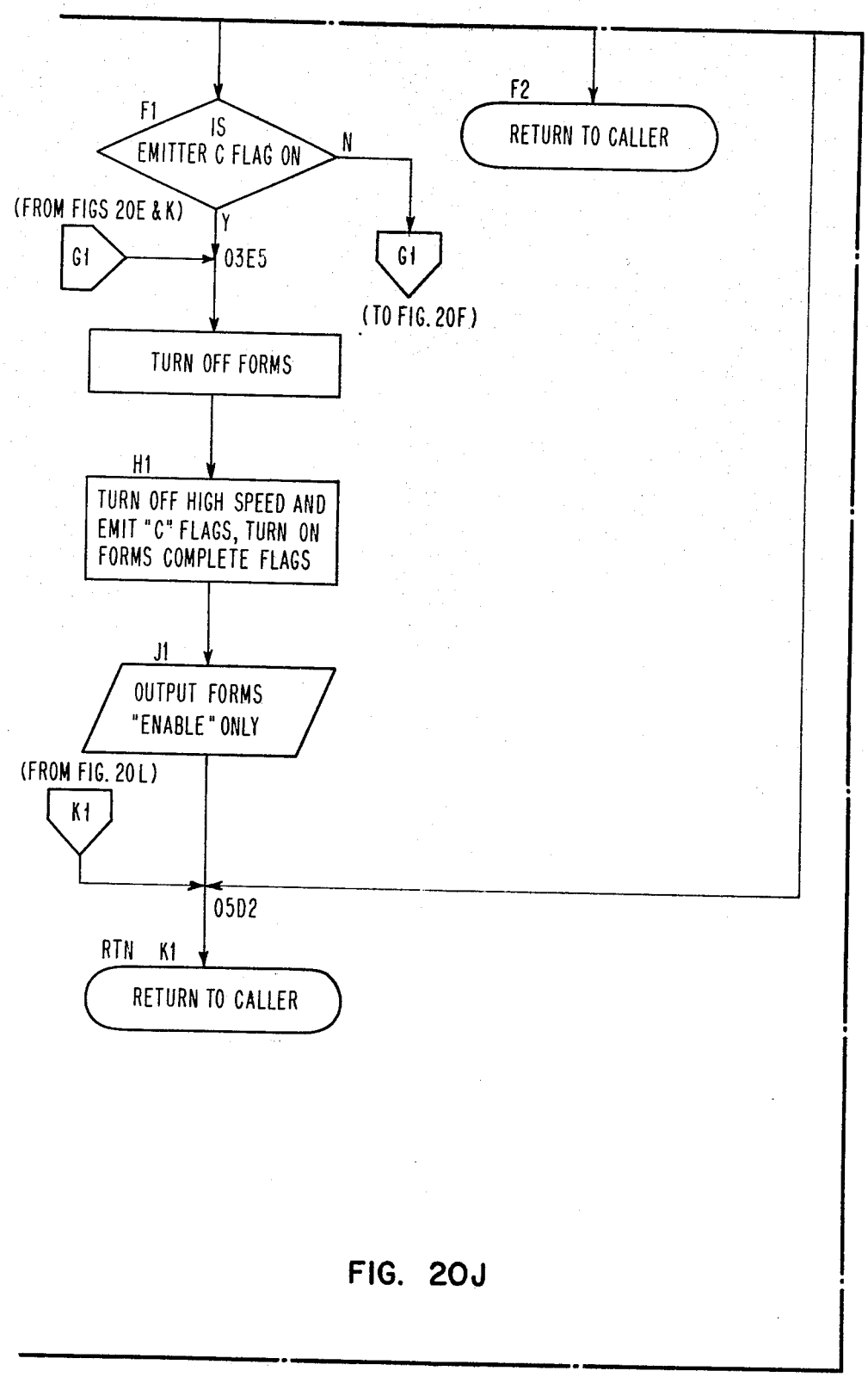
Figure 20K:
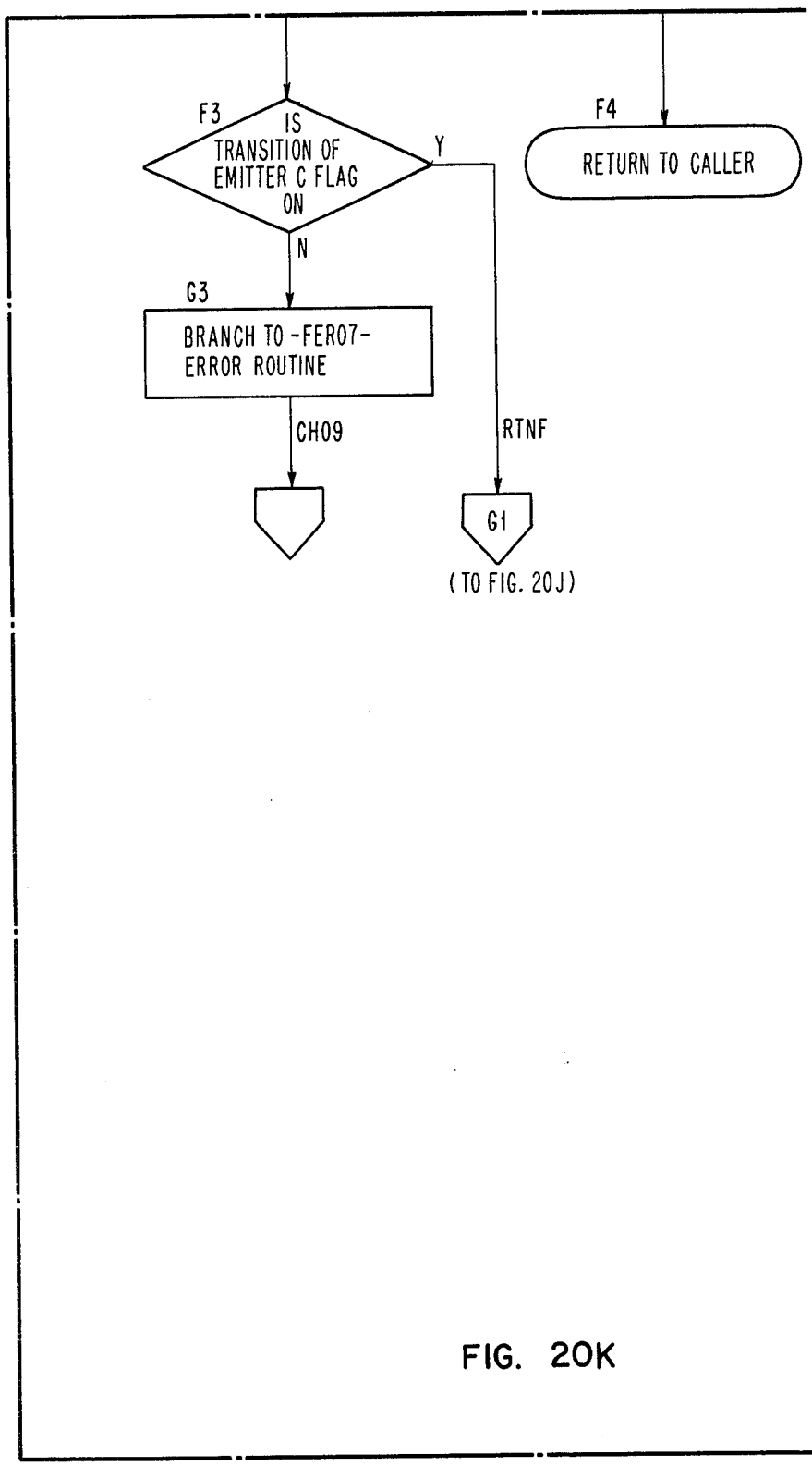
Figure 20L:
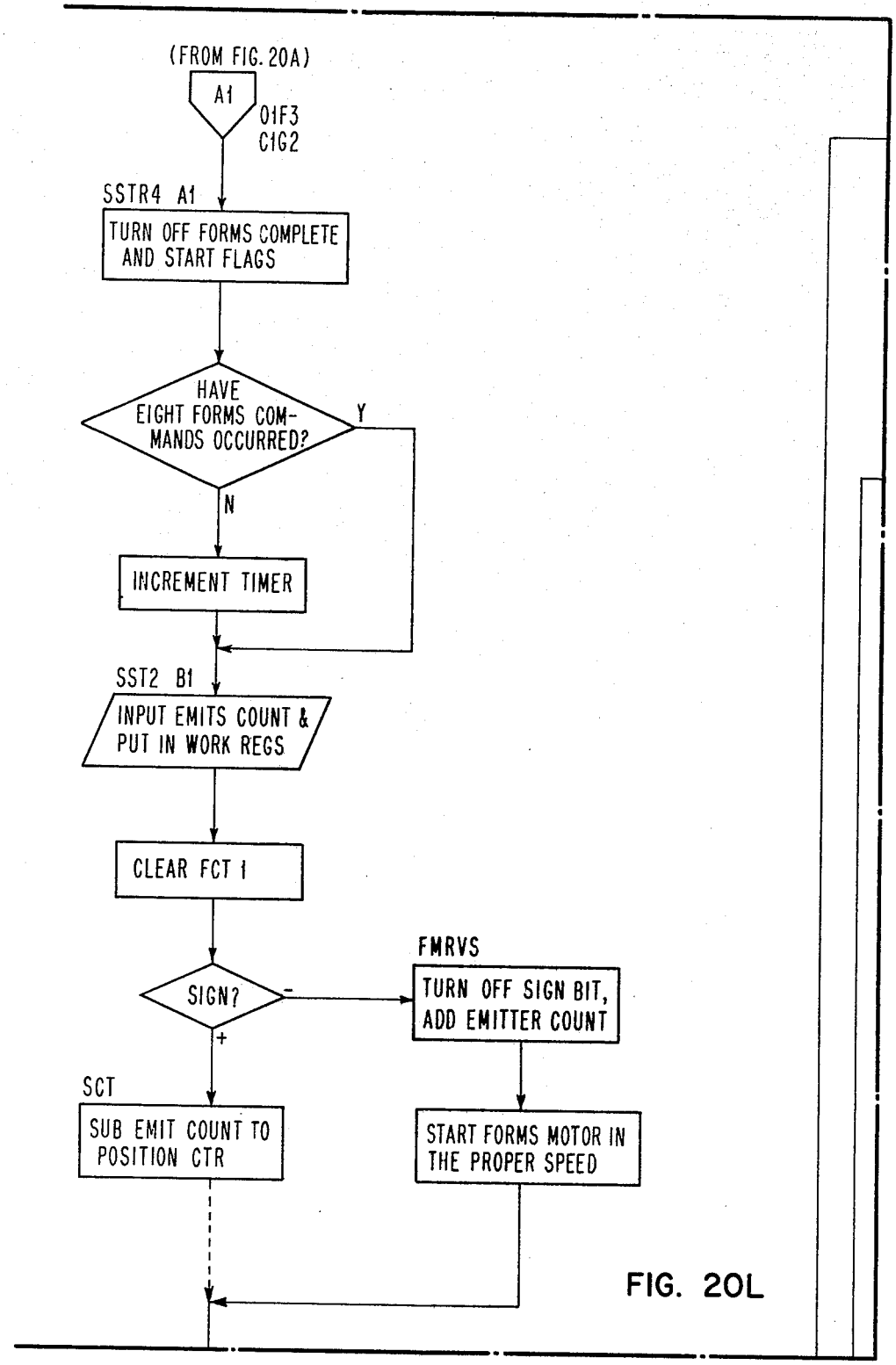
Figure 20M:
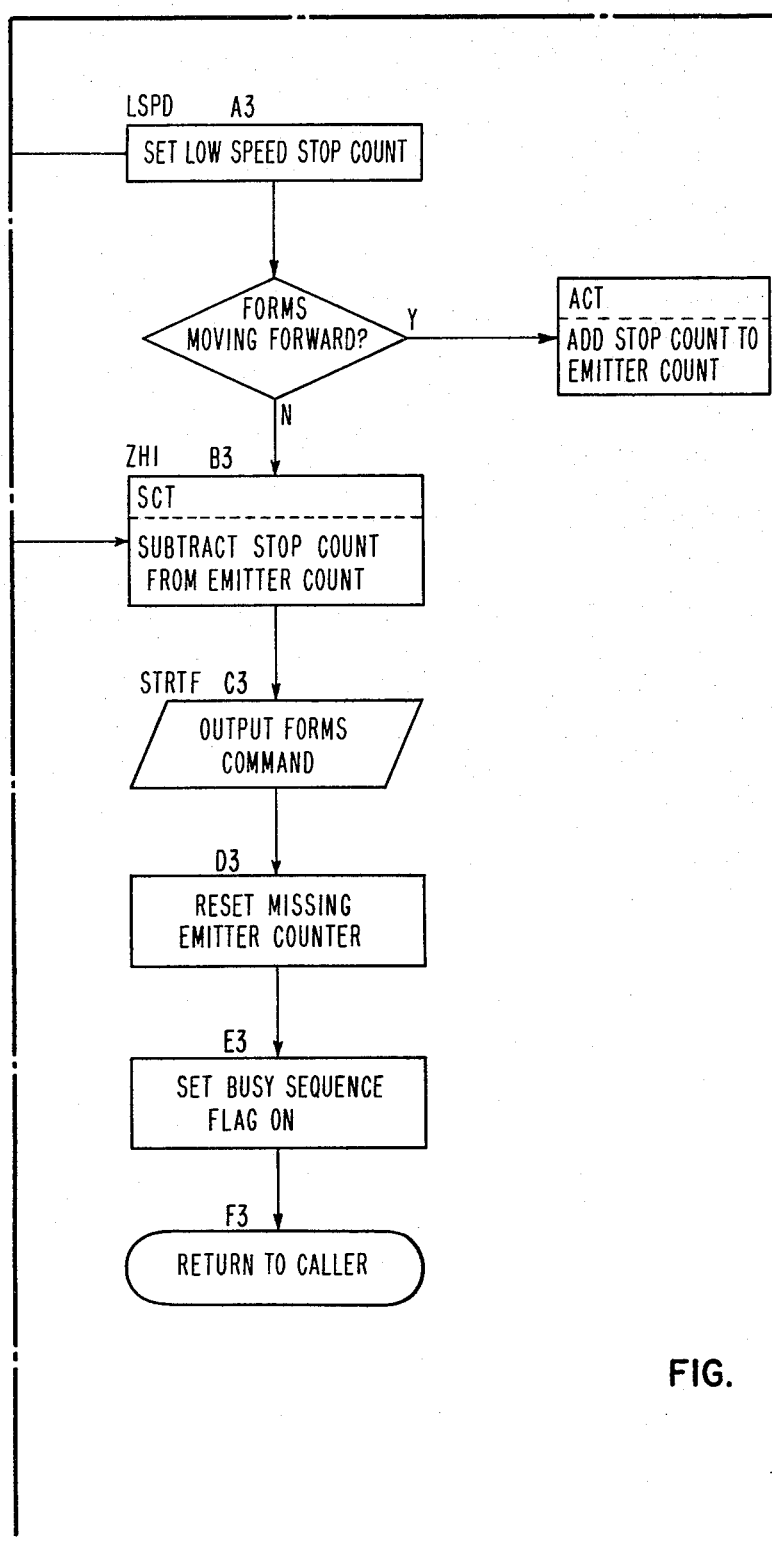
Figure 20N:
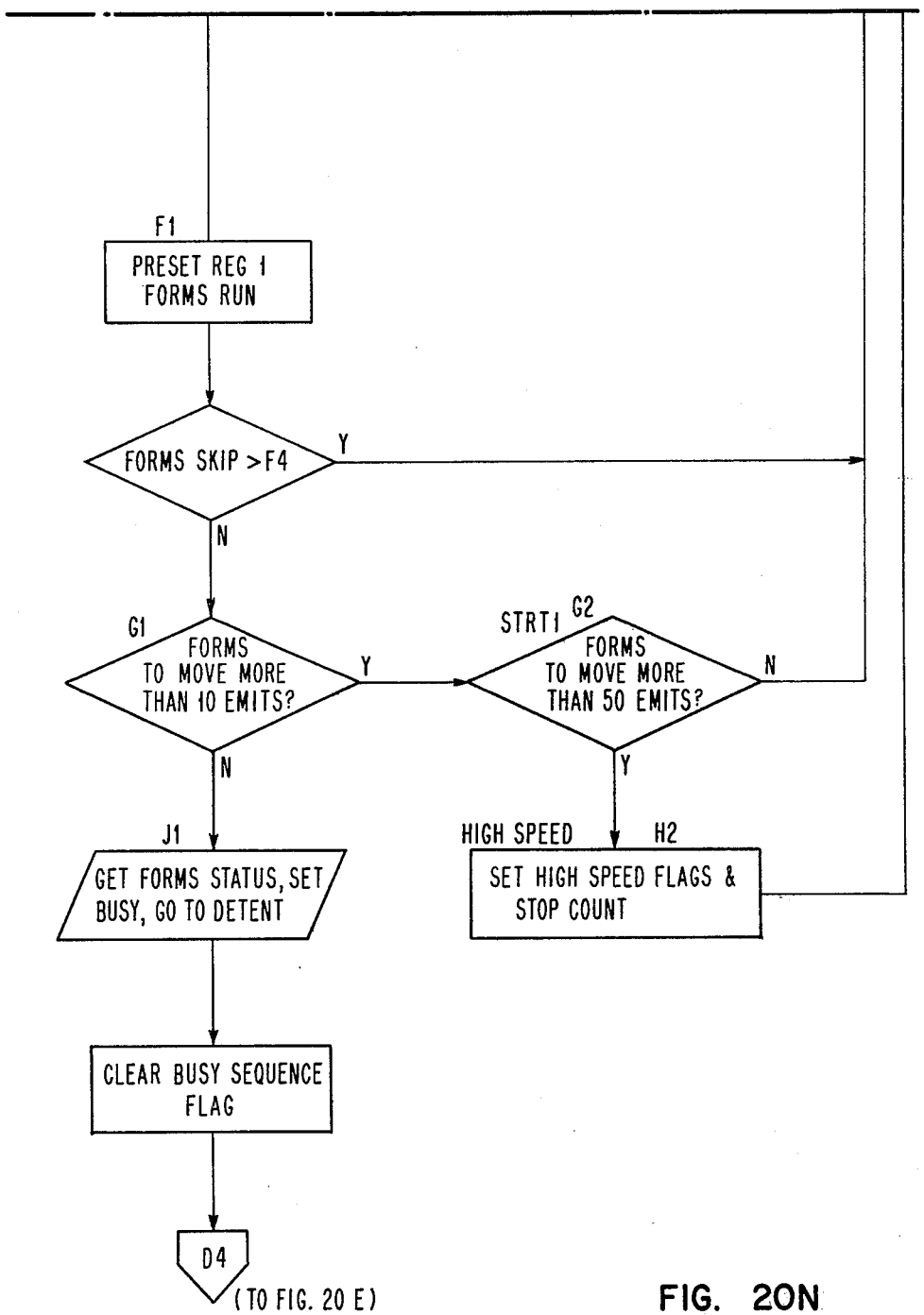

Various forms routines, FIGS. 20A–20N, are used by the Control microprocessor to initiate a Forms operation, to determine speed of operation, to check forms status, to recognize forms emitter pulses, and to utilize the A, B, and C emitter pulses at appropriate times during forms movement. Register utilization in the Control microprocessor is shown in FIG. 17 and input/output signals are shown in FIG. 18. Also reference is made to the Op Code, Equates, and Program Listing sections below.

During the Servo Start Routine, a check is made to determine which speed will be used to move the forms. This is determined by how many forms emitters are supplied by the Communications microprocessor. It there are more than fifty emitters, High Speed is selected; from ten to fifty emitters, Low Speed is selected; and less than ten emitters, Detent is selected.

SUMMARY OF LOW SPEED TIMING DIAGRAM, FIG. 19A

The following steps summarize timing conditions during a Low Speed operation as illustrated in FIG. 19A.

1. Low Speed—movement is initiated with −Forms High Speed off.
2. Up to Speed Emitters are 600 microseconds.
3. Stop is initiated seven emitters from desired stop position by turning off −Forms Run.
4. When +Forms Busy turns off, the motor should be one to two emitters short of desired position. −Form Detent is turned on.
5. When the proper position of Forms emitter A and Forms emitter B is attained, Forms emitter C is used to stop the motor. Forms Enable is turned off only on Power On when forms are moved backward.
6. First print pass occurs.
7. Small step (1°) is initiated by turning on −Forms Detent.
8. Forms emitter C is used to turn off −Forms Detent.

OVERVIEW OF LOW SPEED OPERATION, FIG. 19A

An overview of the Low Speed operation is first presented. It is assumed that the printer requires movement of forms twenty forms emitters worth, that is, 1/6" (hexadecimal=14). The first thing that the Control microprocessor does is to initiate the Forms Servo which results in turning on the Run and Forward signals. The Forms Run signal is shown in FIG. 19A. The Forms Run signal is shown in FIG. 19A. The Forms Forward signal should always be on when a Forms command occurs, except When Forms Move Backward. This is true only during Power On. The microprocessor checks how many forms emitters are sent before turning Run and Enable on. This number is supplied to the Control microprocessor by the Communications microprocessor. As previously indicated if there are more than fifty emitters, a High Speed operation is required, between ten and fifty emitters, a Low Speed operation is required, and if there are less than ten emitters, a Detent operation is required. Since there are twenty forms emitters assumed in this case, the system will go into a Low Speed operation. In FIG. 19A, as soon as Forms Run is turned on by the microprocessor, a few microseconds later, Forms Busy is turned on by the hardware. It is noted that the Forms Run is a negative signal while Forms Busy is a positive signal. The usual occurrence of movement conditions is that the forms will be moved at the normal Low Speed operation up until the last few emitters and Forms Run is turned off about seven emitters from the stopping point. That means that five of the last seven emitters continue to be run at the Low Speed rate and then one or two emitters are run at the Detent rate. So, in FIG. 19A, Forms Run goes off and five emitters later, Forms Busy goes off. At the same time, the microprocessor turns on the Forms Detent signal. In summary, whenever the system goes into a Low Speed Forms operation, seven (7) emitters are subtracted from whatever emitter count is provided by the Communications microprocessor. This is done so that some time is allowed for the forms to stop at the correct point. Once the seven emitters are subtracted from the original emitter count, then the Control microprocessor starts checking the remaining emitters and when the emitter count reaches zero, it is time to turn Forms Run off. At this time, the seven emitters are added back to the Forms Emitter count. When Forms Busy goes off, the system goes into the Detent mode and there are at this time only one or two forms emitters left. As soon as the count reaches zero, then the system starts looking for the output of the Emitter C track, FIGS. 13A and 13B. When the right edge of Emitter C is reached, Forms Detent is turned off, and the printer will stop exactly in the exact location required by the system.

SUMMARY OF HIGH SPEED TIMING DIAGRAM, FIG. 19B

The following summarizes important timing conditions during a High Speed operation as illustrated in FIG. 19B.

1. High Speed Skip—movement is initiated with −Forms High Speed Active.
2. Up to Speed occurs. Up to Speed emitters are approximately 330 microseconds apart.
3. Stop is initiated by turning off −Forms Run 34 emitters from desired stop position.
4. When +Forms Busy turns off, the motor should be two to three emitters short of desired position. −Forms Detent is turned on.
5. When proper position of Forms emitter A and Forms emitter B is attained, Forms emitter C is used to stop motor by turning off Detent.

OVERVIEW OF HIGH SPEED OPERATION, FIG. 19B

The High Speed timing conditions are illustrated in FIG. 19B. It is now assumed that a Forms command has been received from the Communications microprocessor in the Analysis Routine and that the Control microprocessor goes into a Form Servo Start. In the Analysis routines all commands are decoded and the proper flags set accordingly. The Forms Run is turned on by the microprocessor in a manner similar to that for the Low Speed operation. It is assumed that there are more than fifty forms emitters involved this time. Since a greater number of emitters are required for the printer to stop the forms, the first thing that is done is for the Control microprocessor to subtract thirty-four (34) emitters from the total number. These will be added later when Forms Run goes off. At the outset, Forms Run goes on and Forms Busy goes on, as shown in FIG. 19B. As in FIG. 19A, Forms Run is a negative going signal and Forms Busy is a positive going signal. The Control microprocessor at this point starts looking for the emitter output from Tracks A and B of the emitter as shown in FIGS. 13A and 13B. As soon as the emitter count goes to zero, Forms Run is turned off and the originally subtracted emitter count, which was thirty-four (34) emitters, is added back into the emitter counter. Since the forms are moving more rapidly in a High Speed operation, a longer interval time is required for stopping and as shown in FIG. 19B after Forms Run goes off, Forms Busy goes off. As soon as Forms Busy goes off, Forms Detent is turned on. This is also a negative signal. Once Forms Detent comes on, two or three emitters are usually encountered before the absolute stop occurs. The Control microprocessor starts looking for the right edge of the signals from Track C, FIGS. 13A and 13B. When the count has reached zero, and the right edge of the corresponding emitter C signal is encountered, then Forms Detent is turned off, completing the High Speed operation.

DETAILED DESCRIPTION OF FORMS FEED ROUTINES

The various forms feed routines will be described in conjunction with FIGS. 19A and 19B as well as FIGS. 20A-20N. In addition, reference is made to the equates, labels, and program listings below.

DETAILED DESCRIPTION OF INITIAL PROCEDURES

The Control microprocessor decodes commands from the Communications microprocessor in the Analysis Routine. It is assumed that a Forms command has been received. Referencing FIG. 20A, the Forms operation is divided into two different programs, the Forms program and the Servo Start program referred to as SSTRT.

In the Servo Start program, a check is made for several things. A check is made as to whether the Busy signal is on or not. If Busy is on, a branch is made to an error routine since Busy should not come on until the Forms Run signal comes on. If an error does occur because of this, the system goes through some diagnostics and displays an error on the display portion of the operator panel. If no error occurred at this point, the routine proceeds to Input A1 on FIG. 20L. The Forms Complete and Start flags are turned off. The Forms Start flag is turned on originally in the Analysis Routine when the Forms Command operation is first indicated. The Forms Complete flag is turned off since it is desired to start a new Forms operation. The flag is on whenever a Forms Command is not being performed. Next a check is made as to how many Forms commands have occurred. This is done in order to avoid too many Forms commands occurring in a limited space of time. As an example, it is desirable to avoid doing more than eight Forms commands, one following the other. This is to insure that the circuitry and mechanisms in the printer stay well within their normal operating parameters. Thus, if eight or more Forms Commands have occurred, the system will wait a while before initiating a new Forms Command. If this number of Forms Commands does not occur, then the timer is incremented and the Control microprocessor inputs the emitter count into the work registers. These emitter counts are saved in the Analysis Routine originally when the Forms Command is received from the Communications microprocessor. Four registers, FIG. 17, are used to store this count. The two most significant registers are cleared after they have been moved into the work registers. Then the work registers are subtracted from the forms emitter count algebraically. This is done in order to insure that if there was another Forms operation to be finished, it will be taken care of.

The next Forms Command Count (FCT1) is cleared and the status of the Sign bit of the Emitter counter is checked. If the Sign bit is positive, the emitter count is subtracted from the position counter. If the Sign bit is negative, the Sign bit is turned off and the emitter count is added to the position counter. Then the Forms motor is started in the proper speed.

In FIG. 20N, Forms Run is turned on. This is not outputted yet to the Forms Control circuitry since the system must first determine which is the correct speed for the Forms movement. A check is made as to whether a Forms Skip of greater than a selected count is required as determined by a test designated F4. As an example, the emitter count may be 344. If so, a branch is made to Low Speed (LSPD), FIG. 20M, by way of the LSPD line, FIGS. 20N, 20L, and 20M. If not, the count in the Forms Emitter Counter is then checked. It will be recalled that over fifty emitters is High Speed, between ten and fifty is Low Speed, and below ten is Detent Speed.

DETAILED DESCRIPTION—DETENT SPEED

If there are less than ten emitters, then the forms will be moved at the Detent Speed. This decision is made primarily in the routines illustrated in FIGS. 20L–20N, but particularly those shown in FIG. 20N. If there are less than ten forms emitters, then the Detent Speed is required. The first thing that the microprocessor does is to get the forms status, set the Busy Flag on and go to Detent. Thereafter, it sets the Busy Sequence Flag off, FIG. 20N. After that, the routine proceeds to the forms portion of the procedures, Input D4 in FIG. 20E. A check is made as to whether the Forms Complete Flag is on or not. This should be off since the system is now in a Forms Command routine, and it should have been turned off during the Servo Start routine, as mentioned earlier. Next, assuming the Forms Complete Flag is off, a check is made as to whether Forms Run is on, FIG. 20G. The Forms Run should be off at this time since it is assumed that the Forms operation is in a Detent mode and Forms Run will never be turned on during that procedure. Next, the microprocessor checks for Forms Busy status. This flag should be on at this point since it was turned on during the Servo Start routine. Next, the routine proceeds to FIG. 20I, Entry A3. At this point, the Control microprocessor sets off the Busy History Flag and clears the Busy Sequence Flag. The microprocessor then tests whether the Forms Emitter Count equals zero. If the Forms Emitter Count is not zero, then the Control microprocessor returns to the main part of the program to do other program functions and will periodically check the forms status to determine when the Forms Emitter Count has reached zero.

When Forms Emitter Count does equal zero, the microprocessor will start looking for the right edge of Emitter C, FIGS. 13A and 13B. This check is used in all of the forms feed modes, that is, High Speed, Low Speed, and Detent. When the right edge of Emitter C is detected by the Control microprocessor, it will branch to step the forms, FIG. 20K. Here the forms will be stopped completely. In addition, the transition of the Emitter C Flag is off. The microprocessor will output a command to the Input and Output Forms Control.

DETAILED DESCRIPTION—LOW SPEED OPERATION

It is now assumed that between ten and fifty forms emitters are required. This being the case, it is necessary for the system to go into a Low Speed operation as determined from the Forms Emitter Count. This decision is made in FIG. 20N in the blocks labeled Forms to Move More Than 10 Emitters with a Yes output and Forms to Move More Than 50 Emitters with a No output. The decision line proceeds through FIG. 20L to the top of FIG. 20M. At that point, a check is made to see if forms are moving forward. If no, the Control microprocessor subtracts the Low Speed Stop Count of seven (7) from the Forms Emitter count. If yes, the Stop count is added to the Forms Emitter count. This is done to allow a certain amount of stopping time for the forms mechanisms. Then the Control microprocessor outputs the Forms Run back in FIG. 20N into the Input/Output Forms Control and outputs Forms Enable if the forms are moving forward. The microprocessor then returns to its major program loop. In the major loop, the microprocessor will test periodically as to whether a Forms operation is being performed. If so, then the forms will be serviced fairly continuously until the forms are completely stopped. Returning to FIGS. 20A and 20B, the system proceeds through the forms portion of the operation. The first item of significance that the microprocessor does is to test for an End of Forms condition, FIG. 20B. It is assumed that the end of forms has not been encountered and this being the case, the microprocessor uses the old and new emitters to perform a table lookup in order to determine the extent and direction of movement of the forms. Next, the microprocessor checks for whether or not there has been a forms emitter change. If there has been no emitter change, the table lookup procedure is once more utilized, the forms emitters are again checked for changes and various other decision blocks are encountered in FIG. 20C for the possible conditions. For example, the A and B emitters, FIGS. 13A and 13B, may not be occurring at all or they may out of sequence and if this is the case then it is necessary to branch to an error routine, FIG. 20C. The No Emitter Change Counter, FIG. 20C, is utilized to determine in fact that there have been no emitter changes. If the procedure is accomplished properly, a check is next made in FIG. 20C to see if the forms are moving forward. They should be moving forward at this point, but this check is put at this location to determine whether a problem exists when a Forms operation is not being performed. The forms should only be moving backwards during Power On. The microprocessor checks for missing emitters essentially as described in the Cavill et al patent application cross-reference above. If there is a missing emitter, a 3 is added to the missing emitter counter, a check is made for a Carry, and if a Carry has occurred, this signals too many missing emitters and something wrong in the Forms hardware. If so, then diagnostics is accessed by way of an Error routine. If no Carry occurred, then forms direction is checked. If negative direction, then the missed emitter is subtracted from the emitter count. If positive, then the missed emitter is added to the emitter count. Next, the routine proceeds to FIG. 20E, Input D4.

If there was no missing emitter in FIG. 20C, the routine proceeds to FIG. 20D. A count of "1" is subtracted from the Missing Emitter Counter. If a Carry occurs, then a branch is made to TNE1, if not then the Missing Emitter Counter is reset to zero and a branch is still taken to TNE1. At TNE1, a check is made for direction of movement. If negative, a branch is made to NEGEM where a "1" is subtracted from the Emitter count. If positive, the routine goes to ADDCT, FIG. 20E, where a count of "1" is added to the Emitter count. In any case, after checking for End of Forms, a branch is made to Test Z, FIG. 20E. Incidentally, the Control microprocessor checks frequently to determine whether a Forms operation is in progress as it is performing its main program routines. When it inputs at D4, FIG. 20E, and after the Emitter Add routine, it tests to determine whether the Forms Complete Flag is off which is the preferred condition at this time. This flag was turned off in the Servo Start Routine at the beginning of the procedure. The microprocessor then checks whether Forms Run is on, FIG. 20G, Proceeding to FIG. 20F, the No Emitter Count is inputted and a "1" is added. The microprocessor further checks to see whether there has been an overflow in the No Emitter Count. If there has been an overflow in this No Emitter Counter which indicates that emitters have not occurred, then a branch is made to an error routine. An error is then displayed on the operator panel. After the check in FIG. 20F concerning the No Emitter Count, the microprocessor next checks whether the Forms Count has reached zero. If it is not zero, then a Return is made to Caller which refers to a return back to the major program loop. The procedure will return to the Forms Routine and proceed through the various program decision points in the flowcharts until the Forms Emitter Count actually does reach zero. The Control microprocessor at this point then determines which speed condition is present. It is assumed in this case that a Low Speed operation is being performed. This being the case, the Control microprocessor adds the Low Speed count of seven (7) to the Emitter Counter. Next transfer is made to Input B5 in FIG. 20I. The Stop Count is added. Forms Run is turned off. Return is then made to Input G1, FIG. 20F. The Control microprocessor then returns to its major program loop and eventually, after checking the Forms operation will come once again into the Forms Routine in FIG. 20A. The procedure is essentially as previously described where the Control microprocessor checks for end of forms in FIG. 20B, for forms emitter changes in FIGS. 20B and 20C, forward forms movement, FIG. 20C, and all of the other steps in FIGS. 20E, 20G, and 20F, returning to the point where a check is made as to whether the Forms Emitter Count has reached zero. Whenever the Forms Emitter Count is not zero, then a return is made to caller back to the major program loop. This continues until the Forms Emitter Count actually reaches zero. When Forms Emitter Count reaches zero, the Control microprocessor again checks the speed status and ultimately Forms Run will be turned off, FIG. 19A. A test is made as before through Input D4 in FIG. 20E as to whether the Forms Complete Flag is on. The answer, as before, should be No and at this point Forms Run On is checked. Since Forms Run is now off, the routine proceeds from the No leg at this decision block in FIG. 20G. The Control microprocessor tests as to whether the Forms Busy signal is on and at this point should be the case. The Forms Busy signal should still be on for the five emitter counts, FIG. 19A. The routine proceeds then to FIG. 20I, Input A3. The microprocessor will set off the Busy History Flag, will clear the Busy Sequence Flag, and will test whether the Forms Emitter Count is zero. It it is assumed that the Forms Emitter Count has not yet reached zero, then the decision proceeds down the No leg, FIGS. 20I, 20K, and 20J to the block Return to Caller in FIG. 20J. Therefore, the Control microprocessor will return to its major program loop and branch back to the Forms Routine in FIG. 20A. This is repeated with the routine proceeding through the test point, Input D4, in FIG. 20E. A check is again made as to whether the Forms Complete Flag is on, Forms Count Negative, FIG. 20E, and Forms Run On in FIG. 20G. A check is made as to whether Forms is busy, and if still busy, a return is made to Input A3, FIG. 20I. It is now assumed that the Forms Busy signal is off as illustrated in FIG. 19A. The decision block for this in FIG. 20G will now proceed down the No leg where a check is made as to whether the Busy Sequence Flag is off. This flag was turned off at the outset of the Forms Operation and remains off during the repeated excursions of the microprocessor through the various forms decision points. Next, the Control microprocessor will check whether Forms Were Busy Last Time, FIG. 20G. This is done to make sure that a transition from Busy to Not Busy has actually occured. It is assumed that Forms were Busy last time so the routine proceeds to Input A1, FIG. 20H. Now the Forms Busy Last Time Flag is reset, FIG. 20H. The Forms Count will again be checked for zero. If the Forms Count is not zero, the Control microprocessor will output the Detent and return to the major program loop. It will output Forms Enable if the forms are moving forward. It will then return eventually to the Forms block, FIG. 20A. The usual test for Forms Complete Flag, Forms Emitter Count being positive, Forms Run being off, Forms Busy signal being off, Busy Sequence Flag being off, and Forms Busy Last Time being off will occur. A test is again made in FIG. 20H as to whether the Forms Count has reached zero. At this point, it is assumed that the Forms Count has actually reached zero. The Emitter C signal is inputted and tested, FIG. 20H. Ultimately, the Emitter C Flag will be turned on and a Return Made to Caller, proceeding back to the major program loop and again returning through the Forms Routine in FIG. 20A.

It is now assumed that the Emitter C Flag is on, and the Forms Emitter Count having previously come to zero, the microprocessor will proceed into FIG. 20J and into a routine referred to as Turn Off Forms. This involves turning off the High Speed Flag and the Emitter C Flags. In the assumed case, such as here, the Forms Operation was a Low Speed Operation and thus the High Speed Flag would not have been on. The Start Command is outputted to the Forms Control and the microprocessor returns to caller which means that it again goes to the major program loop to do other operations. The status of the various signals involved is shown in FIG. 19A.

DETAILED DESCRIPTION—HIGH SPEED OPERATION

The High Speed operation is very similar to the Low Speed operation. However, in FIG. 20N, the Yes output will be active from the decision block Forms to Move More Than 50 Emitters and the High Speed Flag will be set. This results in entry by way of a line proceeding through FIGS. 20N, 20L, and 20M where the High Speed Stop Count is subtracted from the original emitter count received from the Communications microprocessor. It will be recalled that the Low Speed Count subtracted at this point was seven. The High Speed Count is thirty-four (34). Output is to the Forms Control in a manner similar to the Low Speed operation, the Missing Emitter Counter is reset, and the Busy Sequence Flag is set. The Control microprocessor then returns to caller. It eventually returns through the Forms block in FIG. 20A and through the various decision points in FIGS. 20B, 20C, etc. to make similar decisions to those made during a Low Speed operation. It will be checking on Forms Status, Emitter Changes, and the like. It will be checking for Forms Complete Flag, for Forms Count being positive, for Forms Run being on and similar matters such as those shown in FIGS. 20E, 20F, and 20G. The Control microprocessor will be subtracting one from the Emitter Count, FIG. 20F. It will be checking as to whether the Forms Emitter Count has reached zero. If the count has not reached zero, the microprocessor returns to the major program loop and reenters through the Forms block in FIG. 20A. Ultimately, when the Forms Count reaches zero, a check is made as to whether Forms are in High Speed which is the assumed case at this point, FIG. 20F. The routine proceeds through Input A5, FIG. 20I, in order to add back the High Speed Count of twenty-five (25) for the stopping interval. Referring to FIG. 19B, as a result of the routines shown in FIG. 20I, the Forms Run signal is turned off in the same manner as it was for the Low Speed operation. The exit is to Input G1, FIG. 20F, where a return is made to caller.

Ultimately, when the Control microprocessor proceeds through the Forms Operation routine, a point will be reached when Forms Run is off and Forms Busy goes off, as illustrated in FIG. 19B. As soon as Forms Busy goes off, as determined in FIG. 20G, the sequence proceeds through the decision blocks there and ultimately to FIG. 20H, Input A1. When Forms Busy goes off, the forms feed mechanism is placed in the Detent mode and a check is again made for the Forms Emitter Count reaching zero. As with the Low Speed operation, when the Forms Emitter Count reaches zero, FIG. 20H, the transition of Emitter C is checked and when it occurs, the Turnoff Forms procedures are initiated, FIG. 20J. As soon as the rightmost transition of the Emitter C pulse is encountered therefor, Forms Detent is turned off, Forms Complete Flag is turned on, and Emitter C Flag is turned off as was done during the Low Speed operation. At this point, the Forms operations are completed and the microprocessor will return to the major program loop.

In summary, the High Speed and Low Speed Operations are performed in essentially the same way. The main differences are in the Start Count and Stop Count conditions. The Control microprocessor will check the beginning emitter counts received from the Communications microprocessor to determine whether a Low Speed or High Speed operation is required and will subtract the appropriate numbers of emitters from the original count to allow for a proper stopping time. These counts are seven (7) for Low Speed and thirty-four (34) for High Speed in the assumed case. Obviously, other stop counts could be used if desired. The first thing done during a Forms Routine is that Forms Run is turned on by the microprocessor. Shortly after this, the Forms Busy signal is turned on by the hardware. When the Forms Emitter Count has reached zero, the Control microprocessor knows that Forms Run has to be turned off. When Forms Run is turned off but with Busy still on, the microprocessor will be checking for occurrence of emitter signals from the A and B emitter tracks. During the intervals between Forms Run Off and Forms Busy Off shown in FIG. 19A for Low Speed operation and 19B for High Speed Operation, a different length interval is allowed for stopping the forms depending on which speed of operation is involved. These intervals correspond to the assumed emitter counts of seven (7) for Low Speed and thirty-four (34) for High Speed, respectively. So when Forms Run goes off, FIGS. 19A or 19B, the appropriate stop count is added back to the Forms Emitter Counter and the Control microprocessor checks the status of the Forms Operation until Forms Busy goes off. At this point, the Forms Operation is placed into a Detent mode. During a Low Speed Operation from one to two emitters are involved and during a High Speed Operation, two to three emitters are involved for the Detent portion of the operation. When Forms Count finally reaches zero while in a Detent mode, this informs the Control microprocessor to start looking for the right edge of Emitter C. When that has been reached, a decision is reached that the forms have reached their destination and that the Forms Operation is complete. At this time Forms Detent is turned off, all the flags are set or reset as appropriate with Forms Complete being set and the output from the routine will be to the motor control circuitry.

OPERATION CODES

A number of operation codes are utilized by the microprocessors. These are listed below.

| ALU OP CODES | |
|---|---|
| MODE | VALUE |
| REG TO REG | 0__ |
| DAR TO DAR | 1__ |
| REG TO DAR | 2__ |
| DAR TO REG | 3__ |
| MSK TO REG | 4__ |
| MSK TO DAR | 5__ |

| Function OP Codes | | |
|---|---|---|
| Add | A | 0 |
| Add Carry | AC | 1 |
| Move | M | 2 |
| Clear (0) | CLR | 2 |
| Subtract/Borrow | SB | 3 |
| Subtract | S | 4 |
| Compare | C | 5 |
| Subtract Summary | SS | 6 |
| Compare Summary | CS | 7 |
| And | N | 8 |
| Set Bit Off | SBF | 8 |
| Test | T | 9 |
| And Summary | NS | A |
| Test Summary | TS | B |
| Or | O | C |
| Set Bit On | SBN | C |
| Shift Right | SR | D |
| Exclusive Or | X | E |
| Shift Right Circular | SRC | F |

| Conditional Branches | | |
|---|---|---|
| Branch Not Carry, Branch High | BNC,BH | C__ODD |
| Branch Carry, Branch Less Than Or Equal | BC,BLE | D__EVEN |
| Branch Not Zero, Branch Not Equal, Branch True | BNZ,BNE,BT | E__ODD |
| Branch Zero, Branch Equal, Branch False | BZ,BE,BF | F__EVEN |

| Unconditional Branches | | |
|---|---|---|
| Branch and Wait | BAW | C__EVEN |
| Branch | B | D__ODD |
| Branch and Link | BAL | E__EVEN |
| Branch Via Link | RTN | F001 |
| Return and Link | RAL | F201 |
| Branch Via DAR | BVD | F301 |

| Select Data Address Registers (DAR's) and Storage (STG) | | |
|---|---|---|
| Select Memory Data Low | SDL | FC01 |
| Select Memory Data High | SDH | FE01 |
| Select Memory Inst Low | SIL | F481 |
| Select Memory Inst High | SIH | F489 |
| Select Data Bit X Off | SXF | F441 |
| Select Data Bit X On | SXN | F445 |
| Select Main DARS | SMD | F501 |
| Select Aux DARS | SAD | F701 |

| Input/Output, Load/Store Ops | | |
|---|---|---|
| Input From Device | IN | 68__ |
| Sense Device | SNS | 69__ |
| Output To Device | OUT | 78__ |
| Direct Input and Output | DIO | 7A__ |
| Load Registers | LDR | 89XY |
| Load Registers and DAR + 1 | LDRP | 8BXY |
| Load DAR | LDD | 84XY |
| Load DAR and DAR + 1 | LDDP | 86XY |
| Load Memory Indexed | LDI | 8A0__ |
| Memory to I/O Device | MIO | 8C__ |
| Memory to I/O Device and DAR + 1 | MIOP | 8E__ |
| Load Link Register | LDL | 8000 E |
| Load Link Register and DAR + 1 | LDLP | 8200 E |
| Load Absolute Address | LDA | 9__ |
| Store Registers | ST | A9XY |
| Store Registers and DAR + 1 | STRP | ABXY |
| Store DAR | STD | A4XY |
| Store DAR and DAR + 1 | STDP | A6XY |
| I/O Data To Memory | IOM | AC__ |
| I/O Data To Memory and DAR + 1 | IOMP | AE__ |
| Store Memory Indexed | STI | AA0__ |
| Store Link High Order (Even Byte) | SLH | A000 |
| Store Link High Order and DAR + 1 | SLHP | A200 |
| Store Link Low Order (Odd Byte) | SLL | A100 |
| Store Link Low Order and DAR + 1 | SLLP | A300 |
| Store in Absolute Address | STA | B__ |

MICROPROCESSOR REGISTERS

Each of the microprocessors 200 and 210 has a number of internal registers that are used for various purposes such as work registers. The register layout for the Control microprocessor 210 is shown in FIG. 17.

As a convenience, the register assignments are listed below.

| Communications Microprocessor Registers | | | |
|---|---|---|---|
| WORK0 | EQU | R0 | Work Register |
| WORK1 | EQU | R1 | Work Register |
| WORK2 | EQU | R2 | Work Register |
| WORK3 | EQU | R3 | Work Register |
| WORK4 | EQU | R4 | Work Register |
| WORK5 | EQU | R5 | Work Register |
| WORK6 | EQU | R6 | Work Register |
| WORK7 | EQU | R7 | Work Register |
| WORK8 | EQU | R8 | Work Register |
| WORK9 | EQU | R9 | Work Register |
| WORKA | EQU | R10 | Buffer Indicator Register |
| WORKB | EQU | R11 | Work Register |
| WORKC | EQU | R12 | Work Register |
| POINT | EQU | R13 | Pointers Not in Load Mode |
| EBC | EQU | X'8' | Switch Set to Print EBCDIC |
| PASS2 | EQU | X'4' | Pass Count for Dummy Forms in SBI |
| DHOLD | EQU | X'2' | Hold LED Display |
| COVER | EQU | X'1' | Cover Platen Open Indicator |
| HOST1 | EQU | R13 | (Alternate Use) Host Country Selected Switch |
| HARD1 | EQU | R14 | Hardware Country Selected Switch |
| LOAD1 | EQU | R15 | Random Access Memory Type of Load Switch |
| | | 0 | Nothing Loaded to Random Access Memory and IPL Mode |
| | | 1 | Multinational Loaded to Random Access Memory |
| | | 2 | Country Overlay of Multinational |
| | | 4 | Mode Switch Modification to Character Set |
| | | 8 | Modification to Character Set |
| DATA0 | EQU | D0,D0 Aux | Address Registers |
| DATA1 | EQU | D1,D1 Aux | Address Registers |
| DATA2 | EQU | D2,D2 Aux | Address Registers |
| DATA3 | EQU | D3 | Buffer Pointer DAR |
| DATA4 | EQU | D4 | Work DAR |
| DATA5 | EQU | D5 | Work DAR |
| DATA6 | EQU | D6 | Work DAR |
| DATA7 | EQU | D7 | Work DAR |
| DATA8 | EQU | D8 | Work DAR |
| DATA9 | EQU | D9 | Work DAR |
| BFNUM | EQU | D10 | Buffer Pointer Indicator |
| GECK | EQU | X'8' | In Graphic Error Mode Indicator |
| BFUSE | EQU | X'4' | Buffer Cleared Indicator |
| BFN2 | EQU | X'2' | Text Buffer 2 Indicator (0 = 1, 1 = 2) |
| RAMP | EQU | X'1' | Rest for Ramp Indicator |

| Communications Microprocessor Registers | | | |
|---|---|---|---|
| LSCON | EQU | D11 | Last Console Setting /F = In Load Mode |
| FMIND | EQU | D12 | Forms Indicator |
| PGUP | EQU | X'8' | Page Up for Display Indicator |
| D2LD | EQU | X'4' | Mask To Test for 2nd Data Load |
| CAN | EQU | X'2' | Cancel Button Held Indicator |
| TRANS | EQU | X'1' | In Transparent Mode Indicator |
| IND | EQU | D13 | Indicators |
| NEG | EQU | X'8' | Negative Skip Indicator |
| XSKIP | EQU | X'4' | More To Skip Indicator |
| PTHLD | EQU | X'2' | Print One Line and Hold |
| PTDON | EQU | X'1' | Print of One Line Done |
| PTRST | EQU | X'3' | Above Two Bits Together |
| CMCTL | EQU | D14 | Command Control Byte |
| D1LD | EQU | X'8' | Mask To Test for 1st Data Load |
| D2LD | EQU | X'4' | Mask To Test for 2nd Data Load |
| D3LD | EQU | X'C' | Mask To Test 1st and 2nd Data Load |
| RESN1 | EQU | X'1' | Mask To Test for 1st Resend |
| RESN2 | EQU | X'2' | Mask To Test for 2nd Resend |
| RESND | EQU | X'3' | Mask To Test for Either Resend |
| NOLD | EQU | X'F' | Mask To Test for No Command |
| MVADJ | EQU | D15 | Adjustment Control Byte |
| RLRD1 | EQU | X'9' | Roll and Ready Indicator Together |
| ROLLD | EQU | X'8' | Roll Display Indicator |
| CHGD | EQU | X'4' | Change To Next Sequence Indicator |
| ADJP1 | EQU | X'2' | Change Density Mask |
| RDY1 | EQU | X'1' | Software Ready Indicator |
| RAMIN | EQU | X'OFFB' | End of Random Access Memory in ROS Slot |
| I00 | EQU | R0 | Input/Output Register |
| I01 | EQU | R1 | Input/Output Register |
|  |  | R2 | Work Register |
|  |  | R3 | Work Register |
|  |  | R4 | Work Register |
| PEMT | EQU | R5 | Indicates Previous Emitters |
| PHF | EQU | R6 | Print Head Flags |
| FRMST | EQU | X'1' | Forms Start Flag |
| DNSCH | EQU | X'2' | Density Change Flag |
| PARK | EQU | X'4' | Ramp Command Flag |
| PRCMP | EQU | X'8' | Printing is Complete |
| FLG1 | EQU | R7 | Indicator Flags |
| CD15 | EQU | X'1' | Character Density Equals 15 CPI |
| RV | EQU | X'2' | Print Head is Going Left (Reverse) |
| TXBUF | EQU | X'4' | Head Image Generator Is to Use Text Buffer 2 |
| HIGST | EQU | X'8' | Head Image Generator Is to Start Print Lines |
| FLG2 | EQU | R8 | Ribbon Flags |
| FBFLG | EQU | X'1' | Wire Feedback Flag |
| RBMON | EQU | X'2' | Ribbon Motor Is On |
| FMSTM | EQU | X'4' | Forms Time Flag |
| TOK | EQU | X'8' | Turn Around Is OK |
| WIPOS | EQU | R9 | Wire Position Counter |
| FECT | EQU | R10 | False Emitter Counter |
| DIAGF | EQU | X'1' | Diagnostic Flag |
| FDRCT | EQU | X'2' | Direction of Forms Movement |
| FE2 | EQU | X'4' | False Emitter 2 |
| FE1 | EQU | X'8' | False Emitter 1 |
| PRERR | EQU | R11 | Printer Error Flags |
|  | EQU | X'8' | Not Used |
| HHOME | EQU | X'4' | Head Home Flag |
| TEDGE | EQU | X'2' | Turnaround Edge Flag |
| HATNA | EQU | X'1' | Head Stopped At Turnaround Flag |

| Communications Microprocessor Registers | | | |
|---|---|---|---|
| CMDFL | EQU | R12 | Command Flags |
| PRCMD | EQU | X'1' | Print Command Flag |
| PRPND | EQU | X'2' | Print Command Is Pending |
| FMCMD | EQU | X'4' | Forms Command Flag |
| TSCMD | EQU | X'8' | Test Command Flag |
| EMCT1 | EQU | R13 | Emitter Counters - Used To Determine |
| EMCT2 | EQU | R14 | Head Position by |
| EMCT3 | EQU | R15 | the Number of Emitters From Left Margin |
| MAIN/AUX | EQU | D0,D0 Aux | Address Registers |
| MAIN/AUX | EQU | D1,D1 Aux | Address Registers |
| MAIN/AUX | EQU | D2,D2 Aux | Address Registers |
| RM1 | EQU | D3 | Indicates Right Margin |
| RM2 | EQU | D4 | When the Emitter |
| RM3 | EQU | D5 | Counter Attains This Value |

| End of Forms | | | |
|---|---|---|---|
| EOFI | EQU | D6 | End of Forms Indicators |
| LASTD | EQU | X'8' | Last Forms Direction, 1 = Forward; 0 = Reverse |
| LBUSY | EQU | X'4' | Busy History Indicator |
| FBSEQ | EQU | X'2' | Busy Sequence Flag |
| EOFER | EQU | X'1' | End of Forms Detected Indicator |
| FMCT1 | EQU | D7 | 16 Bit Forms AB Emitter Counter |
| FMCT2 | EQU | D8 |  |
| FMCT3 | EQU | D9 |  |
| FMCT4 | EQU | D10 |  |
| SIGN | EQU | X'8' | Counter Sign Bit |

| Emitter Status Register | | | |
|---|---|---|---|
| ESTAT | EQU | D11 |  |
| LASTE | EQU | X'4' | Last End-of-Forms Emitter Value |
| LASTA | EQU | X'2' | Last Forms A Emitter Value |
| LASTB | EQU | X'1' | Last Forms B Emitter Value |
|  | EQU | D12 |  |
| FLECT | EQU | D13 | Forms Lost Emitter Counter |
| FMECT | EQU | D14 | Forms Missing Emitter Counter |
| PT1 | EQU | D15 | Program Timer 1/Forms Command Count |
| FLAST | EQU | X'8' | 8 or More Forms Commands Flag |

EQUATES—CONTROL MICROPROCESSOR

The following equivalent expressions, that is, "equates", are used in connection with Control microprocessor program listings. These are used by an Assembler to fill in a number for the English-type expressions.

| Name | Definition |
|---|---|
| FRMI0 | Forms Input/Output |
| FBUSY | (IN R0) Forms Busy |
| EOFEM | End of Forms Emitter |
| FEA | Forms Emitter A |
| FEB | Forms Emitter B |
| FAB | Forms A/B Emitter Mask |
| RUN | (In R1) Forms Run |
| HISPD | Forms High Speed |
| FWD | Forms Enable |
| DTNT | Forms Detent Speed |

-continued

| Name | Definition |
|---|---|
| FDET | Forms Forward Detent Command |
| STOP | Forms Stop Command |
| NOFEM | No Forms Emitter Counter |
| EOFC | End of Forms Counter |
| FCT1 | Next Forms Command Count |
| FCT2 | Next Forms Command Count |
| FLATCH | Save Last Command to Forms Motor |
| FRMST | Forms Start Flag |
| FMCMD | Forms Command Flag |
| NEGEM | Negative Emitter Change |
| EOFI | End of Forms Indicators |
| FBSEQ | Busy Sequence Flag |
| LBUSY | Busy History Indicator |
| HSIND | Forms in High Speed Indicator |
| EOFER | End of Forms Detected Indicator |
| FMCT1 | 16 Bit Forms AB Emitter Counter |
| FMCT2 | |
| FMCT3 | |
| FMCT4 | |
| SIGN | Counter Sign Bit |
| ESTAT | Emitter Status Register |
| LASTE | Last End-of-Forms Emitter Value |
| LASTA | Last Forms A Emitter Value |
| LASTB | Last Forms B Emitter Value |
| FCF | Forms Complete |
| TEMC | Transition of Emitter C Flag |
| MINUS | Minus Flag (Used in Forms) |
| W1 | Work Register 1 |
| W2 | Work Register 2 |
| W3 | Work Register 3 |
| W4 | Work Register 4 |
| FMCTL | Forms Control Register |
| FSTAT | Forms Status Register |
| NOEM1 | No Emitters in Run Counter |
| NOEM2 | |
| EOFC1 | End of Forms Counter |
| EOFC2 | |
| FSTSV | Save Area for Forms Status (From R0) |
| FCTSV | Save Area for Forms Control (From R1) |

LABELS—CONTROL MICROPROCESSOR

The following labels are used by the Control microprocessor. These serve, for example, as pointers for addressing or for branching purposes

| Labels | Labels |
|---|---|
| ACT | SCT |
| ADDCT | SEMO |
| DTENT | SFCT |
| EOFCZ | SST2 |
| EXITX | SSTRT |
| FEC | SSTR4 |
| FFWD | STDET |
| FMRVS | STEET |
| FORMS | STRT1 |
| FREV | STRTF |
| FRUNS | SUBCT |
| FZT | TESTZ |
| HSSTP | TFS |
| LSPD | TNE |
| NEGEM | TNE1 |
| RNZ | TTTT |
| RTNF | WASIS |
| | ZHI |
| | ZNEC |
| | ZW |

PROGRAM LISTINGS

The following program listings reflect microcode involved in the forms routines.

Forms Control Routine

This Routine

1. Detects changes in the end-of-forms emitter and detects end of forms.
2. Counts the Forms AB Emitter and increments or decrements the Forms Emitter Counter.
3. Stops the Forms Servo Motor at the required distance from the destination and sets the Operation Complete Flag.
4. Initiates and stops Forms Detent motion as required.
5. Clears the Forms Command Flag when Forms Busy goes off.
6. Detects the absence of Forms Emitters when the forms are running.

| Forms Control Data/Constants | | | |
|---|---|---|---|
| Label | Op Code | Arguments | Comments |
| LSTRA | EQU | X'0' | Low Speed Start - /0A (10) |
| LSTRB | EQU | X'A' | |
| LSTPA | EQU | X'0' | Low Speed Stop - /07 (07) |
| LSTPB | EQU | X'7' | |
| HSTRA | EQU | X'3' | High Speed Start - Low Speed Start /32 (50) |
| HSTRB | EQU | X'2' | |
| HSTPA | EQU | X'2' | High Speed Stop /22 (34) |
| HSTPB | EQU | X'2' | |
| EOFDA | EQU | X'5' | End of Forms Count /50 (80) |
| EOFDB | EQU | X'0' | |
| FORMS | SMD | , | |
| | SDL | , | |
| | IN | FRMIO | Read Forms Emitters and Servo Status |
| | M | FSTAT,FSTSV | Save Forms Status |
| | IN | FLATCH | Head Servo Status |
| | M | FMCTL,FCTSV | Save Forms Control |

| Test For EOF Emitter Change | | | |
|---|---|---|---|
| Label | Op Code | Arguments | Comments |
| | M | FSTSV,W1 | Move Emitter Values To Work Reg. |
| | X | ESTAT,W1 | X-OR Last Emitter Value |
| | T | EOFEM,W1 | Test For Change |
| | BF | FEC | Go To Count Routine If No Change |
| | M | EOFDA,EOFC1 | Reset EOF Counter |
| | M | EOFDB,EOFC2 | To Initial Value |
| | OUT | EOFC | And Store In Register Stack |

| Forms AB Emitter Counter | | | |
|---|---|---|---|
| Label | Op Code | Arguments | Comments |
| FEC | M | WASIS D0,2 | Load DARS with High Order |
| | M | WASIS,D1,3 | Was/Is Table Address |
| | M | ESTAT,D2 | Move Previous AB to Low Order DAR |
| | M | FSTSV,ESTAT | Save Present Emitter Status |
| | A | D2,D2 | Shift Left |
| | A | D2,D2 | Two Places |
| | M | FSTSV,W1 | Move Present Emitters to Work Register |
| | N | FAB,W1 | Turn Off Other Bits |
| | O | W1,D2 | Or Into Low Order DAR |
| | LDD | W3,W4 | Load Table Entry from WASIS |
| | BNZ | ZNEC | Clear No Emitter Counter if Change |

-continued

Forms AB Emitter Counter

| Label | Op Code | Arguments | Comments |
|---|---|---|---|
|  | B | ZW | Else Continue |
| ZNEC | M | 0,N0EM1 | Clear No Emitter Counter |
|  | M | 0,N0EM2 | and Store in |
|  | OUT | NOFEM | Ext Register |
| ZW | M | 0,W1 |  |
|  | M | 0,W2 | Clear Work Registers |
|  | T | 2,W4 | Test for Missed Emitter |
|  | BF | TNE | Branch if None Missed |
|  | A | 3,FMECT | Add 3 to Miss Emitter Count |
|  | BC | FER03 |  |
|  | T | FDRCT,FLG7 | Test If Forward Direction |
|  | BF | NEGEM | Assume Neg If Not Forward |
|  | B | ADDCT | Else Assume A Positive Emitter |
| TNE | S | 1,FMECT | Sub 1 Form Counter |
|  | BC | TNE1 | Continue If Not Stepped Past 0 |
|  | M | O,FMECT | Reset Count to 0 |
| TNE1 | T | 8,W3 | Test For Negative Direction |
|  | BT | NEGEM | Branch If Negative |
| ADDCT | BAL | ACT | Go Add Emitter Count |

End Of Forms Detected Routine

| Label | Op Code | Arguments | Comments |
|---|---|---|---|
|  | IN | EOFC | Get End Of Forms Counter |
|  | T | LASTD,FLG7 | Test If Fwd Forms Motion |
|  | BT | FREV |  |
| FFWD | S | W4,EOFC2 | Subtract Emitter Change From EOF |
|  | SB | 0,EOFC1 | Counter |
|  | BNC | EOFCZ | Branch If EOF Ctr Goes To Zero |
|  | OUT | EOFC | Store EOF Count |
|  | B | TESTZ | Else Continue |
| FREV | A | W4,EOFC2 | Add Emitter Change To |
|  | AC | 0,EOFC1 | EOF Counter |
|  | BC | FER04 | If Carry,Error |
|  | OUT | EOFC | And Store In Ext Reg |
|  | B | TESTZ |  |

Test If Forms Are In Run

| Label | Op Code | Arguments | Comments |
|---|---|---|---|
| TESTZ | T | FCF,FLG5 | Is Forms Complete Flag On |
|  | BT | RNZ |  |
|  | T | RUN,FCTSV | Test If Forms In Run Status |
|  | BT | FRUNS | If So Branch To Run Status Routine |

Test If Busy Just Went Off

| Label | Op Code | Arguments | Comments |
|---|---|---|---|
|  | T | FBUSY,FSTSV | Are Forms Busy |
|  | BT | EXITX | If Yes, Return Via Delay |
|  | T | FBSEQ,E0FI | Were Forms Busy |
|  | BT | FER05 | No Error If Not |
|  | T | LBUSY,E0FI | Were Forms Busy Last Time |
|  | BF | FZT | If Not, Continue |

Transition From Busy To Not Busy Just Occurred

| Label | Op Code | Arguments | Comments |
|---|---|---|---|
|  | SBF | LBUSY,E0FI | Clear Busy History Indicator |
|  | SBF | FMCMD,CMDFL |  |

Test Emitter Counter for Zero

| Label | Op Code | Arguments | Comments |
|---|---|---|---|
| HIX55 | EQU |  | Hex Constant X'55' |
| F2T | C | 0,FMCT1 |  |
|  | CS | 0,FMCT2 | Test for Zero in |
|  | CS | 0,FMCT3 | Emitter |
|  | CS | 0,FMCT4 | Counter |
|  | BNE | DTENT | Branch if Not Zero |
|  | M | 3,FMCTL | Move Detent |
|  | OUT | FRM10 | Output Command |
|  | B | STDET | Go to Stop/Detent Routine |

Negative Emitter Change

| Label | Op Code | Arguments | Comments |
|---|---|---|---|
| NEGEM | M | 0,W3 | Negative, Clear Work Reg |
| SUBCT | BAL | SCT | Go Sub From Counter |

End Of Forms Detect Routine, Negative Emitter Change

| Label | Op Code | Arguments | Comments |
|---|---|---|---|
|  | IN | EOFC | Get End Of Forms Counter |
|  | T | LASTD,FLG7 | Test If Forward Forms Motion |
|  | BF | FREV |  |
|  | B | FFWD | Add Count If Forward |
| EOFCZ | SBM | EOFER,EOFI | Set Detect Bit |
|  | M | EOFDA,EOFC1 | Reset EOF Counter |
|  | M | EOFDB,EOFC2 | To Initial Value |
|  | OUT | EOFC | And Output To Ext Reg |
|  | B | TESTZ |  |
| TTTT | IN | FECC | Input Emitter C Timer |
|  | C | X'2',R0 |  |
|  | CS | X'A'.R1 |  |
|  | BNE | TT1 | If Not Equal Retun To Caller |
|  | B | FER08 | Emitter C Error (Not Detected |
| TT1 | A | 1,R0 |  |
|  | AC | 1,R1 | Increment The Timer |
|  | OUT | FECC | Save It |
|  | RTN | , | Return To Caller |

Forms Stop/Detent Control

| Label | Op Code | Arguments | Comments |
|---|---|---|---|
| STEET | SBN | TEMC,FLG7 | Set Transition Of Emitter Flag On |
|  | RTN | , | Return To Caller |
| STDET | IN | NOHDS | Input Emitter C |
|  | T | 8,R1 |  |
|  | BF | STEET |  |
|  | T | TEMC,FLG7 | Is Transition Of Emitter C Flag On |
|  | BF | TTTT |  |
| RTNF | SBF | FMCMD,CMDFL | Turn Off Forms Command Flag |
|  | SBN | FCF,FLG5 | Turn On Forms Complete |

Forms Stop/Detent Control

| Label | Op Code | Arguments | Comments |
|---|---|---|---|
| | SBF | HSIND,EOFI | Turn Off High Speed Flag |
| | SBF | TEMC,FLG7 | Flag |
| | M | 2,FMCTL | |
| FCOMD | OUT | FRMIO | |
| | OUT | FLATCH | |
| | RTN | , | Return |
| DTENT | T | SIGN,FMCT1 | |
| | BT | FD | |
| | M | 1,FMCTL | |
| | SBF | FDRCT,FLG7 | |
| | B | FCOMD | |
| FD | M | 3,FMCTL | Set Forward Detent |
| | B | FCOMD | |
| EXITX | SBN | LBUSY,EOFI | Set Busy History Indicator |
| | SBF | FBSEQ,EOFI | Clear Busy Sequence Flag |
| | RTN | , | |
| SEMO | SBN | TEMC,FLG7 | |
| | RTN | , | |

Forms In Run Status

| Label | Op Code | Arguments | Comments |
|---|---|---|---|
| FRUNS | IN | NOFEM | Get No Emitter Count From Ext Reg |
| | A | 1,NOEM2 | Increment No Emitter Counter |
| | AC | 0,NOEM1 | |
| | OUT | NOFEM | Restore No Emitter Count |
| | BNC | TZ | Continue If No Carry Out |
| | M | 2,FMCTL | Stop Forms No Emitters |
| | OUT | FRMIO | |
| | OUT | FLATCH | |
| | SIH | , | Set Instruction High |
| | B | FMDIA | Forms Diagnostics |

Test If Forms Motor Should Be Stopped

| Label | Op Code | Arguments | Comments |
|---|---|---|---|
| TZ | T | FWD, FCTSV | Test If In Forward Motion |
| | BT | TFS | Branch If Forward |
| | T | SIGN,FMCT1 | |
| | BT | SPDT | Stop Forms If Count Minus |
| | RTN | , | |
| TFS | T | SIGN,FMCT1 | Test If Count Positive |
| | BT | RTN | Return If Still Negative |

Stop Forms and Restore Deceleration Emitter Count

| Label | Op Code | Arguments | Comments |
|---|---|---|---|
| SPDT | M | 0,W1 | Delay |
| | M | 0,W2 | Clear Work Reg |
| | T | HISPD,FCTSV | Are Forms In Hi Speed |
| | BT | HSSTP | If Yes Go To Hi Speed Stop |
| | M | LSTPA,W3 | Load Lo Speed Stop Count |
| | M | LSTPB,W4 | In Work Regs |
| | B | FTST | |
| HSSTP | M | HSTPA,W3 | Move Hi Speed Stop Count |
| | M | HSTPB,W4 | To Work Regs |
| FTST | T | FWD,FCTSV | Test If Forward |
| | BT | SFCT | |
| | BAL | ACT | Add Stop Count To Counter |
| | B | SF | Go Stop Forms |
| SFCT | BAL | SCT | Sub Stop Count From Counter |
| SF | M | FCTSV,FMCTL | Load Stop Command |
| | SBF | RUN,FMCTL | |
| | OUT | FRMIO | Output Command |
| | OUT | FLATCH | |
| RNZ | RTN | , | |

Forms AB Emitters Was/Is Table

| Label | Op Code | Arguments | Comments |
|---|---|---|---|
| | BORG | 16 | |
| WASIS | DC | A(X'0081',X'0102',X'0100'X'0281') | |
| | DC | A(X'8102',X'0001',X'0201',X'8100') | |

Servo Start Routine
THIS ROUTINE STARTS THE FORMS SERVO IN THE PROPER SPEED AFTER RECEIVING A FORMS MOVEMENT COMMAND

| Label | Op Code | Arguments | Comments |
|---|---|---|---|
| SSTRT | IN | OCERR | |
| | T | TRAUL + CVINT,R1 | |
| | BT | RTN | |
| | LDA | #CLR | Clear Detent Timer |
| | OUT | DTIMR | |
| | T | FBUSY,FSTAT | Is Busy On |
| | BT | FER08 | Yes, Error |
| SSTR4 | SDL | , | |
| | SMD | , | |
| | SBF | FCF,FLG5 | Set Forms Complete Flag Off |
| | SBF | FRMST,PHF | Turn Off Forms Start Flag |
| | T | FLAST,PT1 | Have 8 Forms Command Occurred Yet |
| | BT | SST2 | Yes, Stop Counting |
| | A | 1,PT1 | No, Count It |
| SST2 | IN | FCT2 | Get Emitter Count |
| | M | R0,W3 | From Ext Register Stack |
| | M | R1,W4 | And Move To |
| | IN | FCT1 | Work |
| | M | R0,W1 | |
| | M | R1,W2 | Registers |
| | X | PRERR,R0 | Xor Direction Bit |
| | T | LASTD,R0 | Test For Direction Change |
| | BF | ASC | |

Servo Start Routine

THIS ROUTINE STARTS THE FORMS SERVO IN THE PROPER SPEED AFTER RECEIVING A FORMS MOVEMENT COMMAND

| Label | Op Code | Arguments | Comments |
|---|---|---|---|
|  | M | EOFDA,R0 | Reset End Of Forms Counter |
|  | M | EOFDB,R1 | To Initial Value |
|  | OUT | EOFC |  |
|  | X | LASTD,PRERR | Reset Direction Bit |
| ASC | M | X'0',R0 |  |
|  | M | X'0',R1 |  |
|  | OUT | FCT1 | Clear Forms Op Counter |
|  | OUT | FECC | Clear Emitter C Count |

Add Or Sub # Of Emitter From Emitter Count

| Label | Op Code | Arguments | Comments |
|---|---|---|---|
|  | T | SIGN,W1 | Test Sign Bit |
|  | BT | FMRVS | Negative Count, Reverse Motion |
|  | BAL | SCT | Positive Count, Forward Motion |
|  | B | FSTRT | Go Start Forms |
| FMRVS | N | 7,W1 | Turn Off Sign Bit |
|  | BAL | ACT | And Sub From Emitter Count |

Start Forms Motor In Proper Speed

| Label | Op Code | Arguments | Comments |
|---|---|---|---|
| FSTRT | BAL | FABSC | Get Absolute Emitter Count |
|  | M | RUN,FMCTL | Set Forms Run and Enable |
|  | T | X'F',W1 |  |
|  | BT | LSPD |  |
|  | C | X'4',W2 |  |
|  | BLE | LSPD |  |
|  | S | LSTRB,W4 | Subtract |
|  | SB | LSTRA,W3 | Low Speed |
|  | SB | 0,W2 | Start Count |
|  | SB | 0,W1 |  |
|  | T | SIGN,W1 | Test If Negative |
|  | BF | STRT1 | Branch If Positive Or Zero |
|  | IN | FRMIO | Get Forms Status |
|  | M | FSTAT,FSTSV | Save |
|  | IN | FLATCH | Get Servo Status |
|  | M | FMCTL,FCTSV |  |
|  | SBN | LBUSY,EOFI | Set Busy Flag On |
|  | SBF | FBSEO,EOFI | Clear Busy Sequence Flag |
|  | B | TESTZ | Detent Start, Less Than Lo Spd Start |
| STRT1 | S | HSTRB,W4 | Subtract Hi Speed Start Delta |
|  | SB | HSTRA,W3 | From Remainder |
|  | SB | 0,W2 | Of Count |
|  | SB | 0,W1 |  |
|  | T | SIGN,W1 | Test For Negative |
|  | BT | LSPD | Yes, Go To Lo Speed Start |
|  | SBN | HISPD,FMCTL | Set Hi Speed On |
|  | SBN | HSIND,EOFI | Turn On Hi Speed Indicator |
|  | M | HSTPA,W3 | Put Hi Speed Stop Count |
|  | M | HSTPB,W4 | In Work Registers |
|  | B | ZHI |  |
| LSPD | M | LSTPA,W3 | Move Lo Speed Stop Count |
|  | M | LSTPB,W4 | To Work Regs |
| ZHI | M | 0,W2 | Work Regs |
|  | M | 0,W1 |  |
|  | T | SIGN,FMCT1 | Test For Negative |
|  | BF | FBACK | If Not Negative Set Backward Motion |
|  | SBN | FWD,FMCTL | Set Forward Forms Motion |
|  | SBN | FDRCT,FLG7 | Set Forward Direction Indicator |
|  | BAL | ACT | Add Stop Count To Emitter Counter |

Start Forms Motor In Proper Speed -continued

| Label | Op Code | Arguments | Comments |
|---|---|---|---|
|  | B | STRTF | Go Start Forms |
| FBACK | BAL | SCT | Sub Stop Count From Emitter Count |
|  | SBF | FDRCT,FLG7 | Clear Forward Direction Indicator |
| STRTF | OUT | FRMIO | Output Forms Command |
|  | OUT | FLATCH |  |
|  | M | 0,N0EM1 | Clear Missing Emitter Counter |
|  | M | 0,NOEM2 |  |
|  | OUT | NOFEM | Store In Ext Reg Stack |
|  | SBN | FBSEQ,EOFI | Set Busy Sequence Flag On |
|  | RTN , |  |  |

Forms Control - Subroutines

| Label | Op Code | Arguments | Comments |
|---|---|---|---|
| ACT | A | W4, FMCT4 | Add Work Registers To Emitter Counter |
|  | AC | W3,FMCT3 |  |
|  | AC | W2,FMCT2 |  |
|  | AC | W1,FMCT1 |  |
|  | RTN |  |  |
| SCT | S | W4,FMCT4 | Subtract Work Regs From Emitter Counter |
|  | SB | W3,FMCT3 |  |
|  | SB | W2,FMCT2 |  |
|  | SB | W1,FMCT1 |  |
|  | RTN |  |  |
| FABSC | M | FMCT1,W1 | Move Absolute Count To Work Reg |
|  | M | FMCT2,W2 |  |
|  | M | FMCT3,W3 |  |
|  | M | FMCT4,W4 |  |
|  | T | SIGN,FMCT1 | Test If Negative |
|  | BF | FARTN | Branch If Positive |
|  | X | X'F',W1 | Complement Work Reg |
|  | X | X'F',W2 |  |
|  | X | X'F',W3 |  |
|  | X | X'F',W4 |  |
|  | A | 1,W4 |  |
|  | AC | 0,W3 |  |
|  | AC | 0,W2 |  |
|  | AC | 0,W1 |  |
| FARTN | RTN , |  |  |
|  | SHWEC2 |  | Insert Hardware Error Routine |

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

We claim:

1. A positioning system, comprising:

apparatus having at least one relatively movable portion therein;

first control means for providing control signals indicative of the extent of movement required of said relatively movable portion;

second control means interconnected with said relatively movable portion and responsive to control signals from said first control means to initiate and maintain driving movement of said relatively movable portion at a predetermined normal driving speed during a normal driving interval until a point just prior to a stopping point determined by said control signals and thereafter to initiate and maintain until said stopping point, a predetermined slowdown speed during a slowdown interval, said slowdown speed being slower than said normal driving speed;

emitter means coupled to said relatively movable means, said emitter means providing a first sequence of signals of relatively lower frequency indicative of the extent of movement of said relatively movable portion during said normal driving interval and for providing a second sequence of signals of relatively higher frequency indicative of the extent of movement of said relatively movable portion during said slowdown driving intervals; and third control means associated with said second control means for utilizing said first sequence of signals from said emitter means during said normal driving interval and for utilizing said second sequence of signals during said slowdown interval to insure that said relatively movable portion stops exactly at the stopping point required.

2. The system of claim 1, further comprising:

an emitter element incorporated in said emitter means, said emitter element comprising at least a first series of indicia located in a first sequence on said element with a relatively longer spacing interval between said indicia, and at least a second series of indicia located on said element in predetermined timing relationship with respect to said first series of indicia, the spacing interval of said second series of indicia being relatively shorter than that for the first series of indicia;

sensor means located in proximity to said emitter element for sensing indicia thereon; and means for relatively moving said emitter element and said sensor means to produce low frequency transitions from said first series of indicia and high frequency transitions from said second series of indicia.

3. The system of claim 2, further comprising:

circuit means incorporated in said third control means for utilizing said low and high frequency transitions from said emitter element and said sensor means in order to develop low frequency and high frequency signals required during operation of said system.

4. The system of claim 3, wherein said emitter element is a circular element mounted for passage of said indicia series past said sensor means.

5. The system of claim 1, further comprising:

speed indicating means incorporated in said first control means for indicating a plurality of different driving speeds required of said relatively movable portion and for supplying speed signals indicative thereof; and speed responsive means incorporated in said second control means for selectively driving said relatively movable portion at one of said plurality of speeds of operation in accordance with the speed indicating signal from said first control means.

6. The system of claim 5, further comprising:

counting means associated with said second and third control means for counting emitter signals from said emitter means during normal driving and slowdown intervals; and fourth control means for providing a slowdown signal to initiate operation of said slowdown driving interval at an earlier time for a high speed normal driving operation than for a low speed normal driving operation.

7. The system of claim 6, further comprising:

arithmetic means associated with said fourth control means for subtracting from said counter means a higher count for high speed operations and a lower count for low speed operations, thereafter utilizing the remainder count to indicate when the normal driving interval has terminated, adding back into said counter means the high or low count as appropriate for a high or low speed operation, and thereafter using said high or low speed count during the slowdown driving interval to determine when the stopping point has been reached.

8. The system of claim 1, further comprising:

microprocessor control means associated with said first, second, and third control means for determining status of said system and issuing control signals as required during operations.

9. A positioning system for a printer unit, comprising:

apparatus in said printer unit, such as a forms feed assembly or the like, said apparatus having at least one relatively movable portion therein;

first control means for providing control signals indicative of the extent of movement required of said relatively movable portion in said forms feed assembly;

second control means interconnected with said relatively movable portion and responsive to control signals from said first control means to initiate and maintain driving movement of the relatively movable portion of said forms feed assembly at a predetermined normal driving speed during a normal driving interval until a point just prior to a stopping point as determined by said control signals and thereafter to initiate and maintain until said stopping point, a predetermined slowdown speed during a slowdown driving interval, said slowdown speed being slower than said normal driving speed;

emitter means coupled to said relatively movable portion of said forms feed assembly, said emitter means providing a first sequence of signals of relatively lower frequency indicative of the extent of movement of said relatively movable portion during said normal driving interval and for providing a second sequence of signals of relatively higher frequency indicative of the extent of movement of said relatively movable portion of said forms feed assembly during said slowdown driving intervals, and third control means associated with said second control means for utilizing said first sequence of signals from said emitter means during said normal driving interval and for utilizing said second sequence of signals during said slowdown interval to insure that said relatively movable portion of said forms feed assembly stops exactly at the stopping point required.

10. A positioning system for a printer unit or the like, comprising:

apparatus, such as a forms feed assembly or the like in said printer unit, said apparatus having at least one relatively movable portion therein;

motive means interconnected with said relatively movable portion of said forms feed assembly for moving said relatively movable portion at a normal driving speed during a normal driving interval and a slower driving speed during a slowdown interval just prior to a stopping point required during operation of said system;

emitter means coupled to the relatively movable portion of said forms feed assembly, said emitter means providing a first sequence of signals of relatively lower frequency indicative of the extent of movement of said relatively movable portion during said normal driving interval and further providing a second sequence of signals of relatively higher frequency indicative of the extent of movement of said relatively movable portion during said slowdown intervals;

control means responsive to control signals indicative of the extent of movement required of said relatively movable portion of said forms feed assembly, said control means initiating and maintaining driving movement of said relatively movable portion at a predetermined driving speed during said normal driving interval unit a point just prior to a stopping point as determined by said control signals and thereafter initiating and maintaining until said stopping point, a predetermined slowdown speed during a slowdown driving interval, said slowdown speed being slower than said normal driving speed, and said control means utilizing said first sequence of signals from said emitter means during a normal driving interval and further utilizing said second sequence of signals from said emitter means during said slowdown interval to insure that said relatively movable portion of said forms feed assembly stops exactly at the stopping point required.

11. The system of claim 10, further comprising:

printing means in said printing unit for printing information on a forms medium or document fed by said forms feed assembly, said information comprising graphic characters having relatively dense characteristics and requiring accuracy in forms positioning.

12. The system of claim 11, wherein said graphic characters comprise a Kanji character set.

13. The system of claim 12, wherein said printer unit prints at least an alphanumeric character set in addition to said Kanji character set.

14. The system of claim 10, further comprising:

a microprocessor associated with said control means, said microprocessor being responsive to signals occurring during operation of said system including said emitter signals and producing further signals to control positioning of said forms feed assembly during operation of said system.

15. The system of claim 10, further comprising:

an emitter element incorporated in said emitter means, said emitter element having at least a first series of indicia with the individual indicia being positioned at relatively larger intervals, and said emitter element having at least a second series of indicia with the individual indicia being positioned at relatively closer intervals;

sensor means located in proximity to said emitter element for sensing indicia on said emitter element;

means for relatively moving said emitter element and said sensor means to produce low frequency transitions from said first series of indicia and high frequency transitions from said second series of indicia; and circuit means in said control means for utilizing said transitions to develop low and high frequency signal sequences.

16. The system of claim 15, wherein said emitter element comprises a circular element that is rotated past said sensor means during operation of said system.

17. The system of claim 10, further comprising:

speed indication means for indicating a plurality of normal driving speeds for said relatively movable portion; and speed responsive means associated with said control means for utilizing said speed indication signals to select one of a plurality of driving speeds for use during positioning operations.

18. The system of claim 10, wherein said control means comprises a microprocessor and wherein said motive means provides a plurality of normal driving speeds for said relatively movable protion, and further comprising:

counting means in said microprocessor for counting emitter signals during positioning operations;

slowdown control means incorporated in said microprocessor for initiating slowdown of said relatively movable portion earlier for a high speed operation than for a low speed operation;

arithmetic means in said microprocessor means for subtracting a relatively high slowdown count from said counter means for a high speed operation and a relatively low slowdown count for a low speed operation, and for adding the slowdown count for the selected speed of operation back into said counter means upon termination of the normal driving interval; and control means in said system for terminating the normal driving interval when said counter means reaches a zero count level following subtraction of said slowdown count and further operable to initiate and terminate the slowdown interval when said counter means reaches zero after the slowdown count has been added back into the counter means, thereby terminating the positioning operation at the stopping point required.

19. The system of claim 18, further comprising:

means in said microprocessor for producing a forms run signal to indicate the normal driving interval during positioning operations and for terminating said forms run signal to indicate the termination of the normal driving interval and the beginning of the slowdown interval, said microprocessor being further operable to produce a forms busy signal for use during the slowdown interval; and means associated with said microprocessor for producing a forms detent signal indicative of the slowest rate of positioning movement, said forms detent signal being utilized by said microprocessor in conjunction with the low and high frequency signals to terminate positioning movement at the stopping point required.

20. The system of claim 19 wherein a longer slowdown interval is produced by said microprocessor for a normal high speed operation than for a low speed operation by terminating the forms run signal at a time earlier for high speed than for low speed operations.

21. The system of claim 10, further comprising:
wire matrix printing means incorporated in said printer unit for printing information on a forms moving past a print station in said printer unit by means of dots arranged according to a predetermined matrix format.

22. The positioning system of claim 21 wherein said wire matrix printing assembly has a plurality of print wires arranged in accordance with a slanted serrated pattern, and further comprising:
means for relatively moving said print assembly along a print line in said printer unit to print information on said forms moved by said forms feed assembly.

23. The system of claim 10 wherein said control means comprises a microprocessor, and further comprising:
means in said microprocessor for initiating a forms feed operation in accordance with said control signals; and
transfer means in said microprocessor for transferring microprocessor operations back to a primary program routine when said forms feed operation has been initiated and for periodically controlling said microprocessor to check the status of the forms feed operation whereby said microprocessor is able to service other parts of the system and only services the forms feed positioning operation as and when required.

24. The system of claim 10 wherein said control means is a first microprocessor means, and further comprising:
a second microprocessor means for producing the control signals indicative of the extent of movement and stopping point required during positioning operations.

25. A positioning system for a data processing unit or the like, comprising:
an assembly in said data processing unit, said assembly having at least one relatively movable portion therein;
motive means interconnected with said relatively movable portion of said assembly for moving said relatively movable portion at a normal driving speed during a normal driving interval and at a slowdown speed during a slowdown interval just prior to stopping point required during operation of said system;
movement indication means coupled to a relatively movable portion of said assembly, said movement indication means providing a first sequence of signals of relatively lower frequency indicative of the extent of movement of said relatively movable portion during said normal driving interval and further providing a second sequence of signals of relatively higher frequency indicative of the extent of movement of said relatively movable portion during said slowdown interval;
control means responsive to control signals indicative of the extent of movement required of said relatively movable portion of said assembly, said control means initiating and maintaining driving movement of said relatively movable portion of a predetermined driving speed during said normal driving interval until a point just prior to a stopping point as determined by said control signals and thereafter initiating and maintaing until said stopping point, a predetermined slowdown speed during said slowdown driving interval, said slowdown speed being slower than said normal driving speed, and said control means utilizing said first sequence of signals from said movement indication means during said normal driving interval and further utilizing said second sequence of signals from said movement indication means during said slowdown interval to insure that said relatively movable portion of said assembly stops exactly at the stopping point required.

26. The system of claim 25, further comprising:
a forms feed assembly for feeding forms to be printed on past a print station; and
printing means for printing information on a forms medium or document fed by said forms feed assembly, said information comprising graphic characters having relatively dense characteristics and requiring accuracy in forms positioning.

27. The system of claim 26, wherein said graphic characters comprise a Kanji character set.

28. The system of claim 27, wherein said printer unit prints at least an alphanumeric character set in addition to said Kanji character set.

29. The system of claim 25, further comprising:
a microprocessor associated with said control means, said microprocessor being responsive to signals occurring during operation of said system including said movement indication signals and producing further signals to control positioning of said assembly during operation of said system.

30. The system of claim 25 wherein said control means is a first microprocessor means, and further comprising:
a second microprocessor means for producing the control signals indicative of the extent of movement and stopping point required during positioning operations.

* * * * *